(12) United States Patent
Iwata et al.

(10) Patent No.: US 6,545,955 B1
(45) Date of Patent: Apr. 8, 2003

(54) MAGNETO-OPTIC STORAGE MEDIA AND METHODS OF REPRODUCING THE SAME

(75) Inventors: Noboru Iwata, Tenri (JP); Junji Hirokane, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 221 days.

(21) Appl. No.: 09/628,646

(22) Filed: Jul. 28, 2000

(30) Foreign Application Priority Data

Jul. 29, 1999 (JP) .......................................... 11-214977

(51) Int. Cl.$^7$ ............................................. G11B 11/00

(52) U.S. Cl. ............ 369/13.4; 369/13.43; 428/694 MM

(58) Field of Search ............................. 369/13.4, 13.14, 369/13.08, 13.42, 13.43, 13.44, 13.48, 13.46, 13.38, 13.39, 275.2, 286, 288; 428/694 MM, 694 ML, 694 RE, 336

(56) References Cited

U.S. PATENT DOCUMENTS

| | | | | |
|---|---|---|---|---|
| 5,838,645 A | * | 11/1998 | Hirokane et al. | 369/13.8 |
| 5,939,187 A | * | 8/1999 | Hirokane et al. | 428/332 |
| 5,955,191 A | * | 9/1999 | Hirokane et al. | 428/332 |
| 5,982,715 A | * | 11/1999 | Mori et al. | 369/13.38 |
| 6,307,816 B1 | * | 10/2001 | Nishimura | 369/13.07 |
| 6,430,115 B1 | * | 8/2002 | Hirokane et al. | 369/13.43 |

OTHER PUBLICATIONS

A. Yamaguchi et al.; Magnetic Domain Expansion Readout With DC Laser And DC Magnetic Field (MAMMOS); Lecture Resume for Spring 1997; p. 1068.

* cited by examiner

Primary Examiner—Ali Neyzari
(74) Attorney, Agent, or Firm—Birch, Stewart, Kolasch & Birch, LLP

(57) ABSTRACT

The magneto-optical storage medium includes:
  a reproduction layer exhibiting in-plane magnetization at room temperature and changing to perpendicular magnetization above a transition temperature Tp1;
  a first in-plane magnetized layer disposed adjacent the reproduction layer and constituted by an in-plane magnetized film having a Curie temperature Tc2 around the transition temperature Tp1;
  a storage layer constituted by a perpendicularly magnetized film for storing information; and
  at least one supplementary reproduction section, interposed between the storage layer and the first in-plane magnetized layer, constituted by a first supplementary reproduction layer and a second in-plane magnetized layer, the first supplementary reproduction layer exhibiting in-plane magnetization at room temperature and changing to perpendicular magnetization above a transition temperature Tp3, the second in-plane magnetized layer being disposed adjacent the first supplementary reproduction layer and constituted by an in-plane magnetized film having a Curie temperature around the transition temperature Tp3,
wherein Tp1<Tp3.

35 Claims, 10 Drawing Sheets

↑ DIRECTION OF TM MOMENT   ⇧ LEAKING MAGNETIC FLUX

↑ DIRECTION OF
TM MOMENT

MAGNETO-OPTIC STORAGE MEDIA AND METHODS OF REPRODUCING THE SAME

FIELD OF THE INVENTION

The present invention relates to magneto-optical disks, tapes, cards, and other similar storage media used in conjunction with magneto-optical recording/reproduction devices, and their reproduction methods.

BACKGROUND OF THE INVENTION

Conventionally, magneto-optical storage media have been commercialized as rewritable optical storage media. Such a magneto-optical storage medium has a disadvantage that reproduction characteristics deteriorate when the diameters of, and intervals between, recording bits, i.e., recording magnetic domains, are reduced too much relative to the diameter of a spot formed on the magneto-optical storage medium by focusing a light beam projected by a semiconductor laser device.

This is because the light beam focused on the targeted recording bit encompasses adjacent recording bits within its coverage and fails to separately reproduce the individual recording bits.

To overcome the disadvantage, various magnetic super high resolution reproduction technologies have been developed using a magnetic multi-layer film. These magnetic super high resolution reproduction technologies reduce signal interference during reproduction by forming a magnetic masking area and thus forming a magnetic aperture smaller than the beam spot, thus enabling reproduction of signals whose cycles do not exceed diffraction limits of light.

Nevertheless, the magnetic super high resolution reproduction technologies have a problem that the strength of reproduced signals decreases with a decrease in the recording cycle for the magnetic recording domain, because the aperture also needs to be reduced in size.

To solve the problem, a method is suggested to enable magnetic domain expansion reproduction without applying a.c. external magnetic fields ((Magnetic Domain Expansion Readout with DC Lasers and DC Magnetic Fields [Magnetic Amplifying Magneto-Optical system, or MAMMOS]), an article from resumes for lectures in 44th Conference organized in spring 1997 by the Society of Applied Physics Researchers, 30a-NF-3, page 1068).

Now, referring to FIG. 17 through FIG. 19, a magneto-optical storage medium based on the foregoing method will be explained. FIGS. 17 and 18 are plan and cross-sectional views schematically illustrating magnetization of the magneto-optical storage medium during reproduction. FIG. 19 is a cross-sectional view showing the arrangement of a magneto-optical disk that is an application of the magneto-optical storage medium.

As shown in FIG. 18, the magneto-optical storage medium has a stack structure including a reproduction layer 201, a supplementary reproduction layer 203, and a storage layer 207. The reproduction layer 201 and the supplementary reproduction layer 202 exhibit in-plane magnetization at room temperature, and changes to perpendicular magnetization when temperature is elevated by projection of a focused light beam 208 (light beam spot 208' in FIG. 17). The storage layer 204 is constituted by a perpendicularly magnetized film, where magnetic information is stored in the form of directions of the magnetization in magnetic domains 209 and 210.

The reproduction layer 201 is specified to change to perpendicular magnetization at a lower temperature than the supplementary reproduction layer 203 changes to perpendicular magnetization. Consequently, on heating by the light beam 208, the magnetic domain 212 in which the reproduction layer 201 has changed to perpendicular magnetization grows larger than the magnetic domain 211 in which the supplementary reproduction layer 203 changes to perpendicular magnetization.

The direction of the magnetization in the magnetic domain 211, in which the supplementary reproduction layer 203 has changed to perpendicular magnetization due to the heat of the light beam 208, is determined by coupling to the storage layer 207 through exchange forces. Hence, the magnetic information in the storage layer 207 is duplicated to the supplementary reproduction layer 203 so that the direction of the auxiliary grating moment of the supplementary reproduction layer 203 conforms to that of the storage layer 207.

Next, the magnetic information in the magnetic domain 211, in which the supplementary reproduction layer 203 has changed to perpendicular magnetization, is duplicated to the reproduction layer 201 so that the direction of the transition metal (TM) moment of the reproduction layer 201 conforms to that of the supplementary reproduction layer 203. Here, since the magnetic domain 212, in which the reproduction layer 201 changes to perpendicular magnetization, grows larger than the magnetic domain 211, in which the supplementary reproduction layer 203 changes to perpendicular magnetization, the magnetization of the supplementary reproduction layer 203, i.e., the magnetization of the storage layer 207, is expanded and duplicated to the reproduction layer 201.

As described above, in the magneto-optical storage medium used in accordance with the aforementioned method, small magnetic domains in the storage layer 207 are expanded and duplicated to the reproduction layer 201; therefore, high density storage is realized, and expansion of reproduction signals is enabled.

It should be noted that as shown in FIG. 19, typically, the foregoing magneto-optical storage medium includes the arrangement shown in FIG. 18, and further constitutes overlapping layers including a substrate 213, a transparent dielectric protection layer 214, and a protection layer 215 among others.

However, the storage layer 207, the supplementary reproduction layer 203, and the reproduction layer 201 are coupled together through exchange forces in the magneto-optical storage medium capable of reproducing magnetic domains by means of expansion in accordance with the aforementioned method.

Therefore, the transition from in-plane to perpendicular magnetization of the supplementary reproduction layer 203 and the reproduction layer 201 proceeds gradually with rising temperature, resulting in difficulties in improving reproduction resolution.

Further, in a vicinity of transition temperature Tp201 at which the reproduction layer 201 changes to perpendicular magnetization, the supplementary reproduction layer 203 exhibits in-plane magnetization and is coupled to the reproduction layer 201 through exchange forces. The coupling interrupts the change of the reproduction layer 201 to perpendicular magnetization, ostensibly raising transition temperature Tp201. Consequently, the magnetic domain 212 formed in the reproduction layer 201 becomes smaller than when no coupling is established through exchange forces. In a vicinity of transition temperature Tp203 at which the supplementary reproduction layer 203 changes to perpendicular magnetization, the reproduction layer 201 exhibits perpendicular magnetization and is coupled to the supplementary reproduction layer 203 through exchange forces. The coupling causes the supplementary reproduction layer 203 to start changing to perpendicular magnetization at a temperature below transition temperature Tp203 at which the supplementary reproduction layer 203 desirably changes to perpendicular magnetization, ostensibly lowering transition temperature Tp203. Consequently, the magnetic domain 211 formed in the supplementary reproduction layer 203 becomes smaller than when no coupling is established through exchange forces.

When the magnetization in the storage layer 207 is duplicated to the supplementary reproduction layer 203, the magnetic domain 211 is larger than the magnetic recording domain 209, and therefore affected by magnetic domains surrounding the magnetic recording domain 209, making it difficult to duplicate the magnetization to the supplementary reproduction layer 203 with high resolution. Further, the magnetization in the magnetic domain 211 in the supplementary reproduction layer is not sufficiently expanded and duplicated to the magnetic domain 212, reducing the strength in reproduction signals and failing to deliver satisfactory signal quality, which is a problem.

Accordingly, so that the change of the supplementary reproduction layer 203 and the reproduction layer 201 from in-plane magnetization to perpendicular magnetization takes place with rising temperature in a stable manner, the supplementary reproduction layer 203 and the reproduction layer 201 need to be thick; however, greater thicknesses of the layers degrades playback sensitivity, which is yet another problem.

SUMMARY OF THE INVENTION

The present invention has an object to offer a magneto-optical storage medium that can reproduce signals whose cycles do not exceed diffraction limits of light, with improved signal amplitudes and satisfactory playback sensitivity.

In order to achieve the object, a magneto-optical storage medium includes:

- a reproduction layer exhibiting in-plane magnetization at room temperature and changing to perpendicular magnetization above a transition temperature Tp1;
- an in-plane magnetized layer constituted by an in-plane magnetized film having a Curie temperature Tc2 around the transition temperature Tp1;
- a storage layer constituted by a perpendicularly magnetized film for storing information; and
- at least one supplementary reproduction section, interposed between the storage layer and the in-plane magnetized layer, constituted by a first supplementary reproduction layer and a first in-plane magnetized supplementary reproduction layer, the first supplementary reproduction layer exhibiting in-plane magnetization at room temperature and changing to perpendicular magnetization above a transition temperature Tp3, the first in-plane magnetized supplementary reproduction layer being disposed adjacent the first supplementary reproduction layer and constituted by an in-plane magnetized film having a Curie temperature around the transition temperature Tp3, wherein Tp1<Tp3.

In the arrangement, there is provided an in-plane magnetized layer losing its magnetization at its Curie temperature Tc2 around transition temperature Tp1 at which the reproduction layer changes to perpendicular magnetization. Thus, the in-plane magnetized layer aligns the magnetization of the reproduction layer in the in-plane direction through exchange coupling below Tp1, enhancing in-plane magnetization masking. Above Tp1, the in-plane magnetized layer allows passage to the leaking magnetic field generated in the storage layer and the first supplementary reproduction layer.

Further, there is provided a first in-plane magnetized supplementary reproduction layer losing its magnetization at its Curie temperature Tc4 around transition temperature Tp3 at which the first supplementary reproduction layer changes to perpendicular magnetization. Thus, the first in-plane magnetized supplementary reproduction layer aligns the magnetization of the reproduction layer in the in-plane direction through exchange coupling below Tp3, enhancing in-plane magnetization masking. Above Tp3, the first in-plane magnetized supplementary reproduction layer allows passage to the leaking magnetic field generated in the storage layer.

According to the arrangement, the reproduction layer, the in-plane magnetized layer, the first supplementary reproduction layer, and the first in-plane magnetized supplementary reproduction layer are securely coupled through exchange forces below transition temperature Tp1 at which the reproduction layer changes to perpendicular magnetization, thereby stabilizing the in-plane magnetization of the reproduction layer below transition temperature Tp1. Thus, the reproduction layer abruptly changes from in-plane magnetization to perpendicular magnetization where it is heated exceeding transition temperature Tp1, improving reproduction resolution and enabling stable magnetic domain expansion and duplication.

The exchange coupling between the reproduction layer and the first supplementary reproduction layer is blocked by the in-plane magnetized layer, preventing transition temperature Tp1 of the reproduction layer from rising and transition temperature Tp3 of the first supplementary reproduction layer from falling.

Further, the first supplementary reproduction layer is securely coupled to the in-plane magnetized supplementary reproduction layer through exchange forces below transition temperature Tp3 at which the first supplementary reproduction layer changes to perpendicular magnetization, thereby exhibiting in-plane magnetization with increased stability below transition temperature Tp3 of the first supplementary reproduction layer. Thus, the first supplementary reproduction layer abruptly changes from in-plane magnetization to perpendicular magnetization where it is heated exceeding transition temperature Tp3, improving reproduction resolution in the first supplementary reproduction layer and effecting magnetic domain expansion and duplication with increased stability.

In this manner, high reproduction resolution and satisfactory reproduction signal quality are obtainable by expanding and duplicating, to the reproduction layer, magnetic domains duplicated to the first supplementary reproduction layer with high reproduction resolution.

The supplementary reproduction section may be provided in plurality between the in-plane magnetized layer and the storage layer, in ascending order of the transition temperatures from the in-plane magnetized layer toward the storage layer.

Such an arrangement is realized by the supplementary reproduction section constituted by a first supplementary reproduction section and a second supplementary reproduction section, the first supplementary reproduction section being constituted by a first supplementary reproduction layer and a first in-plane magnetized supplementary reproduction layer disposed so that the first supplementary reproduction layer is closer to the reproduction layer than is the first in-plane magnetized supplementary reproduction layer, the first supplementary reproduction layer exhibiting in-plane magnetization at room temperature and changing to perpendicular magnetization above a transition temperature Tp3, the first in-plane magnetized supplementary reproduction layer being disposed adjacent the first supplementary reproduction layer and constituted by an in-plane magnetized film having a Curie temperature Tc4 around the transition temperature Tp3, the second supplementary reproduction section being constituted by a second supplementary reproduction layer and a second in-plane magnetized supplementary reproduction layer disposed so that the second supplementary reproduction layer is closer to the reproduction layer than is the second in-plane magnetized supplementary reproduction layer, the second supplementary reproduction layer exhibiting in-plane magnetization at room temperature and changing to perpendicular magnetization above a transition temperature Tp5, the second in-plane magnetized supplementary reproduction layer being disposed adjacent the second supplementary reproduction layer and constituted by an in-plane magnetized film having a Curie temperature Tc5 around the transition temperature Tp5, wherein the first supplementary reproduction layer is closer to the storage layer than is the second supplementary reproduction layer, and Tp1<Tp5<Tp3.

In the arrangement, the magnetic recording domain formed through duplication from the storage layer to the first supplementary reproduction layer is expanded and duplicated to the reproduction layer by expanding and duplicating the magnetic domain sequentially from the first supplementary reproduction layer via the second supplementary reproduction layer to the reproduction layer, effecting smooth expansion and duplication. Besides, a leaking magnetic flux arising in parallel to the total magnetization of the magnetic recording domain from an increased area can be applied to a part of the reproduction layer where it has changed to perpendicular magnetization; therefore, the expansion and duplication to the reproduction layer is more stable than at short mark lengths, as well as external disturbances, such as a leaking magnetic field from the optical pickup head, are less likely to cause negative effects.

Further, the magnetic domain, expanded and duplicated to the second supplementary reproduction layer with high reproduction resolution, is expanded and duplicated to the reproduction layer, producing better reproduction signal quality. Consequently, the magneto-optical storage medium improves reproduction resolution in the second supplementary reproduction layer and achieves satisfactory reproduction signal quality at short mark lengths, while retaining satisfactory recording sensitivity.

In order to achieve the object, a method of reproducing a magneto-optical storage medium is a method of reproducing such a magneto-optical storage medium that includes:

a reproduction layer exhibiting in-plane magnetization at room temperature and changing to perpendicular magnetization above a transition temperature Tp1;

an in-plane magnetized layer constituted by an in-plane magnetized film having a Curie temperature Tc2 around the transition temperature Tp1;

a storage layer constituted by a perpendicularly magnetized film for storing information; and at least one supplementary reproduction section, interposed between the storage layer and the in-plane magnetized layer, constituted by a first supplementary reproduction layer and a first in-plane magnetized supplementary reproduction layer, the first supplementary reproduction layer exhibiting in-plane magnetization at room temperature and changing to perpendicular magnetization above a transition temperature Tp3, the first in-plane magnetized supplementary reproduction layer being disposed adjacent the first supplementary reproduction layer and constituted by an in-plane magnetized film having a Curie temperature around the transition temperature Tp3, wherein Tp1<Tp3, the method being characterized in that it includes the steps of:

(a) heating the magneto-optical storage medium exceeding the transition temperature Tp3 by means of a light beam for reproduction;

(b) duplicating the magnetic information stored in the storage layer to a part of the first supplementary reproduction layer where the first supplementary reproduction layer is hotter than the transition temperature Tp3; and (c) duplicating the magnetic information duplicated to the part of the first supplementary reproduction layer to a part of the reproduction layer where the reproduction layer is hotter than the transition temperature Tp1.

In order to achieve the object, another method of reproducing a magneto-optical storage medium is a method of reproducing such a magneto-optical storage medium that includes:

a reproduction layer exhibiting in-plane magnetization at room temperature and changing to perpendicular magnetization above a transition temperature Tp1;

an in-plane magnetized layer constituted by an in-plane magnetized film having a Curie temperature Tc2 around the transition temperature Tp1;

a storage layer constituted by a perpendicularly magnetized film for storing information;

a first supplementary reproduction section being constituted by a first supplementary reproduction layer and a first in-plane magnetized supplementary reproduction layer disposed so that the first supplementary reproduction layer is closer to the reproduction layer than is the first in-plane magnetized supplementary reproduction layer, the first supplementary reproduction layer exhibiting in-plane magnetization at room temperature and changing to perpendicular magnetization above a transition temperature Tp3, the first in-plane magnetized supplementary reproduction layer being disposed adjacent the first supplementary reproduction layer and constituted by an in-plane magnetized film having a Curie temperature Tc4 around the transition temperature Tp3; and a second supplementary reproduction section being constituted by a second supplementary reproduction layer and a second in-plane magnetized supplementary reproduction layer disposed so that the second supplementary reproduction layer is closer to the reproduction layer than is the second in-plane magnetized supplementary reproduction layer, the second supplementary reproduction layer exhibiting in-plane magnetization at room temperature and changing to perpendicular magnetization above a transition temperature Tp5, the second in-plane magnetized supplementary reproduction layer being disposed adjacent the second supplementary reproduction layer and constituted by an in-plane magnetized film having a Curie temperature Tc5 around the transition temperature Tp5, wherein the first supplementary reproduction layer is closer to the storage layer than is the second supplementary reproduction layer, and Tp1<Tp5<Tp3 the method being characterized in that it includes the steps of:

(a) heating the magneto-optical storage medium exceeding the transition temperature Tp3 by means of a light beam for reproduction;

(b) duplicating the magnetic information stored in the storage layer to a part of the first supplementary reproduction layer where the first supplementary reproduction layer is hotter than the transition temperature Tp3; and (c) duplicating the magnetic information duplicated to the part of the first supplementary reproduction layer to a part of the second supplementary reproduction layer where the second supplementary reproduction layer is hotter than the transition temperature Tp5; and (d) duplicating the magnetic information duplicated to the part of the second supplementary reproduction layer to a part of the reproduction layer where the reproduction layer is hotter than the transition temperature Tp1.

According to either one of the methods of reproducing a magneto-optical storage medium, the magnetic domain in the storage layer is expanded and duplicated to the supplementary reproduction layer and then further expanded and duplicated to the reproduction layer; a leaking magnetic flux arising from an increased area can therefore be applied to the reproduction layer, which improves reproduction signal quality.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIG. 1 to FIG. 5, the following description will discuss an embodiment in accordance with the present invention.

Figure 1:
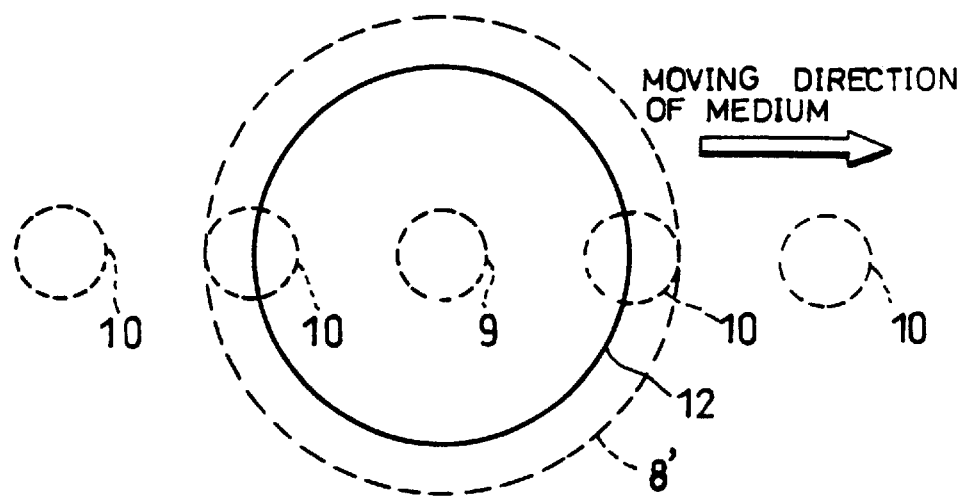
FIG. 1 is an explanatory drawing illustrating playback of a magneto-optical storage medium of an embodiment in accordance with the present invention.
Figure 2:
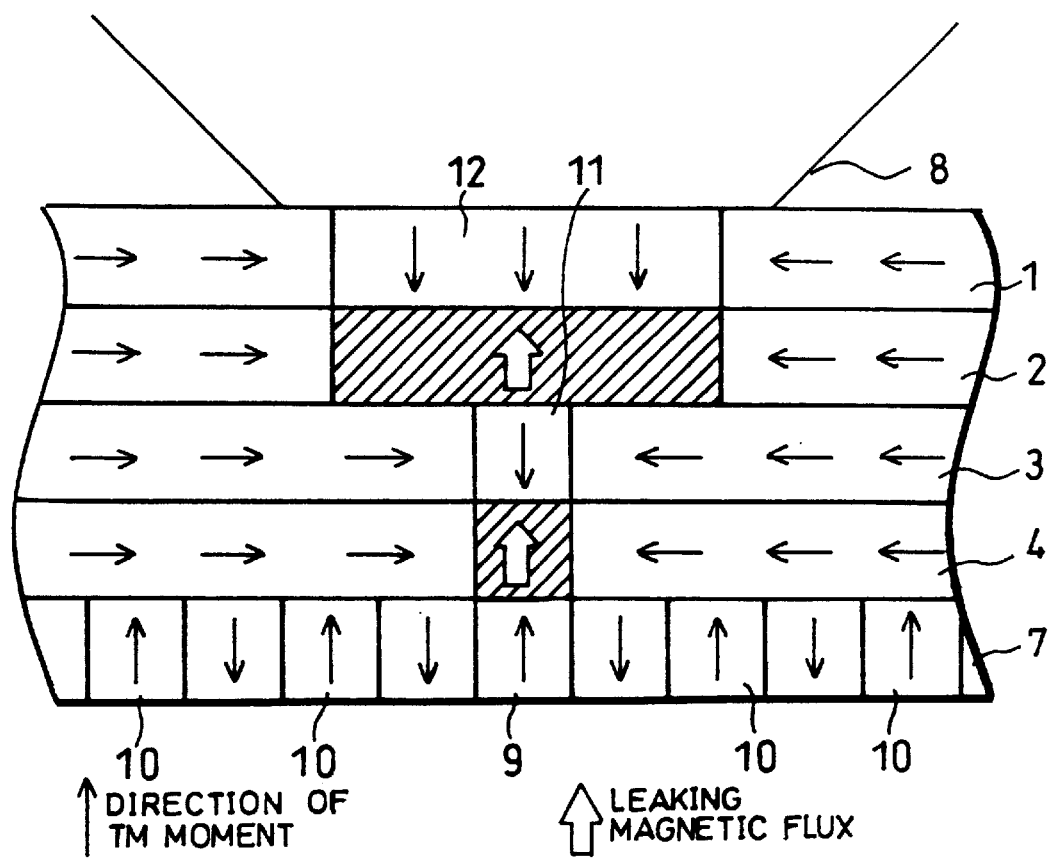
FIG. 2 is an explanatory drawing showing the magnetization during playback of the magneto-optical storage medium of the embodiment.

First, referring to FIG. 1 and FIG. 2, playback principles will be explained of a magneto-optical storage medium of the present embodiment. FIG. 1 and FIG. 2 are plan and cross-sectional views showing the magnetization of the magneto-optical storage medium during playback.

As shown in FIG. 2, the magneto-optical storage medium of the present embodiment includes a reproduction layer 1, a first in-plane magnetized layer 2, a first supplementary reproduction layer 3, a second in-plane magnetized layer 4, and a storage layer 7 that are sequentially overlapping one another. In FIG. 2, the black arrow represents the direction of the magnetic moment of a transition metal (TM), while the open arrow represents the direction of a leaking magnetic flux.

The reproduction layer 1 is composed of an alloy of rare earth and transition metals, exhibiting in-plane magnetization at room temperature and changing to perpendicular magnetization above a transition temperature Tp1. The first in-plane magnetized layer 2 is constituted by a magnetic film exhibiting magnetization within the in-plane, chiefly composed of a rare earth and transition metal, a rare earth metal, or a transition metal. The first supplementary reproduction layer 3 is composed of an alloy of rare earth and transition metals, exhibiting in-plane magnetization at room temperature and changing to perpendicular magnetization above a transition temperature Tp3. The second in-plane magnetized layer 4 is constituted by a magnetic film exhibiting magnetization within the in-plane, chiefly composed of a rare earth and transition metal, a rare earth metal, or a transition metal. The storage layer 7 is composed of an alloy of rare earth and transition metals, exhibiting perpendicular magnetization.

To impart such magnetic properties to exhibit in-plane magnetization at room temperature and change to perpendicular magnetization with rising temperature, the reproduction layer 1 and the first supplementary reproduction layer 3 are preferably RE rich, that is, exhibit a greater rare earth metal (RE) moment when compared with a compensation composition in which a balance is struck between the RE moment and the transition metal (TM) moment, at least at room temperature. The reproduction layer 1 and the first supplementary reproduction layer 3 are preferably RE rich again to increase total magnetization and thereby enhance their coupling to the leaking magnetic field through magnetostatic forces around the transition temperatures Tp1 and Tp3 at which the layers 1 and 3 change to perpendicular magnetization respectively. In such an event, in the reproduction layer 1 and the first supplementary reproduction layer 3, the TM moment and the total magnetization are antiparallel as represented respectively by the black and open arrows in FIG. 2.

The storage layer 7 is preferably adjusted in composition so as to produce a great leaking magnetic flux where it is heated. Accordingly, the storage layer 7 is preferably constituted by a perpendicularly magnetized TM rich film with a compensation temperature around room temperature, exhibiting above room temperature a great TM moment when compared with a compensation composition in which a balance is struck between the RE moment and the transition metal (TM) moment. In such an event, in the storage layer 7, the TM moment is parallel to the total magnetization. Note that when the storage layer 7 is coupled to the first supplementary reproduction layer 3 through magnetostatic forces, magnetization is duplicated so that the two layers exhibit total magnetization that are in parallel; therefore, the TM moment of the storage layer 7 is antiparallel to the TM moment of the first supplementary reproduction layer 3.

The transition temperature Tp1 of the reproduction layer 1 is specified lower than transition temperature Tp3 of the first supplementary reproduction layer 3. This enables the magnetic domain in which the reproduction layer 1 is perpendicular magnetized to be greater in size than the magnetic domain in which the first supplementary reproduction layer 3 is perpendicular magnetized, and facilitates magnetic domain expansion reproduction.

The first in-plane magnetized layer 2 is arranged so as to lose magnetization at a temperature Tc2 (Curie temperature) around transition temperature Tp1 of the reproduction layer 1 at which it changes to perpendicular magnetization (Tc2 is preferably below Tp1 to ensure a sufficiently large playback margin). Thus, the first in-plane magnetized layer 2 can, below Tp1, maintain the in-plane magnetization of the reproduction layer 1 by means of exchange coupling so as to improve in-plane magnetization masking, and, above Tp1, allow passage to the magnetic field leaking from the storage layer 7 and the first supplementary reproduction layer 3.

The second in-plane magnetized layer 4 is arranged so as to lose magnetization at a temperature Tc4 (Curie temperature) around transition temperature Tp3 of the first supplementary reproduction layer 3 at which it changes to perpendicular magnetization (Tc4 is preferably below Tp3 to ensure a sufficiently large playback margin). Thus, the second in-plane magnetized layer 4 can, below Tp3, maintain the in-plane magnetization of the reproduction layer 1 by means of exchange coupling so as to improve in-plane magnetization masking, and, above Tp3, allow passage to the magnetic field leaking from the storage layer 7.

In this arrangement, for playback, a focused light beam 8 (or light beam spot 8' in FIG. 1) is projected onto the reproduction layer 1 right above the target magnetic recording domain 9 in the storage layer 7. The leaking magnetic flux produced by the magnetic recording domain 9 in the storage layer 7 is coupled the total magnetization of the first supplementary reproduction layer 3 through magnetostatic forces according to a temperature distribution caused in magneto-optical storage medium by the projection of the focused light beam 8. Thus, the magnetic information in the magnetic recording domain 9 in the storage layer 7 is duplicated to the first supplementary reproduction layer 3 where it exhibits perpendicular magnetization, so as to form the magnetic domain 11. Then, the duplicated magnetic information in the magnetic domain 11 in the first supplementary reproduction layer 3 is expanded and again duplicated to the reproduction layer 1 through magnetostatic coupling forces, so as to form the magnetic domain 12 in the reproduction layer 1. Finally, a signal is reproduced from the magnetic domain 12 to retrieve the information stored in the magnetic recording domain 9 in the storage layer 7.

In the magneto-optical storage medium of the present embodiment detailed so far, below transition temperature Tp1 at which the reproduction layer 1 changes to perpendicular magnetization, the reproduction layer 1, the first in-plane magnetized layer 2, the first supplementary reproduction layer 3, and the second in-plane magnetized layer 4 are securely coupled together through exchange forces, stabilizing the in-plane magnetization of the reproduction layer 1 where its temperature is below transition temperature Tp1. The reproduction layer 1 thereby abruptly changes from in-plane magnetization to perpendicular magnetization where it is heated exceeding transition temperature Tp1. This improves on reproduction resolution and enables stable expansion and duplication of magnetic domains. Also, the first in-plane magnetized layer 2 prevents the reproduction layer 1 and the first supplementary reproduction layer 3 from coupling to each other through exchange forces, preventing transition temperature Tp1 from rising and transition temperature Tp3 from falling.

Below transition temperature Tp3 at which the first supplementary reproduction layer 3 changes to perpendicular magnetization, the second in-plane magnetized layer 4 is securely coupled to the first supplementary reproduction layer 3 through exchange forces, stabilizing the in-plane magnetization of the first supplementary reproduction layer 3 below transition temperature Tp3. Thereby, the first supplementary reproduction layer 3 thereby abruptly changes from in-plane magnetization to perpendicular magnetization where it is heated exceeding transition temperature Tp3. This improves on reproduction resolution in the first supplementary reproduction layer 3 and enables stable expansion and duplication of magnetic domains.

By duplicating the magnetic domain to the first supplementary reproduction layer 3 with high reproduction resolution and then expanding and duplicating to the reproduction layer 1 in the foregoing manner, a high reproduction resolution and satisfactory reproduction signal quality are obtainable.

In the magneto-optical storage medium of the present embodiment, the second in-plane magnetized layer 4 reduces leaking magnetic fluxes developing in the domains other than the target magnetic recording domain 9 in the storage layer 7. Only the magnetic domain 11 is therefore formed in the first supplementary reproduction layer 3 by the resultant leaking magnetic field and then expanded and duplicated to form a magnetic domain 12 in the reproduction layer 1. The magnetic domain 12 is the only domain reproduced by means of the light beam 8. In other words, the magnetic information stored in the magnetic recording domain 9 as well as in the magnetic recording domain 10 other than the magnetic recording domain 9 in the storage layer 7 is not directly reproduced by means of the light beam 8. This allows only the magnetic recording domain 9 to be reproduced, and the process is free from interference from those magnetic recording domains 10 adjacent the magnetic recording domain 9.

To further ensure the duplication to the first supplementary reproduction layer 3 by means of magnetostatic coupling and the expansion and duplication to the reproduction layer 1 by means of magnetostatic coupling in the embodiment above, arrangements are made so that the leaking magnetic field developing in the storage layer 7 around transition temperature Tp1 is weaker than the leaking magnetic flux developing in the storage layer 7 around transition temperature Tp3 and also that Curie temperature Tc1 of the reproduction layer 1 is lower than Curie temperature Tc3 of the first supplementary reproduction layer 3. As a result, the reproduction layer 1 exhibits a smaller total magnetization than does the first supplementary reproduction layer 3, and the magnetostatic forces coupling the storage layer 7 to the reproduction layer 1 around transition temperature Tp1 are weaker than the magnetostatic forces coupling the storage layer 7 to the first supplementary reproduction layer 3 around transition temperature Tp3.

These methods stabilize the duplication from the storage layer 7 to the first supplementary reproduction layer 3 by means of magnetostatic coupling and the expansion and duplication from the first supplementary reproduction layer 3 to the reproduction layer 1.

Now, the following description will discuss in specific terms a magneto-optical disk which is an application of the magneto-optical storage medium of the present embodiment.

Figure 3:
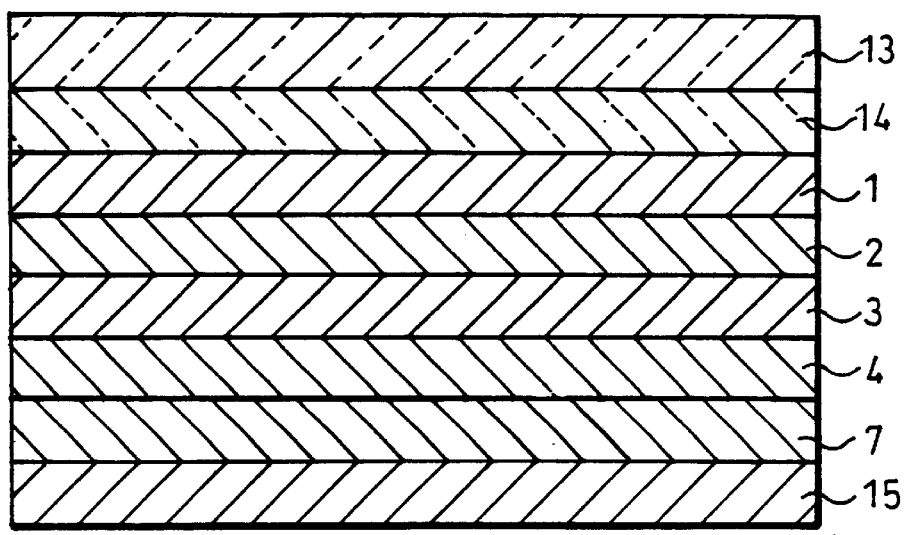
FIG. 3 is a cross-sectional view schematically showing an arrangement of a magneto-optical disk, which is an application of the magneto-optical storage medium shown in FIG. 2.

As shown in FIG. 3, the magneto-optical disk includes on a substrate 13, a transparent dielectric protection layer 14, a reproduction layer 1, a first in-plane magnetized layer 2, a first supplementary reproduction layer 3, a second in-plane magnetized layer 4, a storage layer 7, and a protection layer 15 that are sequentially overlapping one another.

The magneto-optical disk records information by a Curie temperature storage scheme. Specifically, a light beam 8 emitted from a semiconductor laser device serving as a light source is directed passing through the substrate 13 and the transparent dielectric protection layer 14 and focused on the reproduction layer 1 so as to heat the storage layer 7 above Curie temperature Tc7. By simultaneously applying an external magnetic field modulated according to a signal to be stored, the magnetization of the storage layer 7 is controlled, causing information to be stored on the magneto-optical storage medium.

The magneto-optical disk is played back by means of a magneto-optical effect known as pole Kerr effect, by projecting a focused light beam 8 specified to have a smaller power than that used for recording. Pole Kerr effect refers to a phenomenon where the direction of the rotation of the polarization plane of reflected light is reversed by the magnetization whose direction is perpendicular to a surface which light enters.

Composed of a polycarbonate or other similar transparent base materials for example, the substrate 13 is formed in a disk shape and has, on its surface where layers are formed, guide grooves for guiding the light beam 8. It should be noted that in the present embodiment the guide grooves may serve so as to store information only either on the lands or on the guide grooves, and alternatively serve so as to store information both on the lands and the guide grooves.

The transparent dielectric protection layer 14 is preferably composed of a transparent dielectric, such as AlN, SiN, AlSiN, or $Ta_2O_3$. The thickness of the transparent dielectric protection layer 14 is specified so as to produce satisfactory interference effects on the incident light beam 8 and increase the pole Kerr rotation angle of the medium. More specifically, the transparent dielectric protection layer 14 is specified to have a thickness of about $\lambda/(4n)$ where $\lambda$ is the wavelength of the light beam 8 and n is the refractive index of the transparent dielectric protection layer 14. For example, supposing that the light beam 8 has a wavelength $\lambda$ of 680 nm, since the transparent dielectric protection layer 14 has a refractive index n of about 1.7 to 2.5, the thickness should be specified to about 70 nm to 100 nm.

The reproduction layer 1 is a magnetic film, composed of an alloy of rare earth and transition metals, exhibiting in-plane magnetization at room temperature, changing to perpendicular magnetization at transition temperature Tp1 which is higher than room temperature, and retaining the perpendicular magnetization up to Curie temperature Tc1.

Constituted by a magnetic film chiefly composed of a rare earth and transition metal, a rare earth metal, or a transition metal, the first in-plane magnetized layer 2 exhibits in-plane magnetization and is specified so that its Curie temperature Tc2 is around transition temperature Tp1 at which the reproduction layer 1 changes to perpendicular magnetization (preferably Tc2≦Tp1).

The first supplementary reproduction layer 3 is a magnetic film, composed of an alloy of rare earth and transition metals, exhibiting in-plane magnetization at room temperature, changing to perpendicular magnetization at transition temperature Tp3 higher than room temperature, and retaining the perpendicular magnetization up to Curie temperature Tc3.

Constituted by a magnetic film chiefly composed of a rare earth and transition metal, a rare earth metal, or a transition metal, the second in-plane magnetized layer 4 exhibits in-plane magnetization and is specified so that its Curie temperature Tc4 is around transition temperature Tp3 at which the first supplementary reproduction layer 3 changes to perpendicular magnetization (preferably Tc4≦Tp3).

In the present embodiment, the second in-plane magnetized layer 4 reduces leaking magnetic fluxes developing in the domains other than the target magnetic recording domain 9 in the storage layer 7. Only the magnetic information stored in the magnetic recording domain 9 in the storage layer 7 is duplicated to the magnetic domain 11 in the first supplementary reproduction layer 3 by magnetostatic coupling.

To ensure the duplication, if ever necessary, Curie temperature Tc1 of the reproduction layer 1 is specified lower than Curie temperature Tc3 of the first supplementary reproduction layer 3 so that the total magnetization of the reproduction layer 1 is smaller than the total magnetization of the first supplementary reproduction layer 3. This causes the storage layer 7 to be magnetostatically coupled to the reproduction layer 1 more securely than to the first supplementary reproduction layer 3. Thus, the magnetic information stored in the magnetic recording domain 9 in the storage layer 7 is duplicated to the magnetic domain 11 in the first supplementary reproduction layer 3 by magnetostatic coupling.

Transition temperature Tp1 at which the reproduction layer 1 changes to perpendicular magnetization is specified lower than transition temperature Tp3 at which the first supplementary reproduction layer 3 changes to perpendicular magnetization. This allows the magnetic domain 11 in the first supplementary reproduction layer 3 to be expanded and duplicated as the magnetic domain 12 in the reproduction layer 1.

Curie temperature Tc1 of the reproduction layer 1 is preferably not less than 160° C. and not more than 300° C. If Tc1<160° C., since the Kerr rotation angle decreases tangibly with lowered Curie temperature Tc1 of the reproduction layer 1, reproduced signals weaken, and no satisfactory reproduction characteristics are obtainable. If Tc1>300° C., the elevated Curie temperature Tc1 of the reproduction layer 1 causes the magnetization the reproduction layer 1 to grow around transition temperature Tp1 of the reproduction layer 1, securing the coupling of the reproduction layer 1 to the storage layer 7 around transition temperature Tp1. As a result, the expansion and duplication of a magnetic domain from the first supplementary reproduction layer 3 to the reproduction layer 1 is interrupted, reproduction noise increases, and quality of reproduction signals deteriorates.

The transition temperature Tp1 at which the reproduction layer 1 changes to perpendicular magnetization is preferably not less than 60° C. and not more than 180° C. If Tp1<60° C., it becomes difficult to stably exhibit the same in-plane magnetization as that at room temperature, and the reproduction layer 1 changes to perpendicular magnetization in a larger area. Thus, the reproduction layer 1 becomes susceptible to external disturbances including a leaking magnetic field developed by an optical pickup, and information cannot reproduced stably by magnetic domain expansion reproduction. If Tp1>180° C., the reproduction layer 1 changes to perpendicular magnetization in a smaller area, and the magnetic domain is not expanded to a satisfactory level, weakening reproduction signals and degrading quality of reproduction signals tangibly.

Curie temperature Tc3 of the first supplementary reproduction layer 3 is preferably not less than 230° C. If Tc3<230° C., the total magnetization of the first supplementary reproduction layer 3 decreases with lowered Curie temperature Tc3 of the first supplementary reproduction layer 3 around transition temperature Tp3 of the first supplementary reproduction layer 3. This weakens the magnetostatic coupling between the storage layer 7 and the first supplementary reproduction layer 3 and also between the first supplementary reproduction layer 3 and the reproduction layer 1 around transition temperature Tp3, and thus reduces stability in the magnetic domain duplication from the storage layer 7 to the first supplementary reproduction layer 3. It should be noted that the higher Curie temperature Tc3, the greater the total magnetization of the first supplementary reproduction layer 3 around transition temperature Tp3, and thereby more secure magnetostatic coupling is established between the storage layer 7 and the first supplementary reproduction layer 3 and also between the first supplementary reproduction layer 3 and the reproduction layer 1; however, the upper limit of the Curie temperature Tc3 is restricted by the material to be used.

Transition temperature Tp3 at which the first supplementary reproduction layer 3 changes to perpendicular magnetization is specified higher than at least transition temperature Tp1 at lowest, and lower than Curie temperature Tc7 of the storage layer 7. Specifically, transition temperature Tp3 of the first supplementary reproduction layer 3 is preferably not less than 100° C. and not more than 230° C. If Tp3<100° C., the first supplementary reproduction layer changes to perpendicular magnetization at a lower temperature, decreasing reproduction resolution and degrading reproduction signal quality at short mark lengths. If Tp3>230° C., transition temperature Tp3 at which the first supplementary reproduction layer 3 changes to perpendicular magnetization moves relatively close to Curie temperature Tc7 of the storage layer 7; therefore, a slight variation in reproduction power can elevate the temperature of the storage layer 7 exceeding Curie temperature Tc7, stored information is erased, and no viable reproduction power margin is obtainable.

The thickness of the reproduction layer 1 is preferably specified not less than 20 nm and not more than 60 nm. If the reproduction layer 1 is less than 20 nm thick, the light beam passes through the reproduction layer 1 and reflects at the first in-plane magnetized layer 2, thereby decreasing the amount of light reflecting at the reproduction layer 1. Consequently, reproduced signals weaken, and quality of reproduction signals deteriorates. If the reproduction layer 1 is more than 60 nm thick, the increased thickness tangibly degrades recording sensitivity.

The thickness of the first in-plane magnetized layer 2 is preferably not less than 2 nm and not more than 40 nm. If the first in-plane magnetized layer 2 is less than 2 nm thick, a sufficient in-plane magnetization masking is not effected, and the reproduction resolution decreases. If the first in-plane magnetized layer 2 is more than 40 nm thick, the reproduction layer 1 is separated from the first supplementary reproduction layer 3 by the increased distance, and fails to establish secure magnetostatic coupling to the first supplementary reproduction layer 3. This makes it difficult to stably expand and duplicate magnetic domains in the first supplementary reproduction layer 3 to the reproduction layer 1.

The thickness of the first supplementary reproduction layer 3 is preferably specified in a range of not less than 20 nm to not more than 60 nm. If the supplementary reproduction layer 3 is less than 20 nm thick, the magnetostatic coupling to the leaking magnetic flux arising from the storage layer 7 weakens, thereby reducing stability in the magnetic domain duplication from the storage layer 4 to the supplementary reproduction layer 2. If the supplementary reproduction layer 3 is more than 60 nm thick, the increased thickness tangibly degrades recording sensitivity.

The thickness of the second in-plane magnetized layer 4 is preferably not less than 20 nm and not more than 40 nm. If the second in-plane magnetized layer 4 is less than 20 nm thick, the second in-plane magnetized layer 4 cannot stably retain its in-plane magnetization due to the exchange coupling forces exerted by the storage layer 7, thereby degrading reproduction resolution. If the second in-plane magnetized layer 4 is more than 40 nm thick, the first supplementary reproduction layer 3 is separated from the storage layer 7 by the increased distance, and fails to establish secure magnetostatic coupling to the storage layer 7. This makes it difficult to stably duplicate magnetic domains in the storage layer 7 to the first supplementary reproduction layer 3.

To impart the aforementioned magnetic properties, a thin film composed of GdFe, GdFeCo, GdDyFeCo, GdTbFeCo, GdNdFeCo, or another similar alloy of rare earth and transition metals may be employed as the reproduction layer 1 and the first supplementary reproduction layer 3. A metal element, such as Ta, Cr, Ti, Al, and Si, may be added to the material to improve the resistance of the material to humidity and oxidation.

In-plane magnetized films composed of GdFe, GdFeCo, GdDyFe, GdDyFeCo, GdNdFe, GdNdFeCo, NdFe, NdFeCo, or another similar material may be employed as the first in-plane magnetized layer 2 and the second in-plane magnetized layer 4. To adjust the Curie temperatures, Ta, Cr, Ti, Al, Si, or another similar metal element may be added to the material.

The storage layer 7, preferably, is a perpendicularly magnetized film composed of an alloy of rare earth and transition metals and has its compensation temperature Tcomp7 specified not less than $-70°$ C. and not more than $60°$ C. If Tcomp7<$-70°$ C., the storage layer 7 exhibits a relatively great magnetization around transition temperature Tp1 of the reproduction layer 1, thereby establishing secure magnetostatic coupling between the storage layer 7 and the reproduction layer 1 around transition temperature Tp1. This interrupts stable expansion and duplication of magnetic domains to the reproduction layer 1, and degrades reproduction signal quality. If Tcomp7>$60°$ C., the storage layer 7 exhibits a reduced magnetization around transition temperature Tp3 of the first supplementary reproduction layer 3, weakening the magnetostatic coupling between the storage layer 7 and the first supplementary reproduction layer 3 at transition temperature Tp3. This is disruptive to stable duplication of magnetic domains from the storage layer 7 to the first supplementary reproduction layer 3 and degrades reproduction signal quality.

The Curie temperature Tc7 of the storage layer 7 is specified at least higher than transition temperature Tp3 at which the first supplementary reproduction layer 3 changes to perpendicular magnetization. Specifically, Curie temperature Tc7 is preferably not less than 180° C. and not more than 300° C.

If Tc7<180° C., when the magnetic recording domain 9 is duplicated to the first supplementary reproduction layer 3 by heating the first supplementary reproduction layer 3 above transition temperature Tp3 for playback purposes, a slight elevation in the temperature of the storage layer 7 causes the storage layer 7 to become hotter than excessively lowered Curie temperature Tc7 and lose the stored information. In other words, reproduction power margin is reduced. Further, as Curie temperature Tc7 of the storage layer 7 is lowered, the leaking magnetic flux arising from the storage layer 7 decreases. This makes it difficult to retain stable magnetostatic coupling between the first supplementary reproduction layer 3 and the storage layer 7, and degrades reproduction signal quality.

If Tc7>300° C., the storage layer 7 needs to be heated exceeding 300° C. for recording. Elevated Curie temperature Tc7 causes a tangible degradation of recording sensitivity. Further, since the reproduction layer 1, the first in-plane magnetized layer 2, the first supplementary reproduction layer 3, the second in-plane magnetized layer 4, and the storage layer 7 are heated exceeding 300° C., magnetic properties of the magnetic layers deteriorate, and reproduction signal quality lowers due to loss of stored information.

The thickness of the storage layer 7 is preferably specified not less than 30 nm and not more than 120 nm. If the storage layer 7 is less than 30 nm thick, the storage layer 7 generates weaker leaking magnetic fluxes. This makes it difficult to retain stable causing magnetostatic coupling between the storage layer 7 and the first supplementary reproduction layer 3 and degrades reproduction signal quality. If the storage layer 7 is more than 120 nm thick, the increased thickness causes a tangible degradation in recording sensitivity.

To impart the foregoing magnetic properties, a perpendicularly magnetized film composed of TbFe, TbFeCo, DyFe, DyFeCo, TbDyFe, TbDyFeCo, or another similar material may be employed as the storage layer 7. A metal element, such as Ta, Cr, Ti, Al, and Si, may be added to the material to improve the resistance of the material to humidity and oxidation.

The protection layer 15 is composed of either a transparent dielectric, such as AlN, SiN, AlSiN, or $Ta_2O_3$, or a alloy of non-magnetic metals, such as Al, Ti, Ta, and Ni, and is provided for the purpose of preventing oxidation of the alloy of rare earth and transition metals used for the reproduction layer 1, the first in-plane magnetized layer 2, the first supplementary reproduction layer 3, the second in-plane magnetized layer 4, and the storage layer 7. The thickness of the protection layer 15 is specified in a range from 5 nm to 60 nm.

An additional thermodiffusive metal layer composed of Al, AlTa, AlTi, AlCr, AlNi, AlCo, Cu, or the like is provided on the protection layer 15 to improve on the thermal properties of the medium. On the protection layer 15 or the thermodiffusive metal layer, there may be provided an ultraviolet ray curing resin layer, a thermocuring resin layer, or a lubricant layer.

To effect low magnetization storage, a supplementary storage layer constituted by a perpendicularly magnetized film, composed of GdFeCo, GdTbFeCo, GdDyFeCo, or the like, that has a weaker coercive force than the coercive force of the storage layer 7 and a Curie temperature higher than Curie temperature Tc7 of the storage layer 7 may be deposited adjacent the storage layer 7.

Now, the following description will discuss a method of fabricating a magneto-optical disk arranged as in the foregoing as well as a specific example of a method of recording and reproduction of the disk.

(1) Method of Fabrication of Magneto-optical Disk

The magneto-optical disk (FIG. 3) is fabricated by the following method.

First, a polycarbonate substrate 13 formed in a disk shape with guide grooves is placed in a sputtering device provided with an Al target, a Gd target, a Tb target, a Fe target, and a Co target. Then, the sputtering device is evacuated until the pressure reaches $1\times10^{-6}$ Torr. Thereafter, a mixed gas of argon and nitrogen is introduced, and electric power is supplied to the Al target, so as to form an 80 nm thick, AlN, transparent dielectric protection layer 14 on the substrate 13 at a gas pressure of $4\times10^{-3}$ Torr.

Secondly, the sputtering device is evacuated again until the pressure reaches $1\times10^{-6}$ Torr. Thereafter, argon gas is introduced, and electric power is supplied to the Gd target, the Fe target, and the Co target, so as to form a 25 nm thick, $Gd_{0.27}(Fe_{0.88}Co_{0.12})_{0.73}$, reproduction layer 1 on the transparent dielectric protection layer 14 at a gas pressure of $4\times10^{-3}$ Torr. It should be noted that the resultant reproduction layer 1 exhibits in-plane magnetization at room temperature, changes to perpendicular magnetization at 90° C., and has Curie temperature Tc1 of 260° C.

Thirdly, electric power is continuously supplied to the Gd target and the Fe target, so as to form a 15 nm thick, $Gd_{0.09}Fe_{0.91}$, first in-plane magnetized layer 2 on the reproduction layer 1 at a gas pressure of $4\times10^{-3}$ Torr. It should be noted that the resultant first in-plane magnetized layer 2 is an in-plane magnetized film having Curie temperature Tc2 of 90° C. and exhibiting magnetization within the in-plane from room temperature to Curie temperature Tc2.

Fourthly, electric power is continuously supplied to the Gd target, the Fe target, and the Co target, so as to form a 25 nm thick, $Gd_{0.31}(Fe_{0.78}Co_{0.22})_{0.69}$, first supplementary reproduction layer 3 on the first in-plane magnetized layer 2 at a gas pressure of $4\times10^{-3}$ Torr. It should be noted that the resultant first supplementary reproduction layer 3 exhibits in-plane magnetization at room temperature and changes to perpendicular magnetization at 160° C., and has Curie temperature Tc3 of 300° C.

Fifthly, electric power is continuously supplied to the Gd target and Fe target, so as to form a 25 nm thick, $Gd_{0.13}Fe_{0.87}$, second in-plane magnetized layer 4 on the first supplementary reproduction layer 3 at a gas pressure of $4\times10^{-3}$ Torr. It should be noted that the resultant second in-plane magnetized layer 4 has Curie temperature Tc4 of 160° C., and is a in-plane magnetized film exhibiting magnetization within the in-plane from room temperature to Curie temperature Tc4.

Sixly, electric power is continuously supplied to the Tb target, the Fe target, and the Co target, so as to form a 60 nm thick, $Gd_{0.13}Fe_{0.87}$, $Tb_{0.25}(Fe_{0.84}Co_{0.16})_{0.75}$, storage layer 7 on the second in-plane magnetized layer 4 at a gas pressure of $4\times10^{-3}$ Torr. It should be noted that the resultant storage layer 7 has a compensation temperature of 25° C. and Curie temperature of 270° C., and is a perpendicularly magnetized film exhibiting magnetization perpendicular to the film surface throughout the temperature range from room temperature to Curie temperature Tc7.

Seventhly, a mixed gas of argon and nitrogen is introduced, and electric power is supplied to the Al target, so as to form a 20 nm thick, AlN, protection layer 15 on the storage layer 7 at a gas pressure of $4\times10^{-3}$ Torr.

Now, referring to FIG. 4, the temperature dependence of the total magnetization of the reproduction layer 1, the first supplementary reproduction layer 3, and the storage layer 7 will be explained.

The reproduction layer 1 (c11) exhibits in-plane magnetization at 25° C. As temperature rises, the total magnetization decreases, and at 90° C. the reproduction layer 1 changes to perpendicular magnetization; at 270° C. (Curie temperature Tc1) the total magnetization becomes zero. The first supplementary reproduction layer 3 (c13) exhibits in-plane magnetization at 25° C. As temperature rises, the total magnetization decreases, and at 160° C. the first supplementary reproduction layer 3 changes to perpendicular magnetization; at 300° C. (Curie temperature Tc3) the total magnetization becomes zero. The storage layer 7 (c17) has a compensation temperature of 25° C.; the total magnetization, which is zero at 25° C., increases with rising temperature and reaches its maximum value around 160° C.; as temperature rises further, the total magnetization decreases and returns to zero at 270° C. (Curie temperature Tc7).

Figure 4:
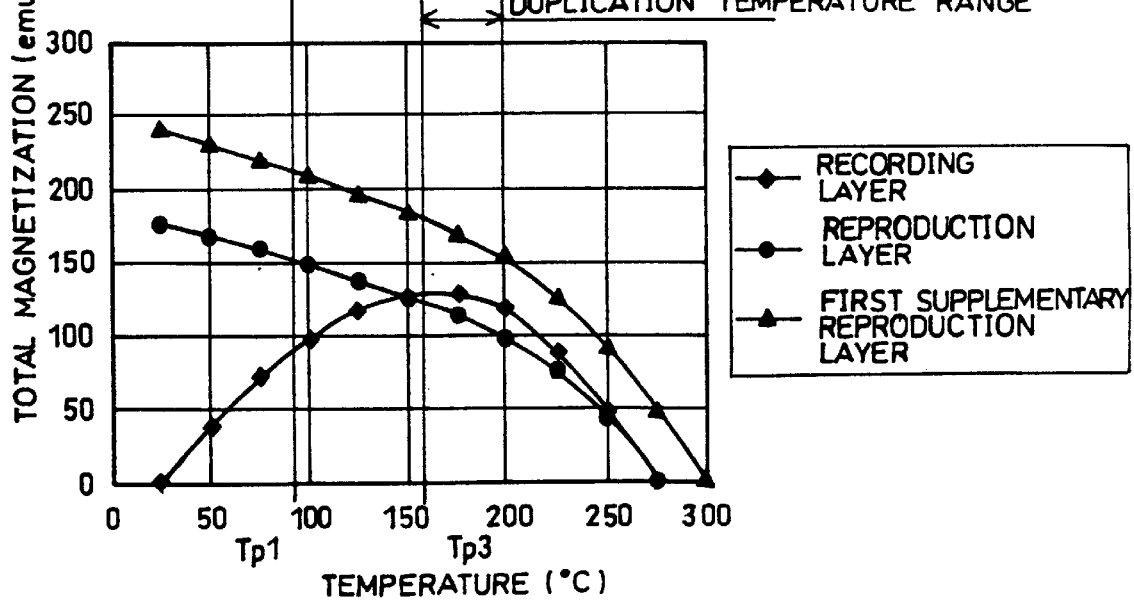
FIG. 4 is a graph showing total magnetization of the magneto-optical disk shown in FIG. 2 in relation to temperatures.

Further referring to FIG. 4, the total magnetization of the storage layer 7 is greater around 160° C. (transition temperature Tp3) at which the first supplementary reproduction layer 3 changes to perpendicular magnetization than around 90° C. (transition temperature Tp1) at which the reproduction layer 1 changes to perpendicular magnetization. The total magnetization of the first supplementary reproduction layer 3 around transition temperature Tp3 is greater than the total magnetization of the reproduction layer 1 around transition temperature Tp1.

When the various layers exhibit the foregoing magnetic characteristics, considering that the first supplementary reproduction layer 3 is positioned closer to the storage layer 7 than is the reproduction layer 1, the magnetostatic coupling between the first supplementary reproduction layer 3 and the storage layer 7 at transition temperature Tp3 is more secure than the magnetostatic coupling between the reproduction layer 1 and the storage layer 7 at transition temperature Tp1. As a result, at temperatures (duplication temperature range), around transition temperature Tp3, at which the magnetic information in the storage layer 7 is duplicated to the first supplementary reproduction layer 3, the magnetic information in the storage layer 7 is duplicated to the first supplementary reproduction layer 3 by the magnetostatic coupling, and the magnetic information duplicated to the first supplementary reproduction layer 3 is expanded and duplicated to the reproduction layer 1 by magnetostatic coupling in a desirable, stable manner.

(2) Playback Properties

The following description will explain playback properties of a magneto-optical disk (denoted as sample #1) fabricated by the foregoing method.

Specifically, results of evaluation will be presented where information was recorded and reproduced on the sample #1 through a magneto-optical pickup head using a semiconductor laser having a wavelength of 680 nm at a linear velocity of 2.5 m/s.

First of all, a recording/playback laser of 7.2 mW was continuously projected while applying a recording magnetic field modulated at ±15 kA/m, so as to form a repetitive pattern of upward and downward magnetization in the storage layer 7 in accordance with the direction of the recording magnetic field. Then, by altering the modulation frequency of the recording magnetic field, a magnetic domain pattern was recorded with mark lengths varying from 0.2 µm to 0.5 µm. Here, the mark length was equal to the length of the magnetic recording domain and also equal to half the pitch between two adjacent magnetic recording domains.

Figure 5:
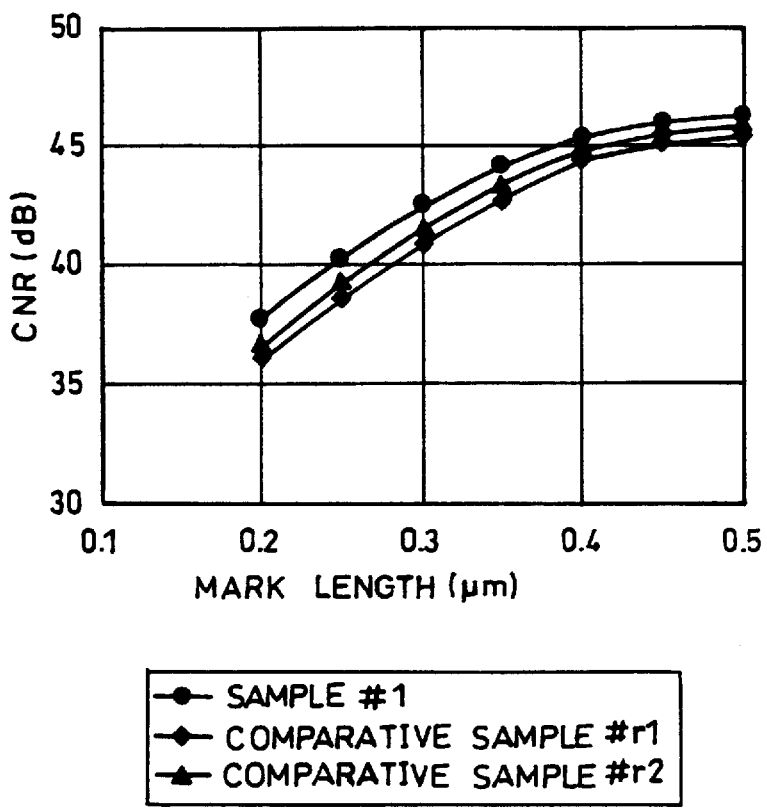
FIG. 5 is a graph showing signal-to-noise ratios of the magneto-optical disk shown in FIG. 3 in relation to mark lengths.

FIG. 5 is a graph showing the mark length dependence of the CNR (signal-to-noise ratio) of sample #1, measured by continuously projecting a recording/playback laser of 2.4 mW. For comparison, FIG. 5 also shows, as graphs, the mark length dependence of the CNR of the magneto-optical disk (denoted as comparative sample #r1), which was mentioned earlier in reference to conventional technology (see FIG. 17 and FIG. 18), wherein the magnetic domain expansion reproduction is enabled by exchange coupling established between the storage layer 207 and the reproduction layer 201 and between the storage layer 207 and the supplementary reproduction layer 203, and the mark length dependence of the CNR of the magneto-optical disk (denoted as comparative sample #r2) wherein an AlN non-magnetic intermediate layer is deposited in place of the first in-plane magnetized layer 2 and the second in-plane magnetized layer 4 of sample #1.

Figure 17:
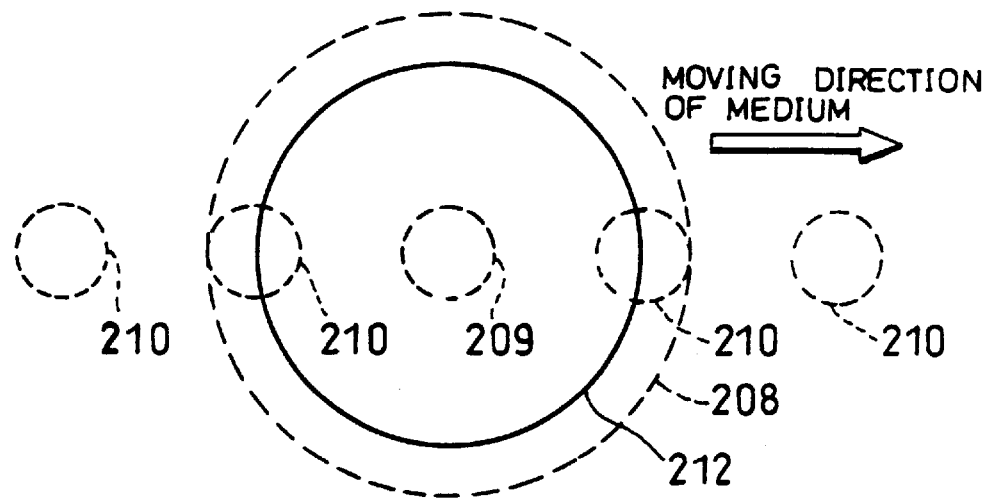
FIG. 17 is an explanatory drawing illustrating playback of a conventional magneto-optical storage medium.
Figure 18:
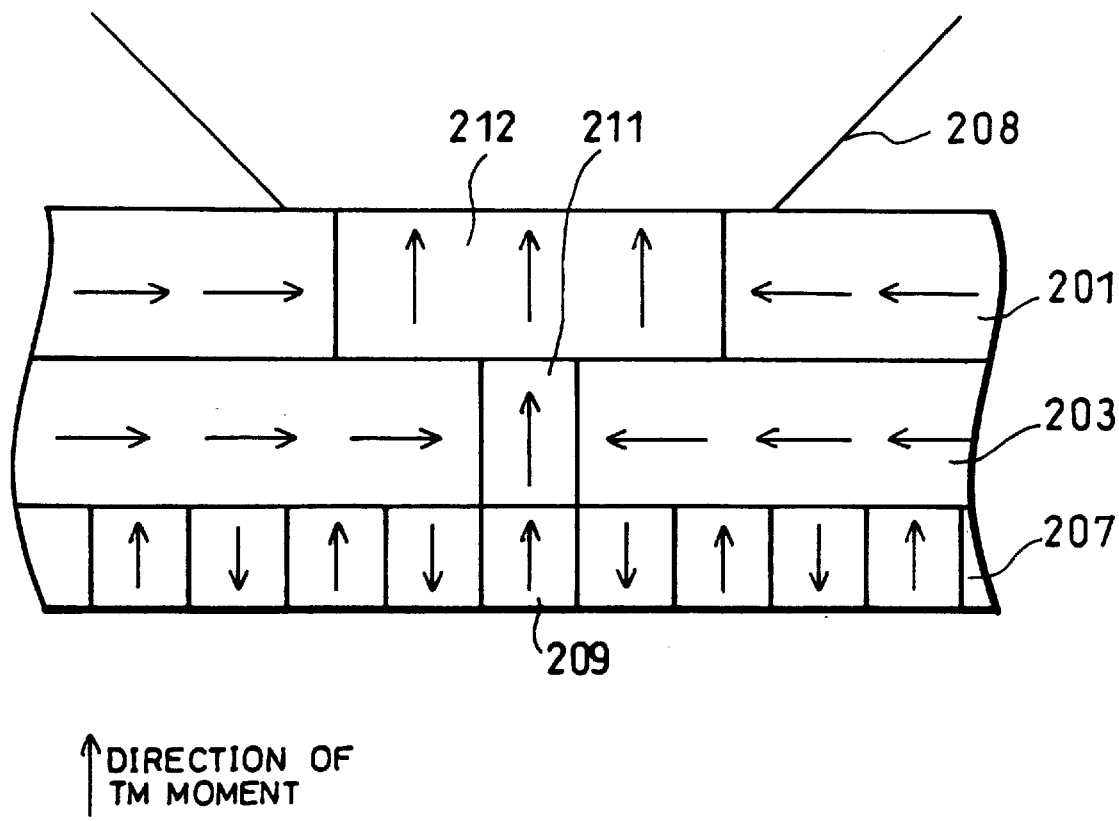
FIG. 18 is an explanatory drawing showing the magnetization of a conventional magneto-optical storage medium during playback.
Figure 19:
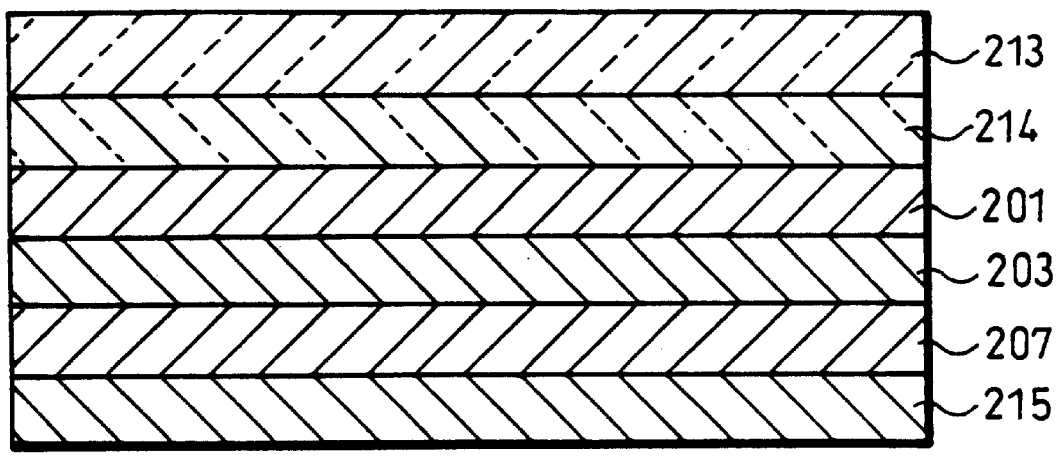
FIG. 19 is a cross-sectional view schematically showing an arrangement of a magneto-optical disk, which is an application of the magneto-optical storage medium shown in FIG. 18.

As shown in FIG. 17, comparative sample #r1 is a magneto-optical disk including an 80 nm thick, AlN layer as a transparent dielectric protection layer 214, a 100 nm thick, $Gd_{0.28}(Fe_{0.67}Co_{0.33})_{0.72}$ layer as a reproduction layer 201, a 100 nm thick, $Gd_{0.31}(Fe_{0.67}Co_{0.33})_{0.69}$ layer as a supplementary reproduction layer 203, a 40 nm thick, $Tb_{0.25}(Fe_{0.84}Co_{0.16})_{0.75}$ layer as a storage layer 207, and a 20 nm thick, AlN layer as a protection layer 215. It should be noted that in comparative sample #r1, the reproduction layer 201 and the supplementary reproduction layer 203 change to perpendicular magnetization at 100° C. and 150° C. respectively.

Here, in comparative sample #r1, exchange coupling is established between the storage layer 207 and the reproduction layer 201 and between the storage layer 207 and the supplementary reproduction layer 203. Therefore, unless the reproduction layer 201 and the supplementary reproduction layer 203 are as thick as 100 nm as mentioned previously, it is impossible to impart properties such that the layers exhibit an in-plane magnetization at room temperature and change to perpendicular magnetization with rising temperature. Consequently, comparative sample #r1 is thick, and requires a greater laser power for playback than sample #1. Comparative sample #r1 was therefore evaluated using a recording laser power of 9.4 mW and a reproduction laser power of 3.6 mW.

Referring to FIG. 5, a comparison of CNRs between sample #1 and comparative sample #r1 reveals that sample #1 had higher CNR values at all mark lengths. This is a result of (1) more stable in-plane magnetization of the reproduction layer 1 and the first supplementary reproduction layer 3 due to the first in-plane magnetized layer 2 and the second in-plane magnetized layer 4 in sample #1 and (2) improved reproduction resolution achieved by the change of the reproduction layer 1 and the first supplementary reproduction layer 3 from an in-plane magnetization to perpendicular magnetization, which took place more abruptly in sample #1, wherein the reproduction layer 1, the supplementary reproduction layer 2, and the storage layer 7 were coupled through magnetostatic forces, than in comparative sample #r1.

Hence, it would be understood from the comparison that sample #1 of the present embodiment is a magneto-optical disk exhibiting more satisfactory reproduction signal quality and playback sensitivity than comparative sample #r1.

Comparative sample #r2 includes an AlN, non-magnetic intermediate layer deposited in place of, and with the same thicknesses as, the first in-plane magnetized layer 2 and the second in-plane magnetized layer 4 of sample Comparative sample #r2 was evaluated using a recording laser power of 7.6 mW and a reproduction laser power of 2.6 mW.

Referring to FIG. 5, a comparison of CNRs between sample #1 and comparative sample #r2 reveals that sample #1 had higher CNR values at all mark lengths. This is because (1) the reproduction layer 1 and the first supplementary reproduction layer 3 in sample #1 changed from in-plane magnetization to perpendicular magnetization more abruptly than in comparative sample #r2 due to the reproduction layer 1 and the first supplementary reproduction layer 3 remaining securely coupled to the in-plane magnetized film through exchange forces up to around the temperature at which the layers 1 and 3 changed from in-plane magnetization to perpendicular magnetization, and (2) stable magnetic domain expansion reproduction was enabled due to the second in-plane magnetized layer 4 reducing those leaking magnetic fluxes arising from the storage layer 7 below transition temperature Tp3.

As detailed in the foregoing, the magneto-optical storage medium of the present embodiment can reproduce from the storage layer 7 signals whose cycles do not exceed diffraction limits of light without reducing the amplitudes of reproduced signals, by expanding and duplicating the magnetic information stored in the storage layer 7 to the reproduction layer 1 with high resolution.

Further, the magneto-optical storage medium of the present embodiment is adjusted in terms of magnetic properties of the reproduction layer 1, the first supplementary reproduction layer 3, and the storage layer 7 so that the storage layer 7 is magnetostatically coupled to the reproduction layer 1 at transition temperature Tp1 more securely than to the first supplementary reproduction layer 3 at transition temperature Tp3. As a result, magnetostatic coupling is optimized between the storage layer 7 and the reproduction layer 1 and also between the storage layer 7 and the first supplementary reproduction layer 3, enabling magnetic domain duplication and magnetic domain expansion reproduction to be performed in stable manners.

Embodiment 2

Now, referring to FIG. 6 through FIG. 9, the following description will discuss another embodiment in accordance with the present invention. Here, for convenience, members of the present embodiment that have the same arrangement and function as members of embodiment 1, and that are mentioned in embodiment 1 are indicated by the same reference numerals and description thereof is omitted.

Figure 7:
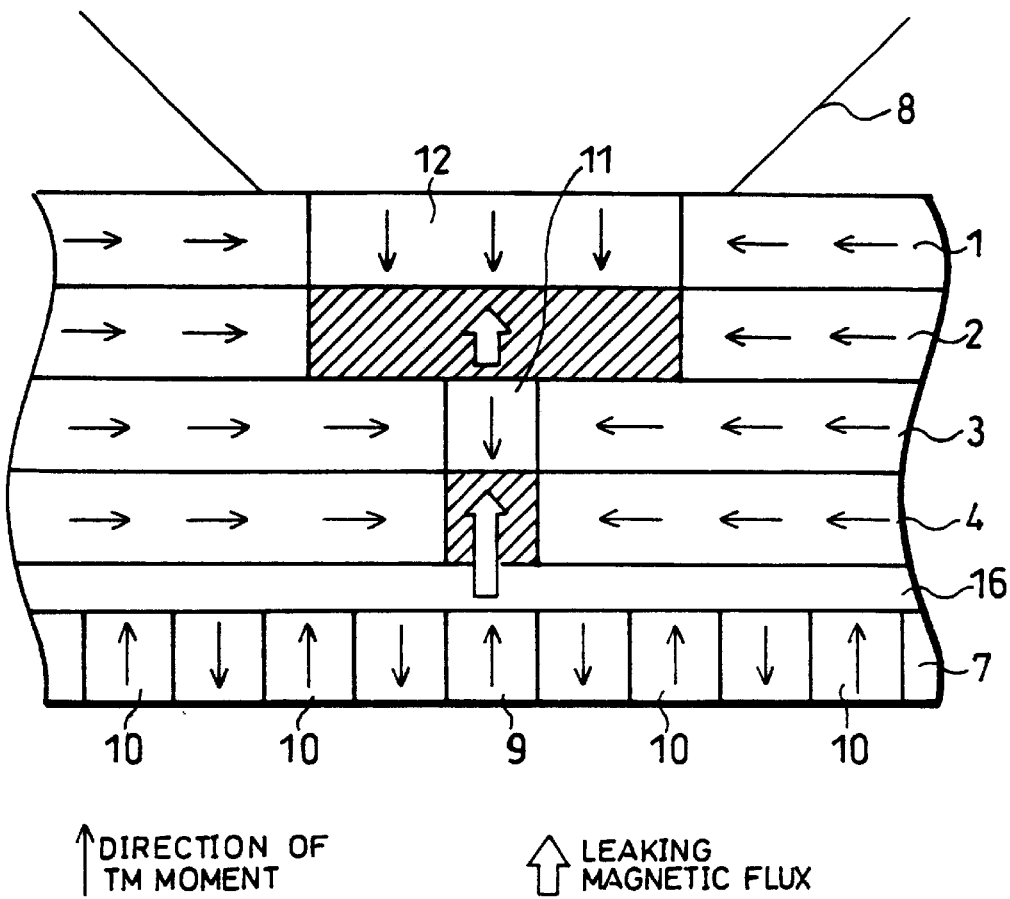
FIG. 7 is an explanatory drawing showing the magnetization a magneto-optical storage medium of a further embodiment in accordance with the present invention during playback.

As shown in FIG. 7, the magneto-optical storage medium of the present embodiment is arranged so as to include a non-magnetic intermediate layer 16 interposed between the second in-plane magnetized layer 4 and the storage layer 7 of the magneto-optical storage medium (FIG. 2) of embodiment 1.

Figure 6:
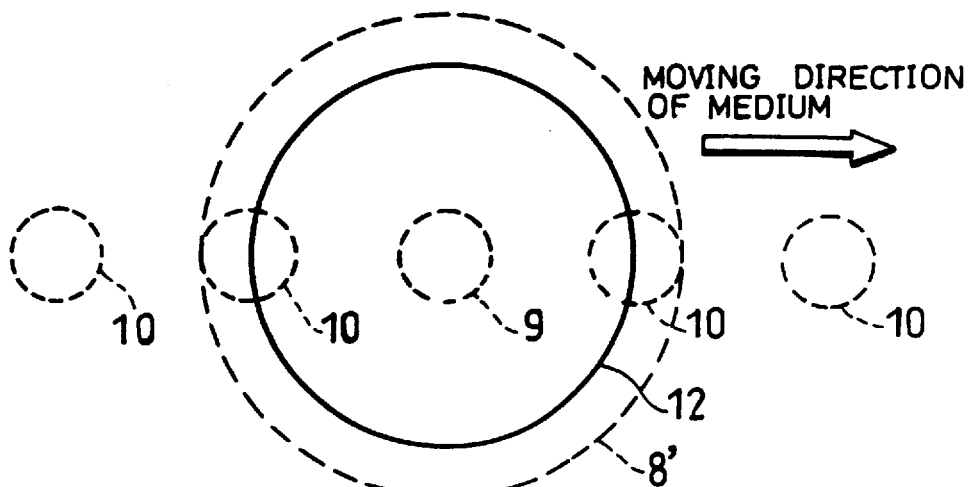
FIG. 6 is an explanatory drawing illustrating playback of a magneto-optical storage medium of another embodiment in accordance with the present invention.

First of all, referring to FIG. 6 and FIG. 7, principles in playback of the magneto-optical storage medium of the present embodiment will be explained. FIG. 6 and FIG. 7 are plan and cross-sectional views, respectively, schematically illustrating the magnetization of the magneto-optical storage medium during playback.

As shown in FIG. 7, the magneto-optical storage medium of the present embodiment has a structure including a reproduction layer 1, a first in-plane magnetized layer 2, a first supplementary reproduction layer 3, a second in-plane magnetized layer 4, a non-magnetic intermediate layer 16, and a storage layer 7, the layers sequentially overlapping one another. It should be noted with regard to the arrows in FIG. 7 that the black one denotes the directions of the magnetic moment of a transition metal (TMs), and the open one denotes the direction of a leaking magnetic flux.

The non-magnetic intermediate layer 16 is made from a non-magnetic material, and interposed between the second in-plane magnetized layer 4 and the storage layer 7 to block exchange coupling between the second in-plane magnetized layer 4 and the storage layer 7.

As shown in FIG. 6 and FIG. 7, upon heating the magneto-optical storage medium using a light beam 8 (light beam spot 8'), the magnetic recording domain 9 formed in the storage layer 7 is duplicated to the first supplementary reproduction layer 3 through magnetostatic coupling. The magnetic domain 11 formed in the first supplementary reproduction layer 3 through the duplication is in turn expanded and duplicated to the reproduction layer 1 through magnetostatic coupling. Then, the magnetic domain 12 formed in the reproduction layer 1 through the expansion duplication is reproduced. The principles in reproduction are basically the same as those mentioned earlier in embodiment 1.

Difference, however, lies where in the present embodiment the non-magnetic intermediate layer 16 is interposed between the second in-plane magnetized layer 4 and the storage layer 7 so as to block the exchange coupling between the second in-plane magnetized layer 4 and the storage layer 7. Hence, use of a thinner second in-plane magnetized layer 4 still produces effects similar to those mentioned earlier in embodiment 1. In other words, in the magneto-optical storage medium, the provision of the non-magnetic intermediate layer 16 stabilizes the in-plane magnetization of the first supplementary reproduction layer 3 below transition temperature Tp3 even when the second in-plane magnetized layer 4 has a reduced thickness. Therefore, the storage layer 7 and the first supplementary reproduction layer 3 are coupled securely to each other only where the layers 7 and 3 are heated, improving reproduction resolution in the first supplementary reproduction layer 3.

Accordingly, in the magneto-optical storage medium, the magnetic domain 11 formed in the first supplementary reproduction layer 3 through duplication at an improved reproduction resolution is expanded and duplicated to the reproduction layer 1; thereby a higher reproduction resolution and more satisfactory reproduction signal quality are obtainable. Therefore, with the magneto-optical storage medium, satisfactory reproduction signal quality can be obtained even at small mark lengths by improving the reproduction resolution produced by the first supplementary reproduction layer 3, while maintaining satisfactory recording sensitivity.

Next, a magneto-optical disk, which is an application of the magneto-optical storage medium, will be explained in more specific terms.

Figure 8:
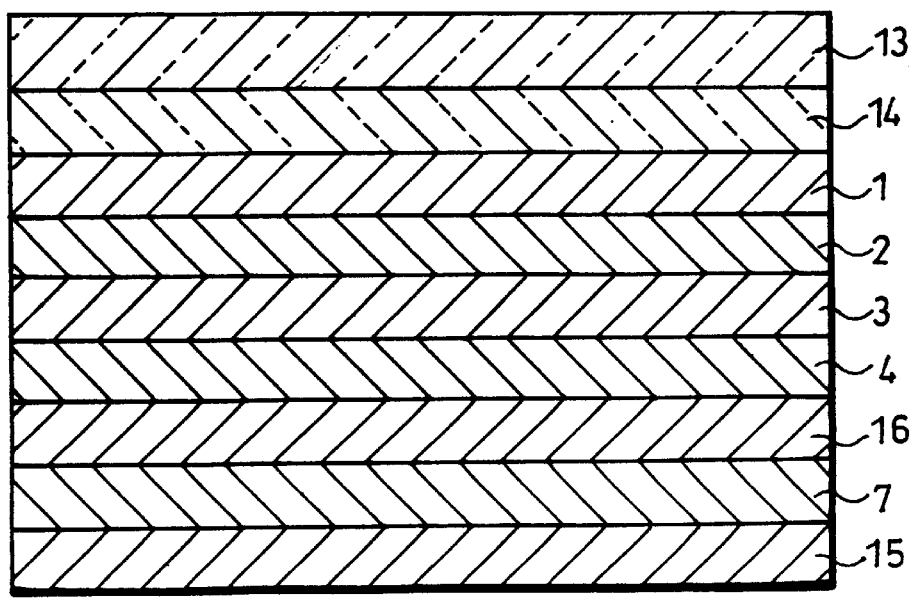
FIG. 8 is a cross-sectional view schematically showing an arrangement of a magneto-optical disk, which is an application of the magneto-optical storage medium shown in FIG. 7.

As shown in FIG. 8, the magneto-optical disk includes a transparent dielectric protection layer 14, a reproduction layer 1, a first in-plane magnetized layer 2, a first supplementary reproduction layer 3, a second in-plane magnetized layer 4, a non-magnetic intermediate layer 16, a storage layer 7, and a protection layer 15, all the layers sequentially overlapping on a substrate 13. It should be noted that the same materials as in embodiment 1 can be used in the same manner for the substrate 13, the transparent dielectric protection layer 14, the reproduction layer 1, the first in-plane magnetized layer 2, the first supplementary reproduction layer 3, the second in-plane magnetized layer 4, the storage layer 7, and the protection layer 15.

However, in the present embodiment, since the non-magnetic intermediate layer 16 blocks the exchange coupling between the second in-plane magnetized layer 4 and the storage layer 7, the thickness of the second in-plane magnetized layer 4 may be smaller than that of the magneto-optical disk mentioned earlier in embodiment 1 (see FIG. 3). Specifically, the thickness of the second in-plane magnetized layer 4, which was required to be not less than 20 nm in embodiment 1, should be specified not less than 5 nm in embodiment 2. If the second in-plane magnetized layer 4 is less than 5 nm, the second in-plane magnetized layer 4 is too thin to function properly to retain the first supplementary reproduction layer 3 in an in-plane magnetization where temperature is not elevated, failing to improve reproduction resolution.

The non-magnetic intermediate layer 16 is formed to block exchange coupling between the storage layer 7 and the second in-plane magnetized layer 4, and may be fabricated from a non-magnetic metal, such as Al, Si, Ta, Ti, Au, or Cu, or a non-magnetic metal alloy of these non-magnetic metals. In addition, AlN, SiN, AlSiN, and another non-magnetic dielectric may be used.

The thickness of the non-magnetic intermediate layer 16 is preferably specified not less than 0.5 nm. If the non-magnetic intermediate layer 16 is less than 0.5 nm, the non-magnetic intermediate layer 16 cannot be formed in a uniform manner, failing to block the exchange coupling between the storage layer 7 and the second in-plane magnetized layer 4.

The combined thicknesses of the second in-plane magnetized layer 4 and the non-magnetic intermediate layer 16 is preferably specified not more than 40 nm. If the combined thickness exceeds 40 nm, the increased distance by which the first supplementary reproduction layer 3 is separated from the storage layer 7 weakens the magnetostatic coupling forces between the first supplementary reproduction layer 3 and the storage layer 7. This poses an obstacle in achieving stable magnetic domain duplication from the storage layer 7 to the first supplementary reproduction layer 3, and degrades reproduction signal quality.

Thermal properties of the medium can be improved by additionally providing a thermodiffusive metal layer made of, for example, Al, AlTa, AlTi, AlCr, AlNi, AlCo, or Cu on the protection layer 15. A ultraviolet-ray-curing resin layer, a thermocuring resin layer, or a lubricant layer may be also provided further on the protection layer 15 or on the thermodiffusive metal layer.

Incidentally, to allow recording by means of a weak magnetic field, a supplementary storage layer may be provided in direct contact with the storage layer 7 by deposition, the supplementary storage layer being made of a perpendicularly magnetized film, composed of, for example, GdFeCo, GdTbFeCo, or GdDyFeCo, that has smaller coercive forces than those of the storage layer 7 and a higher Curie temperature than Curie temperature Tc7 of the storage layer 7.

In the following description, a fabrication method of the magneto-optical disk, as well as its playback characteristics, will be explained.

(1) Fabrication Method of Magneto-Optical Disk

The following description will explain a fabrication method of the magneto-optical disk shown in FIG. 8.

First, a polycarbonate substrate 13 formed in a disk shape with guide grooves is placed in a sputtering device provided with an AlSi target, a Gd target, a Tb target, a Fe target, and a Co target.

Then, an 80 nm thick, AlSiN, transparent dielectric protection layer 14 is formed on the substrate 13 in a similar manner to the magneto-optical disk of embodiment 1 (see FIG. 3). Subsequently, a 25 nm thick, $Gd_{0.27}(Fe_{0.88}Co_{0.12})_{0.73}$, reproduction layer 1 is formed on the transparent dielectric protection layer 14, followed by formation of a 15 nm thick, $Gd_{0.09}Fe_{0.91}$, first in-plane magnetized layer 2 on the reproduction layer 1. Further, a 25 nm thick, $Gd_{31}(Fe_{0.78}Co_{0.22})_{0.69}$, first supplementary reproduction layer 3 is formed on the first in-plane magnetized layer 2. Then, a 15 nm thick, $Gd_{0.13}Fe_{0.87}$ second in-plane magnetized layer 4 is formed on the first supplementary reproduction layer 3. It should be noted that the resultant second in-plane magnetized layer 4 is an in-plane magnetized film having Curie temperature Tc4 of 160° C. and exhibiting magnetization within the in-plane from room temperature to Curie temperature Tc4.

Secondly, electric power is continuously supplied to the AlSi alloy target, so as to form a 1 nm thick, AlSi, non-magnetic intermediate layer 16 on the second in-plane magnetized layer 4 at a gas pressure of $4\times10^{-3}$ Torr.

Thirdly, a 60 nm thick, $Tb_{0.25}(Fe_{0.84}Co_{0.16})_{0.75}$, storage layer 7 is formed on the non-magnetic intermediate layer 16 in a similar manner as in the magneto-optical disk (FIG. 3) mentioned earlier in embodiment 1. Subsequently, a 20 nm thick, AlSiN, protection layer 15 is formed on the storage layer 7.

(2) Playback Properties

The following description will explain playback properties of a magneto-optical disk (denoted as sample #2). Specifically, results of evaluation will be presented where information was recorded on the magneto-optical disk and reproduced through a magneto-optical pickup head using a semiconductor laser having a wavelength of 680 nm at a linear velocity of 2.5 m/s.

First of all, a recording/playback laser of 6.6 mW was continuously projected while applying a recording magnetic field modulated at ±15 kA/m, so as to form a repetitive pattern of upward and downward magnetization in the storage layer 7 in accordance with the direction of the recording magnetic field. Then, by altering the modulation frequency of the recording magnetic field, a magnetic domain pattern was recorded with mark lengths varying from 0.2 $\mu$m to 0.5 $\mu$m. Here, the mark length was equal to the length of the magnetic recording domain and also equal to half the pitch between two adjacent magnetic recording domains.

Figure 9:
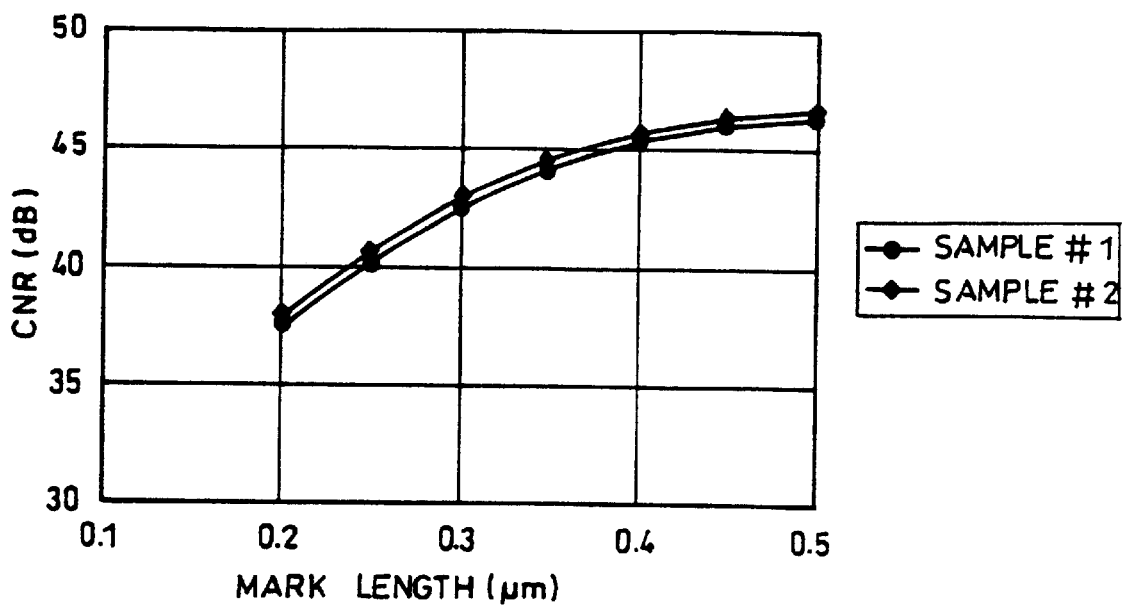
FIG. 9 is a graph showing signal-to-noise ratios of the magneto-optical disk shown in FIG. 8 in relation to mark lengths.

FIG. 9 is a graph showing the mark length dependence of the CNR (signal-to-noise ratio) of sample #2, measured by continuously projecting a recording/playback laser of 2.2 mW. For comparison, FIG. 9 also shows, as a graph, the mark length dependence of the CNR of the magneto-optical disk of embodiment 1 shown in FIG. 3, that is, sample #1, having a thick second in-plane magnetized layer 4, but no non-magnetic intermediate layer 16 unlike sample #2.

Referring to FIG. 9, a comparison of CNRs between sample #2 and sample #1 reveals that sample #2 exhibited substantially the same level of CNR as sample #1. In other words, it is shown that in sample #2, the provision of the non-magnetic intermediate layer 16 improved reproduction resolution and enabled satisfactory reproduction signal quality to be achieved at short mark lengths even when the second in-plane magnetized layer 4 used was thinner than in sample #1.

As detailed in the foregoing, sample #2 of the present embodiment produces satisfactory reproduction signal quality even when the second in-plane magnetized layer 4 used has a reduced thickness.

In the present embodiment, as explained in the foregoing, the magneto-optical storage medium of the present embodiment can reproduce from the storage layer 7 signals whose cycles do not exceed diffraction limits of light without reducing the amplitudes of reproduced signals, by expanding and duplicating the magnetic information stored in the storage layer 7 to the reproduction layer 1. In the magneto-optical storage medium, the non-magnetic intermediate layer 16 blocks exchange coupling between the second in-plane magnetized layer 4 and the storage layer 7, allowing reduction in the thickness of the second in-plane magnetized layer 4 and hence reduction in recording and reproduction power.

The magneto-optical storage medium of the present embodiment is further adjusted in terms of magnetic properties of the reproduction layer- 11 the first supplementary reproduction layer 3, and the storage layer 7 so that the storage layer 7 is magnetostatically coupled to the reproduction layer 1 at transition temperature Tp1 more securely than to the first supplementary reproduction layer 3 at transition temperature Tp3.

As a result, in the magneto-optical storage medium, magnetostatic coupling is optimized between the storage layer 7 and the reproduction layer 1 and also between the storage layer 7 and the first supplementary reproduction layer 3, enabling magnetic domain duplication and magnetic domain expansion reproduction to be performed in stable manners.

Embodiment 3

The following description will discuss a further embodiment in accordance with the present invention.

The magneto-optical storage medium of the present embodiment employs the same arrangement and playback principles as the magneto-optical storage medium (FIG. 7) of embodiment 2, except that the first supplementary reproduction layer 3 of the present embodiment is composed of GdDyFeCo, i.e., a material based on the GdFeCo used in embodiment 2 with Dy replacing part of the Gd.

A magneto-optical disk including the above arrangement, i.e., a magneto-optical disk including the same arrangement as the magneto-optical disk (FIG. 8) of embodiment 2 except that the first supplementary reproduction layer 3 was composed of GdDyFeCo, was fabricated and subjected to recording and reproduction processes. Information was recorded and reproduced on the magneto-optical disk under the recording and reproduction conditions detailed in embodiment 2. Specifically, a recording/playback laser of 6.6 mW was continuously projected through a magneto-optical pickup head using a semiconductor laser having a wavelength of 680 nm at a linear velocity of 2.5 m/s, while applying a recording magnetic field modulated at 15 kA/m, so as to form a repetitive pattern of upward and downward magnetization in the storage layer 7 in accordance with the direction of the recording magnetic field. During playback, measurement was performed by continuously projecting a recording/playback laser of 2.2 mW.

Tables 1 and 2 below show results of measurement of the Curie temperature of the first supplementary reproduction layer 3 and the CNR at a mark length of 0.2 $\mu$m when the first supplementary reproduction layer 3 was composed of GdDyFeCo, i.e., a material based on the GdFeCo used in embodiment 2 with Dy replacing part of the Gd, and transition temperature Tp3 at which the first supplementary reproduction layer 3 changed to perpendicular magnetization was maintained at a constant value of 160° C. Here, the mark length was equal to the length of the magnetic recording domain and also equal to half the pitch between two adjacent magnetic recording domains.

TABLE 1

| Disk | Composition of First Supplementary Reproduction Layer | Transition Temp. (° C.) | Curie Temp. (° C.) | CNR (dB) |
| --- | --- | --- | --- | --- |
| No. 1-0 | $Gd_{0.31}(Fe_{0.78}Co_{0.22})_{0.69}$ | 160 | 300 | 38.1 |
| No. 1-1 | $(Gd_{0.99}Dy_{0.01})_{0.27}(Fe_{0.50}Co_{0.50})_{0.73}$ | 160 | 330 | 36.5 |
| No. 1-2 | $(Gd_{0.98}Dy_{0.02})_{0.28}(Fe_{0.50}Co_{0.50})_{0.72}$ | 160 | 330 | 38.8 |
| No. 1-3 | $(Gd_{0.92}Dy_{0.08})_{0.30}(Fe_{0.50}Co_{0.50})_{0.70}$ | 160 | 325 | 39.4 |
| No. 1-4 | $(Gd_{0.88}Dy_{0.12})_{0.32}(Fe_{0.50}Co_{0.50})_{0.68}$ | 160 | 320 | 40.1 |
| No. 1-5 | $(Gd_{0.84}Dy_{0.16})_{0.32}(Fe_{0.50}Co_{0.50})_{0.65}$ | 160 | 315 | 40.3 |
| No. 1-6 | $(Gd_{0.78}Dy_{0.22})_{0.37}(Fe_{0.50}Co_{0.50})_{0.63}$ | 160 | 310 | 39.6 |
| No. 1-7 | $(Gd_{0.72}Dy_{0.28})_{0.40}(Fe_{0.50}Co_{0.50})_{0.60}$ | 160 | 305 | 39.1 |
| No. 1-8 | $(Gd_{0.66}Dy_{0.34})_{0.43}(Fe_{0.50}Co_{0.50})_{0.57}$ | 160 | 290 | 37.6 |

Table 1 shows results of measurement on magneto-optical disks including a first supplementary reproduction layer 3 with a fixed Fe/Co ratio and variable Dy/RE ratios. To maintain transition temperature Tp3 at 160° C., the composition was adjusted by varying the ratio of the rare earth metals and the transition metals. The magneto-optical disk identified as No. 1-0 was identical to sample #2 of embodiment 2, i.e., a magneto-optical disk including a first supplementary reproduction layer 3 composed of GdFeCo.

As shown in Table 1, disk No. 1-1 exhibited a low CNR value, compared to disk No. 1-0 (sample #2) including a first supplementary reproduction layer 3 composed of GdFeCo. This was because in disk No. 1-1, perpendicular magnetization was not stable around transition temperature Tp3 due to the Dy/RE ratio as low as 1%, despite that Co made up as much as 50% of the transition metal content of the GdDyFeCo composing the first supplementary reproduction layer 3 and also that Curie temperature was as high as 330° C.

By contrast, the magneto-optical disks identified as disks No. 1-2 to No. 1-7, i.e., those magneto-optical disks with a Dy/RE ratio in a range of 2% to 28%, boasted CNRs that were higher by 0.5 dB or greater than that of disk No. 1-0 including a first supplementary reproduction layer 3 composed of GdFeCo.

Reasons are (1) the addition of Dy increased the perpendicular magnetic anisotropy of the first supplementary reproduction layer 3 and therefore produced relatively stable perpendicular magnetization below transition temperature Tp3 when compared with GdFeCo, and (2) the increase in the perpendicular magnetic anisotropy of the first supplementary reproduction layer 3 enabled stable perpendicular magnetization to be retained despite a high Co content and high Curie temperature, and therefore increased the total magnetization of the first supplementary reproduction layer 3 around transition temperature Tp3, enhancing magnetostatic coupling forces between the first supplementary reproduction layer 3 and the reproduction layer 1 and also between the first supplementary reproduction layer 3 and the storage layer 7.

By contrast, the magneto-optical disk identified as disk No. 1-8 produced a CNR lower than that of disk No. 1-0. This is because the first supplementary reproduction layer 3 had increased coercive forces above transition temperature Tp3 at which the first supplementary reproduction layer 3 changed to perpendicular magnetization due to the high Dy/RE ratio of 34%, and therefore was less likely to follow the leaking magnetic fluxes arising from the storage layer during playback, preventing a target magnetic recording domain 9 in the storage layer from duplicating to the magnetic domain 11 in the first supplementary reproduction layer 3 in a stable manner.

TABLE 2

| Disk | Composition of First Supplementary Reproduction Layer | Transition Temp. (° C.) | Curie Temp. (° C.) | CNR (dB) |
|---|---|---|---|---|
| No. 2-0 | $Gd_{0.31}(Fe_{0.78}Co_{0.22})_{0.69}$ | 160 | 300 | 38.1 |
| No. 2-1 | $(Gd_{0.84}Dy_{0.16})_{0.38}(Fe_{0.50}Co_{0.50})_{0.62}$ | 160 | 260 | 32.2 |
| No. 2-2 | $(Gd_{0.84}Dy_{0.16})_{0.37}(Fe_{0.50}Co_{0.50})_{0.63}$ | 160 | 280 | 38.6 |
| No. 2-3 | $(Gd_{0.84}Dy_{0.16})_{0.36}(Fe_{0.50}Co_{0.50})_{0.64}$ | 160 | 300 | 39.7 |
| No. 2-4 | $(Gd_{0.84}Dy_{0.16})_{0.35}(Fe_{0.50}Co_{0.50})_{0.65}$ | 160 | 325 | 40.3 |
| No. 2-5 | $(Gd_{0.84}Dy_{0.16})_{0.33}(Fe_{0.50}Co_{0.50})_{0.67}$ | 160 | 340 | 40.6 |
| No. 2-6 | $(Gd_{0.84}Dy_{0.16})_{0.30}(Fe_{0.50}Co_{0.50})_{0.70}$ | 160 | 350 | 39.2 |
| No. 2-7 | $(Gd_{0.84}Dy_{0.16})_{0.28}(Fe_{0.50}Co_{0.50})_{0.72}$ | — | 350 | 21.5 |

Table 2 shows results of measurement on magneto-optical disks, fabricated based on a magneto-optical disk including a first supplementary reproduction layer composed of $(Gd_{0.84}Dy_{0.16})_{0.35}(Fe_{0.50}Co_{0.50})_{0.65}$ which showed the highest CNR in the measurement as in Table 1, with a fixed Dy/RE ratio of 16% and variable Fe/Co ratios. Here, to maintain transition temperature Tp3 at 160° C., the composition was adjusted by varying the ratio of the rare earth metals and the transition metals. The magneto-optical disk identified as No. 2-0 was identical to sample #2 of embodiment 2, i.e., a magneto-optical disk including a first supplementary reproduction layer 3 composed of GdFeCo.

As shown in Table 2, disk No. 2-1 exhibited a low CNR value, compared to disk No. 2-0 (sample #2). This was because in disk No. 2-1, the total magnetization of the first supplementary reproduction layer 3 decreased around transition temperature Tp3 of the first supplementary reproduction layer 3 due to the low Co/TM ratio of 30% and the low Curie temperature of the first supplementary reproduction layer 3 of 260° C. This caused the magnetostatic coupling between the storage layer 7 and the first supplementary reproduction layer 3 around transition temperature Tp3 to be weakened compared to that of disk No. 2-0, thereby reducing the CNR.

Meanwhile, in disk No. 2-2 and disk No. 2-3, where the Co/TM ratios were 35t and 400 respectively, the Curie temperature of the first supplementary reproduction layer 3 was lower than, or almost equal to, the Curie temperature of the first supplementary reproduction layer 3 in disk No. 2-0; however, the CNRs were higher than that of disk No. 2-0 by 0.5 dB or greater. This is because the addition of Dy increased the perpendicular magnetic anisotropy of the first supplementary reproduction layer 3 and therefore produced relatively stable perpendicular magnetization above transition temperature Tp3. It is hence understood that the addition of Dy stabilizes perpendicular magnetization and enables duplication of magnetic domains with high resolution.

The magneto-optical disk identified as disk No. 2-4 through disk No. 2-6, i.e., those magneto-optical disks with a Co/TM ratio in a range of 50% to 70%, produced CNRs higher than that of disk No. 2-0 by 1 dB or greater.

This is because (1) the addition of Dy increased the perpendicular magnetic anisotropy of the first supplementary reproduction layer 3 and therefore produced relatively stable perpendicular magnetization above transition temperature Tp3, and (2) the increased Co/TM ratio elevated the Curie temperature of the first supplementary reproduction layer 3 and thereby enhanced the total magnetization of the first supplementary reproduction layer 3 around transition temperature Tp3 and hence enhanced magnetostatic coupling forces between the first supplementary reproduction layer 3 and the reproduction layer 1 and also between the first supplementary reproduction layer 3 and the storage layer 7.

By contrast, in magneto-optical disk No. 2-7 where Co made up 80% of the transition metal content, the CNR dropped significantly. This is because the first supplementary reproduction layer 3 could not change from in-plane magnetization to perpendicular magnetization due to the Co/TM ratio that was too high.

From the foregoing, it is understood that the first supplementary reproduction layer 3, when composed of GdDyFeCo with a variable Dy/RE ratio from 2% to 28% and a variable Co/TM ratio from 35% to 70%, exhibits perpendicular magnetization with increased stability around transition temperature Tp3 at which the first supplementary reproduction layer 3 changes to perpendicular magnetization.

If further adjusted within this composition range so as to contain a high Co content with respect to the transition metal content, the first supplementary reproduction layer 3 will have an elevated Curie temperature and increased total magnetization. Thus, magnetostatic coupling forces are enhanced between the first supplementary reproduction layer 3 and the reproduction layer 1 and also between the first supplementary reproduction layer 3 and the storage layer 7, effecting stable magnetic domain duplication and magnetic domain expansion reproduction. The first supplementary reproduction layer 3 thus adjusted forms a magneto-optical storage medium for magnetic domain expansion reproduction scheme with an increased CNR.

The present embodiment so far exclusively referred to the use of GdDyFeCo as the material composing the first supplementary reproduction layer 3 of the magneto-optical storage medium of embodiment 2; however, the arrangement is, of course, applicable to the magneto-optical storage medium of embodiment 1 in a similar manner.

Embodiment 4

The following description will discuss another embodiment in accordance with the present invention.

The magneto-optical storage medium of the present embodiment employs the same arrangement and playback principles as the magneto-optical storage medium (FIG. 7) of embodiment 2, except that the first supplementary reproduction layer 3 of the present embodiment is composed of GdTbFeCo, i.e., a material based on the GdFeCo used in embodiment 2 with Tb replacing part of the Gd.

A magneto-optical disk including the above arrangement, i.e., a magneto-optical disk including the same arrangement as the magneto-optical disk (FIG. 8) of embodiment 2 except that the first supplementary reproduction layer 3 was composed of GdTbFeCo, was fabricated and subjected to recording and reproduction processes. Information was recorded and reproduced on the magneto-optical disk under the recording and reproduction conditions detailed in embodiment 2. Specifically, a recording/playback laser of 6.6 mW was continuously projected through a magneto-optical pickup head using a semiconductor laser having a wavelength of 680 nm at a linear velocity of 2.5 m/s, while applying a recording magnetic field modulated at ±15 kA/m, so as to form a repetitive pattern of upward and downward magnetization in the storage layer 7 in accordance with the direction of the recording magnetic field. During playback, measurement was performed by continuously projecting a recording/playback laser of 2.2 mW.

Tables 3 and 4 below show results of measurement of the Curie temperature of the first supplementary reproduction layer 3 and the CNR at a mark length of 0.2 $\mu$m when the first supplementary reproduction layer 3 was composed of GdTbFeCo, i.e., a material based on the GdFeCo used in embodiment 2 with Tb replacing part of the Gd, and transition temperature Tp3 at which the first supplementary reproduction layer 3 changed to perpendicular magnetization is maintained at a constant value of 160° C. Here, the mark length was equal to the length of the magnetic recording domain and also equal to half the pitch between two adjacent magnetic recording domains.

TABLE 3

| Disk | Composition of First Supplementary Reproduction Layer | Transition Temp. (° C.) | Curie Temp. (° C.) | CNR (dB) |
| --- | --- | --- | --- | --- |
| No. 3-0 | $Gd_{0.31}(Fe_{0.78}Co_{0.22})_{0.69}$ | 160 | 300 | 38.1 |
| No. 3-1 | $(Gd_{0.80}Dy_{0.05})_{0.29}(Fe_{0.40}Co_{0.60})_{0.71}$ | 160 | 355 | 35.8 |
| No. 3-2 | $(Gd_{0.99}Dy_{0.01})_{0.30}(Fe_{0.40}Co_{0.60})_{0.70}$ | 160 | 355 | 39.1 |
| No. 3-3 | $(Gd_{0.96}Dy_{0.04})_{0.32}(Fe_{0.40}Co_{0.60})_{0.68}$ | 160 | 350 | 39.8 |
| No. 3-4 | $(Gd_{0.92}Dy_{0.08})_{0.34}(Fe_{0.40}Co_{0.60})_{0.66}$ | 160 | 345 | 40.5 |
| No. 3-5 | $(Gd_{0.88}Dy_{0.12})_{0.36}(Fe_{0.40}Co_{0.60})_{0.64}$ | 160 | 335 | 40.4 |
| No. 3-6 | $(Gd_{0.84}Dy_{0.16})_{0.38}(Fe_{0.40}Co_{0.60})_{0.62}$ | 160 | 320 | 39.4 |
| No. 3-7 | $(Gd_{0.80}Dy_{0.20})_{0.40}(Fe_{0.40}Co_{0.60})_{0.60}$ | 160 | 305 | 38.7 |
| No. 3-8 | $(Gd_{0.76}Dy_{0.24})_{0.42}(Fe_{0.40}Co_{0.60})_{0.58}$ | 160 | 285 | 34.6 |

Table 3 shows results of measurement on magneto-optical disks including a first supplementary reproduction layer 3 with a fixed Fe/Co ratio and variable Tb/RE ratios. Here, to maintain transition temperature Tp3 at 160° C., the composition was adjusted by varying the ratio of the rare earth metals and the transition metals. The magneto-optical disk identified as No. 3-0 was identical to sample #2 of embodiment 2, i.e., a magneto-optical disk including a first supplementary reproduction layer 3 composed of GdFeCo.

As shown in Table 3, disk No. 3-1 exhibited a low CNR value, compared to disk No. 3-0 (sample #2) including a first supplementary reproduction layer 3 composed of GdFeCo. This was because in disk No. 3-1, perpendicular magnetization was not stable around transition temperature Tp3 due to the Tb/RE ratio as low as 0.5%, despite that Co made up as much as 60% of the transition metal content of GdTbFeCo composing the first supplementary reproduction layer 3 and also that Curie temperature was as high as 350° C.

By contrast, the magneto-optical disks identified as disks No. 3-2 to No. 3-7, i.e., those magneto-optical disks with a Tb/RE ratio in a range of lo to 20%, boasted CNRs that were higher by 0.5 dB or greater than that of disk No. 3-0 including a first supplementary reproduction layer 3 composed of GdFeCo.

Reasons are (1) the addition of Tb increased the perpendicular magnetic anisotropy of the first supplementary reproduction layer 3 and therefore produced relatively stable perpendicular magnetization below transition temperature Tp3 when compared with GdFeCo, and (2) the increase in the perpendicular magnetic anisotropy of the first supplementary reproduction layer 3 enabled stable perpendicular magnetization to be retained despite a high Co content and high Curie temperature, and therefore increased the total magnetization of the first supplementary reproduction layer 3 around transition temperature Tp3, enhancing magnetostatic coupling forces between the first supplementary reproduction layer 3 and the reproduction layer 1 and also between the first supplementary reproduction layer 3 and the storage layer 7.

By contrast, the magneto-optical disk identified as disk No. 3-8 produced a CNR lower than that of disk No. 3-0. This is because the first supplementary reproduction layer 3 had increased coercive forces above transition temperature Tp3 at which the first supplementary reproduction layer 3 changed to perpendicular magnetization, due to the Tb/RE ratio as high as 24%, and therefore was less likely to follow the leaking magnetic fluxes arising from the storage layer during playback, preventing a target magnetic recording domain 9 in the storage layer from duplicating to the magnetic domain 11 in the first supplementary reproduction layer 3 in a stable manner.

TABLE 4

| Disk | Composition of First Supplementary Reproduction Layer | Transition Temp. (° C.) | Curie Temp. (° C.) | CNR (dB) |
|---|---|---|---|---|
| No. 4-0 | $Gd_{0.31}(Fe_{0.78}Co_{0.22})_{0.69}$ | 160 | 300 | 38.1 |
| No. 4-1 | $(Gd_{0.92}Dy_{0.08})_{0.41}(Fe_{0.75}Co_{0.25})_{0.59}$ | 160 | 270 | 37.8 |
| No. 4-2 | $(Gd_{0.92}Dy_{0.08})_{0.40}(Fe_{0.70}Co_{0.30})_{0.60}$ | 160 | 300 | 38.8 |
| No. 4-3 | $(Gd_{0.92}Dy_{0.08})_{0.38}(Fe_{0.60}Co_{0.40})_{0.62}$ | 160 | 315 | 39.4 |
| No. 4-4 | $(Gd_{0.92}Dy_{0.08})_{0.36}(Fe_{0.50}Co_{0.50})_{0.64}$ | 160 | 330 | 40.2 |
| No. 4-5 | $(Gd_{0.92}Dy_{0.08})_{0.34}(Fe_{0.40}Co_{0.60})_{0.66}$ | 160 | 345 | 40.5 |
| No. 4-6 | $(Gd_{0.92}Dy_{0.08})_{0.32}(Fe_{0.20}Co_{0.80})_{0.68}$ | 160 | 350 | 40.6 |
| No. 4-7 | $(Gd_{0.92}Dy_{0.08})_{0.30}Co_{0.70}$ | 160 | 360 | 40.1 |

Table 4 shows results of measurement on magneto-optical disks, fabricated based on a magneto-optical disk including a first supplementary reproduction layer composed of $(Gd_{0.92}Tb_{0.08})_{0.34}(Fe_{0.40}Co_{0.60})_{0.66}$ which showed the highest CNR in the measurement as in Table 3, with a fixed Tb/RE ratio of 8% and variable Fe/Co ratios. Here, to maintain transition temperature Tp3 at 160° C., the composition was adjusted by varying the ratio of the rare earth metals and the transition metals. The magneto-optical disk identified as No. 4-0 was identical to sample #2 of embodiment 2, i.e., a magneto-optical disk including a first supplementary reproduction layer 3 composed of GdFeCo.

As shown in Table 4, disk No. 4-1 exhibited a low CNR value, compared to disk No. 4-0 (sample #2). This was because in disk No. 4-1, the total magnetization of the first supplementary reproduction layer 3 decreased around transition temperature Tp3 of the first supplementary reproduction layer 3 due to the low Co/TM ratio of 25% and the low Curie temperature of the first supplementary reproduction layer 3 of 270° C. This caused the magnetostatic coupling between the storage layer 7 and the first supplementary reproduction layer 3 around transition temperature Tp3 to be weakened compared to that of disk No. 4-0, thereby reducing the CNR.

Meanwhile, in disk No. 4-2, where the Co made up 30% of the transition metal content, the Curie temperature of the first supplementary reproduction layer 3 was almost equal to the Curie temperature of the first supplementary reproduction layer 3 in disk No. 4-0; however, the CNR was higher than that of disk No. 4-0 by 0.5 dB or greater. This is because the addition of Tb increased the perpendicular magnetic anisotropy of the first supplementary reproduction layer 3 and therefore produced relatively stable perpendicular magnetization above transition temperature Tp3. It is hence understood that the addition of Tb stabilizes perpendicular magnetization and enables duplication of magnetic domains with high resolution.

The magneto-optical disk identified as disk No. 4-3 through disk No. 4-7, i.e., those magneto-optical disks with a Co/TM ratio of 40% or higher, produced CNRs higher than that of disk No. 4-0 by 1 dB or greater.

This is because (1) the addition of Tb increased the perpendicular magnetic anisotropy of the first supplementary reproduction layer 3 and therefore produced relatively stable perpendicular magnetization above transition temperature Tp3 and (2) the increased Co/TM ratio elevated the Curie temperature of the first supplementary reproduction layer 3 and thereby enhanced the total magnetization of the first supplementary reproduction layer 3 around transition temperature Tp3 and hence enhanced magnetostatic coupling forces between the first supplementary reproduction layer 3 and the reproduction layer 1 and also between the first supplementary reproduction layer 3 and the storage layer 7.

From the foregoing, it is understood that the first supplementary reproduction layer 3, when composed of GdTbFeCo with a variable Tb/RE ratio from 1% to 20% and a variable Co/TM ratio of 30% or higher, exhibits perpendicular magnetization with increased stability around transition temperature Tp3 at which the first supplementary reproduction layer 3 changes to perpendicular magnetization.

If further adjusted within this composition range so as to contain a high Co content with respect to the transition metal content, the first supplementary reproduction layer 3 will have an elevated Curie temperature and increased total magnetization. Thus, magnetostatic coupling forces are enhanced between the first supplementary reproduction layer 3 and the reproduction layer 1 and also between the first supplementary reproduction layer 3 and the storage layer 7, effecting stable magnetic domain duplication and magnetic domain expansion reproduction. The first supplementary reproduction layer 3 thus adjusted forms a magneto-optical storage medium for magnetic domain expansion reproduction scheme with an increased CNR.

The present embodiment so far exclusively referred to the use of GdTbFeCo as the material composing the first supplementary reproduction layer 3 of the magneto-optical storage medium of embodiment 2; however, the arrangement is, of course, applicable to the magneto-optical storage medium of embodiment 1 in a similar manner.

Embodiment 5

The following description will discuss another embodiment in accordance with the present invention.

The magneto-optical storage medium of the present embodiment employs the same arrangement and playback principles as the magneto-optical storage medium (FIG. 7) of embodiment 2, except that the reproduction layer 1 of the present embodiment is composed of GdDyFeCo, i.e., a material based on the GdFeCo used in embodiment 2 with additional Dy.

In the present embodiment, the reproduction layer 1 is composed of $(Gd_{0.84}Dy_{0.16})_{0.32}(Fe_{0.68}Co_{0.32})_{0.68}$. The material is prepared based on the GdFeCo of embodiment 3 with additional Dy, and adjusted in composition so that transition temperature Tp1 and Curie temperature Tc1 of the reproduction layer 1 of the present embodiment are both equal to those of the reproduction layer 1 of embodiment 2. Transition temperature Tp1 is 90° C., and Curie temperature Tc1 is 260° C.

A magneto-optical disk including the above arrangement, i.e., a magneto-optical disk including the same arrangement as the magneto-optical disk (FIG. 8) of embodiment 2 except that the reproduction layer 1 was composed of GdDyFeCo, was fabricated and subjected to recording and reproduction processes. Information was recorded and reproduced on the magneto-optical disk (denoted as sample #3) under the recording and reproduction conditions detailed in embodiment 2. Specifically, a recording/playback laser of 6.6 mW was continuously projected through a magneto-optical pickup head using a semiconductor laser having a wavelength of 680 nm at a linear velocity of 2.5 m/s, while applying a recording magnetic field modulated at ±15 kA/m, so as to form a repetitive pattern of upward and downward magnetization in the storage layer 7 in accordance with the direction of the recording magnetic field. Then, by altering the modulation frequency of the recording magnetic field, a magnetic domain pattern was recorded with mark lengths varying from 0.2 μm to 0.5 μm. Here, the mark length was equal to the length of the magnetic recording domain and also equal to half the pitch between two adjacent magnetic recording domains.

Figure 10:
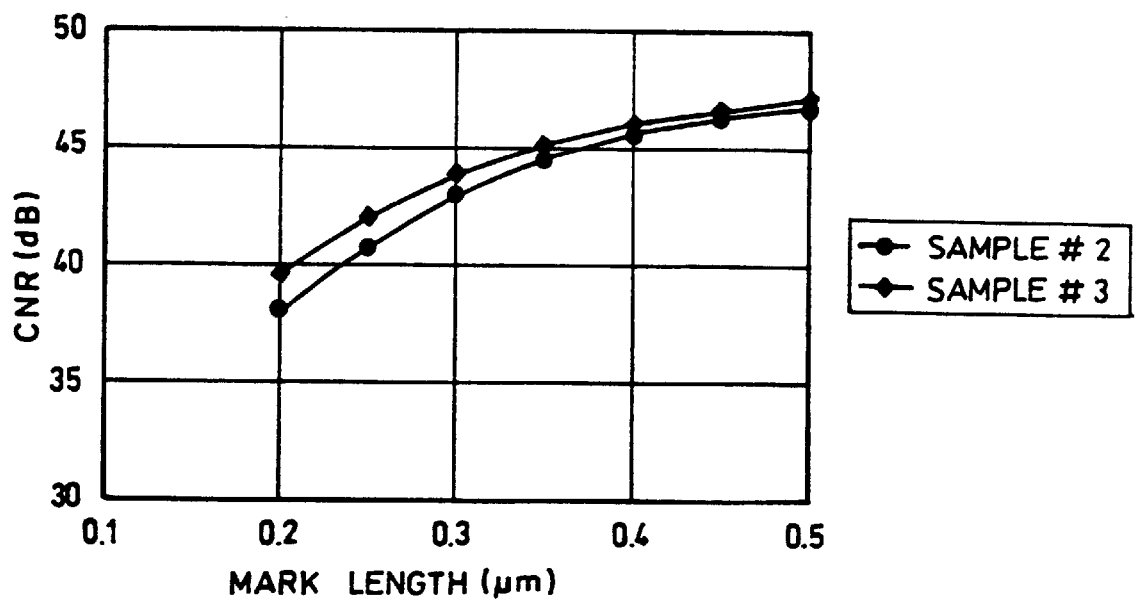
FIG. 10 is a graph showing signal-to-noise ratios of a magneto-optical disk of still another embodiment in accordance with the present invention in relation to mark lengths.

FIG. 10 is a graph showing the mark length dependence of the CNR (signal-to-noise ratio) of sample #3, measured by continuously projecting a recording/playback laser of 2.2 mW as the magneto-optical disk is played back. For comparison, FIG. 10 also shows, as a graph, the mark length dependence of the CNR of the magneto-optical disk of embodiment 2, i.e., sample #2 (FIG. 8), including a reproduction layer 1 and a first supplementary reproduction layer 3 composed of GdFeCo unlike sample #3.

Referring to FIG. 10, a comparison of CNRs between sample #3 and sample #2 reveals that sample #3 exhibited a higher CNR than sample #2 at any mark length.

As detailed in the foregoing, in sample #3 of the present embodiment, the reproduction layer 1 exhibits increased perpendicular magnetic anisotropy, since it is composed of GdDyFeCo, i.e., GdFeCo of embodiment 2 plus Dy. This produces a relatively stable perpendicular magnetization above transition temperature Tp1 and enables expansion and duplication from the first supplementary reproduction layer 3 to the reproduction layer 1 more stably than in sample #2. Consequently, magnetic domain expansion and duplication from the first supplementary reproduction layer 3 to the reproduction layer 1 is effected with high resolution, and magnetic domain expansion reproduction is effected with satisfactory signal quality. Where the reproduction layer 1 is heated, it exhibits perpendicular magnetization with increased stability and keeps producing satisfactory CNRs in the event that the laser projected during playback varies its power; therefore, the reproduction power margin can be expanded.

The magneto-optical storage medium of the present embodiment is further adjusted in terms of magnetic properties of the reproduction layer 1, the first supplementary reproduction layer 3, and the storage layer 7 so that the storage layer 7 is magnetostatically coupled to the reproduction layer 1 at transition temperature Tp1 more securely than to the first supplementary reproduction layer 3 at transition temperature Tp3.

As a result, in the magneto-optical storage medium, magnetostatic coupling is optimized between the storage layer 7 and the reproduction layer 1 and also between the storage layer 7 and the first supplementary reproduction layer 3, enabling magnetic domain duplication and magnetic domain expansion reproduction to be performed in stable manners.

The present embodiment so far exclusively referred to exemplary use of GdDyFeCo, i.e., GdFeCo with additional Dy, as the material composing the reproduction layer 1; however, any additional element, for example, Tb, may be used instead of Dy as long as its addition increases the perpendicular magnetic anisotropy of the GdFeCo and retain the perpendicular magnetization of the reproduction layer 1 in a stable manner above transition temperature Tp3 of the reproduction layer 1.

The present embodiment so far exclusively referred to the use of either GdDyFeCo or GdTbFeCo as the material composing the reproduction layer 1 of the magneto-optical storage medium of embodiment 2; however, the arrangement is, of course, applicable to the magneto-optical storage medium of embodiments 1, 3, and 4 in a similar manner.

Embodiment 6

Now, referring to FIG. 11 through FIG. 14, the following description will discuss another embodiment in accordance with the present invention. Here, for convenience, members of the present embodiment that have the same arrangement and function as members of embodiments 1 to 5, and that are mentioned in embodiments 1 to 5 are indicated by the same reference numerals and description thereof is omitted.

Figure 12:
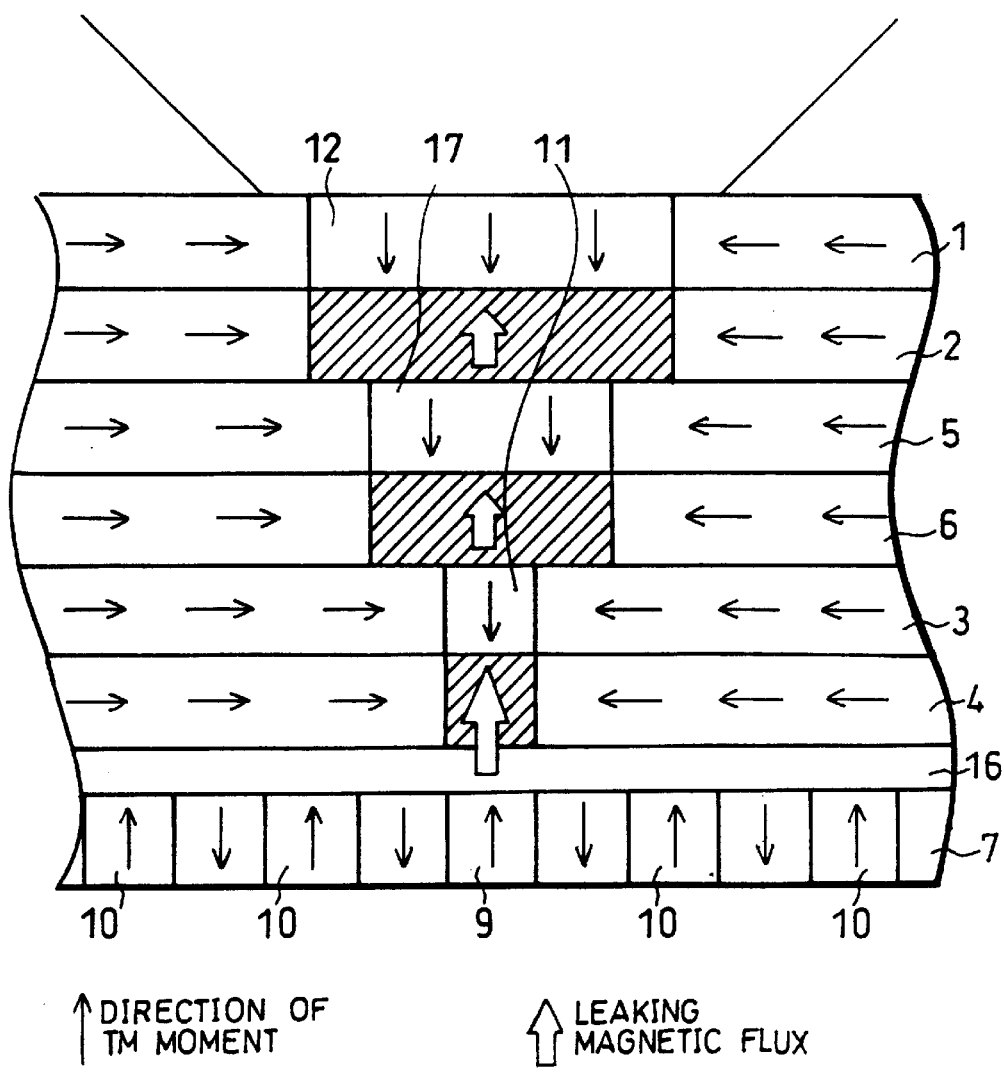
FIG. 12 is an explanatory drawing showing the magnetization of the magneto-optical storage medium of the preceding embodiment during playback.

As shown in FIG. 12, the magneto-optical storage medium of the present embodiment has the same structure as the magneto-optical storage medium (FIG. 7) of embodiment 2 and further include a second supplementary reproduction layer 5 and a third in-plane magnetized layer 6 interposed between the first in-plane magnetized layer 2 and the first supplementary reproduction layer 3.

Figure 11:
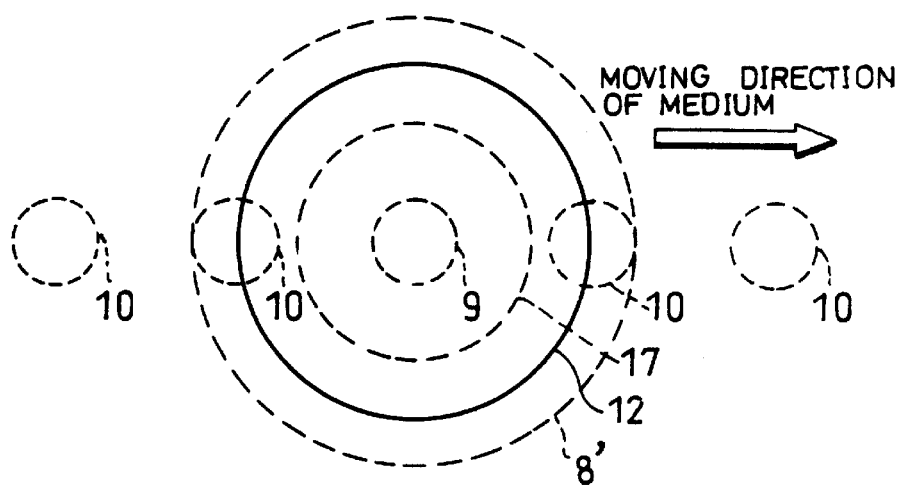
FIG. 11 is an explanatory drawing illustrating playback of a magneto-optical storage medium of another embodiment in accordance with the present invention.

First of all, referring to FIG. 11 and FIG. 12, principles in playback of the magneto-optical storage medium of the present embodiment will be explained. FIG. 11 and FIG. 12 are plan and cross-sectional views, respectively, schematically illustrating the magnetization of the magneto-optical storage medium during playback.

As shown in FIG. 12, the magneto-optical storage medium of the present embodiment has a structure including a reproduction layer 1, a first in-plane magnetized layer 2, a second supplementary reproduction layer 5, a third in-plane magnetized layer 6, a first supplementary reproduction layer 3, a second in-plane magnetized layer 4, a non-magnetic intermediate layer 16, and a storage layer 7, the layers sequentially overlapping one another. It should be noted with regard to the arrows in FIG. 12 that the black one denotes the direction of the magnetic moment of a transition metal (TM), and the open one denotes the direction of a leaking magnetic flux.

The second supplementary reproduction layer 5 is composed of an alloy of rare earth and transition metals, exhibiting in-plane magnetization at room temperature and changing to perpendicular magnetization with rising temperature. The third in-plane magnetized layer 6 is constituted by a magnetic film chiefly composed of a rare earth and transition metal, a rare earth metal, or a transition metal, and exhibits magnetization within the in-plane.

As shown in FIG. 11 and FIG. 12, upon heating the magneto-optical storage medium using a light beam 8 (light beam spot 8'), the magnetic recording domain 9 formed in the storage layer 7 is duplicated to the first supplementary reproduction layer 3 through magnetostatic coupling, and the magnetic domain 11 is formed in the first supplementary reproduction layer 3 through the duplication. The magnetic domain 11 formed in the first supplementary reproduction layer 3 through the duplication is in turn expanded and duplicated to the second supplementary reproduction layer 5 through magnetostatic coupling, so as to form a magnetic domain 17. The magnetic domain 17 is then expanded and duplicated to the reproduction layer 1 through magnetostatic coupling, forming in the reproduction layer 1 an expanded and duplicated magnetic domain 12 which is to be reproduced.

Instead of the magnetic domain 11 formed in the first supplementary reproduction layer 3 through duplication being directly duplicated to form the magnetic domain 12 in the reproduction layer 1, the magnetic domain 11 is first expanded and duplicated to form the magnetic domain 17 of a larger size than the magnetic domain 11 but smaller than magnetic domain 12, before the magnetic domain 17 is expanded and duplicated to form the magnetic domain 12 in the reproduction layer 1. This enables smooth expansion and duplication from the magnetic domain 11 to the magnetic domain 12. In addition, the magnetic domain 12 has an increased area receiving a leaking magnetic flux in parallel to the total direction of the magnetization of the magnetic recording domain 9. This enables the expansion and duplication to the magnetic domain 12 to be performed with higher resolution and also increases the stability of the magnetic domain 12. The playback is therefore less likely to be affected by external magnetic fields including the leaking magnetic field from the optical pickup head.

Here, to impart magnetic properties to the second supplementary reproduction layer 5 to exhibit in-plane magnetization at room temperature and change to perpendicular magnetization with rising temperature and also to enhance its total magnetization, the second supplementary reproduction layer 5 is preferably RE rich. When this is the case, in the second supplementary reproduction layer 5, the direction of the TM moment is antiparallel to the direction of the total magnetization.

The third in-plane magnetized layer 6 is specified to have Curie temperature Tc6 around transition temperature Tp6 at which the second supplementary reproduction layer 5 changes to perpendicular magnetization (rather preferably, $Tc6 \leq Tp6$, to expand the reproduction margin). This securely retains the in-plane magnetization through exchange coupling to the third in-plane magnetized layer 6 below transition temperature Tp6 of the third in-plane magnetized layer 6.

In the second supplementary reproduction layer 5, the magnetic domain 17 is formed through expansion and duplication of the magnetic domain 11 that is in turn formed in the first supplementary reproduction layer 3 through duplication. The magnetic domain 17 formed through the expansion and duplication is further expanded and duplicated to form the magnetic domain 12 in the reproduction layer 1. Accordingly, transition temperature Tp5 at which the second supplementary reproduction layer 5 changes to perpendicular magnetization is specified lower than transition temperature Tp3 at which the first supplementary reproduction layer 3 changes to perpendicular magnetization and higher than transition temperature Tp1 at which the reproduction layer 1 changes to perpendicular magnetization.

With the foregoing arrangement, target information stored in the magnetic recording domain 9 in the storage layer 7 can be smoothly duplicated to the first supplementary reproduction layer 3 through magnetostatic coupling, expanded and duplicated to the second supplementary reproduction layer 5 through magnetostatic coupling, and then expanded and duplicated to the reproduction layer 1 through magnetostatic coupling.

To ensure the duplication to the first supplementary reproduction layer 3 through magnetostatic coupling, expansion and duplication to the second supplementary reproduction layer 5 through magnetostatic coupling, and expansion and duplication to the reproduction layer 1 through magnetostatic coupling, the storage layer 7 is specified so as to produce a weaker leaking magnetic flux around transition temperatures Tp1 and Tp5 than around transition temperature Tp3, as wells as Curie temperature Tc1 of the reproduction layer 1 and Curie temperature Tc5 of the second supplementary reproduction layer 5 are specified lower than Curie temperature Tc3 of the first supplementary reproduction layer 3. These specifications cause the reproduction layer 1 and the second supplementary reproduction layer 5 to produce a smaller total magnetization than does the first supplementary reproduction layer 3, and also cause magnetostatic coupling forces to be weaker between the storage layer 7 and the reproduction layer 1 around transition temperature Tp1 and between the storage layer 7 and the second supplementary reproduction layer 5 around transition temperature Tp5 than between the storage layer 7 and the first supplementary reproduction layer 3 around transition temperature Tp3.

With the arrangement, the duplication from the storage layer 7 to the first supplementary reproduction layer 3 through magnetostatic coupling, the expansion and duplication from the first supplementary reproduction layer 3 to the second supplementary reproduction layer 5 through magnetostatic coupling, and the expansion and duplication from the first supplementary reproduction layer 3 to the reproduction layer 1 are performed in stable manners.

In the present embodiment, the third in-plane magnetized layer 6 is provided between the second supplementary reproduction layer 5 and the first supplementary reproduction layer 3. This stabilizes the in-plane magnetization of the second supplementary reproduction layer 5 below transition temperature Tp5 at which the second supplementary reproduction layer 5 changes to perpendicular magnetization. Therefore, the second supplementary reproduction layer 5 abruptly changes from in-plane magnetization to perpendicular magnetization where it is heated exceeding transition temperature Tp5. Hence, the second supplementary reproduction layer 5 is securely coupled to the first supplementary reproduction layer 3 only where it is heated, and has improved reproduction resolution.

From the foregoing, in the magneto-optical storage medium, the magnetic recording domain 11 formed through duplication from the storage layer 7 to the first supplementary reproduction layer 3 is expanded and duplicated to the reproduction layer 1 by expanding and duplicating the magnetic domain sequentially from the first supplementary reproduction layer 3 via the second supplementary reproduction layer 5 to the reproduction layer 1, effecting smooth expansion and duplication. Besides, a leaking magnetic flux arising in parallel to the total magnetization of the magnetic recording domain from an increased area can be applied to a part of the reproduction layer 1 where it has changed to perpendicular magnetization; therefore, the expansion and duplication to the reproduction layer 1 is more stable than at short mark lengths, as well as external disturbances, such as a leaking magnetic field from the optical pickup head, are less likely to cause negative effects.

In the magneto-optical storage medium, the magnetic domain 17, expanded and duplicated to the second supplementary reproduction layer 5 with high reproduction resolution, is expanded and duplicated to the reproduction layer 1, producing better reproduction signal quality. Consequently, the magneto-optical storage medium improves reproduction resolution in the second supplementary reproduction layer 5 and achieves satisfactory reproduction signal quality at short mark lengths, while retaining satisfactory recording sensitivity.

To attain these effects, the present embodiment so far has exclusively referred to a structure in which a supplementary reproduction layer exhibiting in-plane magnetization at room temperature and changing to perpendicular magnetization above a transition temperature which is above Tp1 but below Tp3 and an in-plane magnetized layer having its Curie temperature around the transition temperature were interposed between the reproduction layer 1 and the first supplementary reproduction layer 3. However, similar effects are available with another structure in which a supplementary reproduction layer and an in-plane magnetized layer are deposited alternately, and the transition temperatures of the supplementary reproduction layers sequentially increase from the side closer to the reproduction layer 1 toward the side closer to the storage layer 7.

Now, the following description specifically will discuss a magneto-optical disk, i.e., an application of the magneto-optical storage medium.

Figure 13:
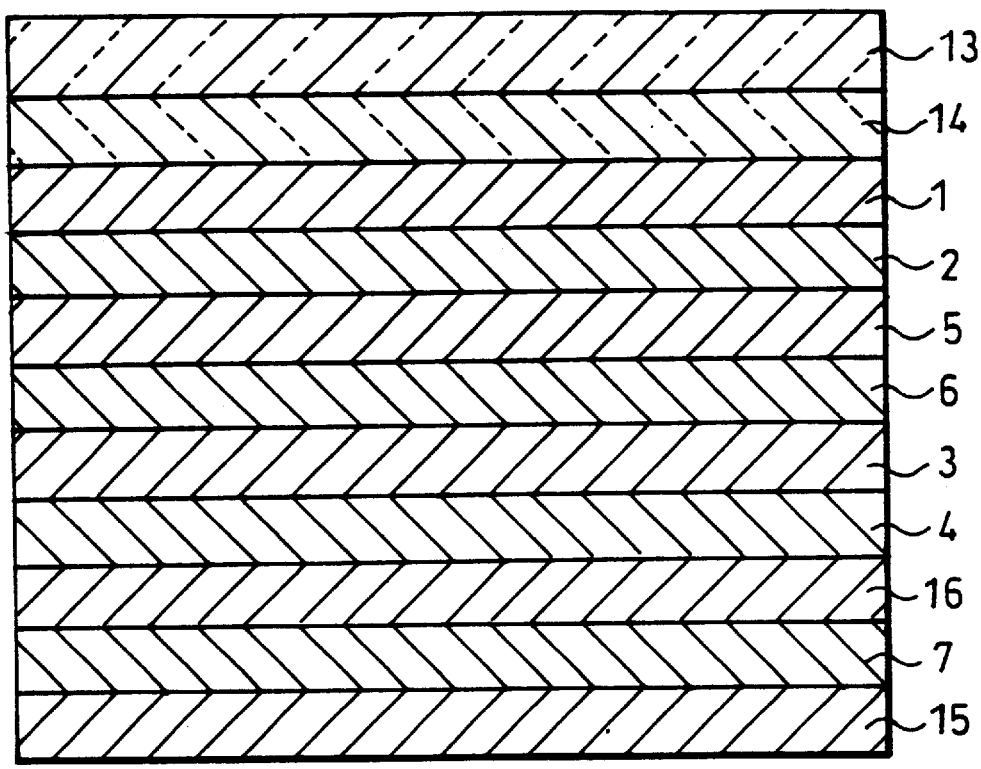
FIG. 13 is a cross-sectional view schematically showing an arrangement of a magneto-optical disk, which is an application of the magneto-optical storage medium shown in FIG. 12.

As shown in FIG. 13, the magneto-optical disk includes transparent dielectric protection layer 14, a reproduction layer 1, a first in-plane magnetized layer 2, a second supplementary reproduction layer 5, a third in-plane magnetized layer 6, a first supplementary reproduction layer 3, a second in-plane magnetized layer 4, a non-magnetic intermediate layer 16, a storage layer 7, and a protection layer 15, the layers being deposited sequentially on a substrate 13. The substrate 13, the transparent dielectric protection layer 14, the reproduction layer 1, the first in-plane magnetized layer 2, the first supplementary reproduction layer 3, the second in-plane magnetized layer 4, the non-magnetic intermediate layer 16, the storage layer 7, and the protection layer 15 are made of the same materials in the same manner as their counterparts in embodiment 1.

The second supplementary reproduction layer 5 preferably has Curie temperature Tc5 in the range of 160° C. to 300° C. If Tc1<160° C., the second supplementary reproduction layer 5, having decreased Curie temperature Tc5, produces smaller total magnetization around transition temperature Tp5 of the second supplementary reproduction layer 5. Magnetostatic coupling therefore weakens between the first supplementary reproduction layer 3 and the second supplementary reproduction layer 5 and between the second supplementary reproduction layer 5 and the reproduction layer 1 around transition temperature Tp5. Due to the weakening, expansion and duplication of magnetic domains are not effected in stable manners from the first supplementary reproduction layer 3 to the second supplementary reproduction layer 5 and from the second supplementary reproduction layer 5 to the reproduction layer 1. If Tc>300° C., the second supplementary reproduction layer 5, having increased Curie temperature Tc5, produces greater magnetization and thereby strengthens its coupling to the storage layer 7 around transition temperature Tp5. Consequently, expansion and duplication of magnetic domains are interrupted from the first supplementary reproduction layer 3 to the second supplementary reproduction layer 5, increasing reproduction noise and degrading reproduction signal quality.

The thickness of the second supplementary reproduction layer 5 is preferably specified in a range of 20 nm to 60 nm. If the second supplementary reproduction layer 5 is less than 20 nm thick, magnetostatic coupling weakens between the reproduction layer 1 and the first supplementary reproduction layer 3. Due to the weakening, expansion and duplication of magnetic domains are not effected in stable manners from the first supplementary reproduction layer 3 to the second supplementary reproduction layer 5 and also from the second supplementary reproduction layer 5 to the reproduction layer 1. If the second supplementary reproduction layer 5 is more than 60 nm thick, the increased thickness tangibly degrades recording sensitivity.

The thickness of the third in-plane magnetized layer 6 is preferably in a range of 2 nm to 40 nm. If the third in-plane magnetized layer 6 is less than 2 nm thick, a sufficient in-plane magnetization masking is not effected, and the reproduction resolution decreases. If the third in-plane magnetized layer is more than 40 nm thick, the second supplementary reproduction layer 5 is separated from the first supplementary reproduction layer 3 by the increased distance, and fails to establish secure magnetostatic coupling to the first supplementary reproduction layer 3. This makes it difficult to stably duplicate magnetic domains in the first supplementary reproduction layer 3 to the second supplementary reproduction layer 5.

To impart the foregoing magnetic properties, the second supplementary reproduction layer 5 may be constituted by a thin film of an alloy of rare earth and transition metals, such as GdFe, GdFeCo, GdDyFeCo, GdTbFeCo, or GdNdFeCo. A metal element, such as Ta, Cr, Ti, Al, and Si, may be added to the material to improve the resistance of the material to humidity and oxidation. The third in-plane magnetized layer 6 may be constituted by an in-plane magnetized film composed of GdFe, GdFeCo, GdDyFe, GdDyFeCo, GdNdFe, GdNdFeCo, NdFe, NdFeCo, or another similar material. A metal element, such as Ta, Cr, Ti, Al, and Si, may be added to the material to adjust the Curie temperature.

An additional thermodiffusive metal layer composed of Al, AlTa, AlTi, AlCr, AlNi, AlCo, Cu, or the like may be provided on the protection layer 15 to improve on the thermal properties of the medium. On the protection layer 15 or the thermodiffusive metal layer, there may be provided an ultraviolet ray curing resin layer, a thermocuring resin layer, or a lubricant layer.

To effect low magnetization storage, a supplementary storage layer constituted by a perpendicularly magnetized film, composed of GdFeCo, GdTbFeCo, GdDyFeCo, or the like, which exerts a weaker coercive force than the coercive force of the storage layer 7 and which has a Curie temperature higher than Curie temperature Tc7 of the storage layer 7 may be deposited adjacent the storage layer 7.

Now, the following description will discuss a method of fabricating a magneto-optical disk arranged as in the foregoing as well as a specific example of a method of recording and reproduction of the disk.

(1) Method of Fabrication of Magneto-optical Disk

The magneto-optical disk (FIG. 13) is fabricated by the following method.

First, a polycarbonate substrate 13 formed in a disk shape with guide grooves is placed in a sputtering device provided with an AlSi target, a Gd target, a Tb target, a Fe target, and a Co target.

Then, an 80 nm thick, AlN, transparent dielectric protection layer 14 on the substrate 13 is formed in a similar manner to that in the magneto-optical disk (FIG. 8) of embodiment 1. Subsequently, a 20 nm thick, $Gd_{0.27}(Fe_{0.88}Co_{0.12})_{0.73}$, reproduction layer 1 is formed on the transparent dielectric protection layer 14. Next, a 10 nm thick, $Gd_{0.09}Fe_{0.91}$, first in-plane magnetized layer 2 is formed on the reproduction layer 1.

Subsequently, a 20 nm thick, $Gd_{0.29}(Fe_{0.88}Co_{0.12})_{0.71}$, second supplementary reproduction layer 5 is formed on the first in-plane magnetized layer 2. Subsequently, a 10 nm thick, $Gd_{0.11}Fe_{0.89}$, third in-plane magnetized layer 6 is deposited on the second supplementary reproduction layer 5. Then, a 20 nm thick, $Gd_{0.31}(Fe_{0.78}Co_{0.22})_{0.69}$, first supplementary reproduction layer 3 is formed on the third in-plane magnetized layer 6, followed by formation of a 10 nm thick, $Gd_{0.13}Fe_{0.87}$, second in-plane magnetized layer 4 on the first supplementary reproduction layer 3. The resultant second supplementary reproduction layer 5 exhibits in-plane magnetization at room temperature and changes to perpendicular magnetization at 125° C., and has Curie temperature Tc5 of 250° C. The resultant third in-plane magnetized layer 6 is an in-plane magnetized film having Curie temperature Tc4 of 125° C. and exhibiting magnetization within the in-plane from room temperature to Curie temperature Tc6.

Secondly, electric power is supplied to the AlSi alloy target, so as to form a 1 nm, AlSi, non-magnetic intermediate layer 16 on the third in-plane magnetized layer 6 at a gas pressure of $4 \times 10^{-3}$ Torr.

Thirdly, a 60 nm thick, $Tb_{0.25}(Fe_{0.84}Co_{0.16})_{0.75}$, storage layer 7 is formed on the non-magnetic intermediate layer 16 similarly to its counterpart in magneto-optical disk (FIG. 8) of embodiment 2. Subsequently, a 20 nm thick, AlSiN, protection layer 15 is formed on the storage layer 7.

(2) Playback Properties

The following description will explain playback properties of a magneto-optical disk (denoted as sample #4). Specifically, results of evaluation will be presented where information was recorded on the magneto-optical disk and reproduced through a magneto-optical pickup head using a semiconductor laser having a wavelength of 680 nm at a linear velocity of 2.5 m/s.

First of all, a recording/playback laser of 7.2 mW was continuously projected while applying a recording magnetic field modulated at ±15 kA/m, so as to form a repetitive pattern of upward and downward magnetization in the storage layer 7 in accordance with the direction of the recording magnetic field. Then, by altering the modulation frequency of the recording magnetic field, a magnetic domain pattern was recorded with mark lengths varying from 0.2 µm to 0.5 µm. Here, the mark length was equal to the length of the magnetic recording domain and also equal to half the pitch between two adjacent magnetic recording domains.

Figure 14:
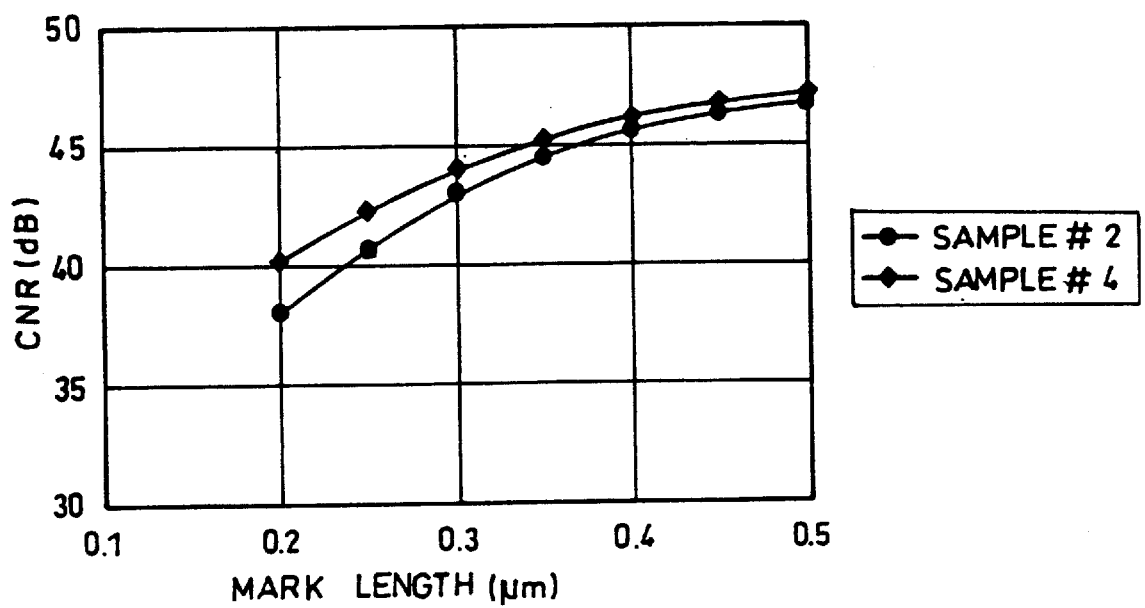
FIG. 14 is a graph showing signal-to-noise ratios of the magneto-optical disk shown in FIG. 13 in relation to mark lengths.

FIG. 14 is a graph showing the mark length dependence of the CNR (signal-to-noise ratio) of sample #4, measured by continuously projecting a recording/playback laser of 2.4 mW. For comparison, FIG. 15 also shows, as a graph, the mark length dependence of the CNR of the magneto-optical disk of embodiment shown in FIG. 8, that is, sample #2 having neither of the second supplementary reproduction layer 5 and the third in-plane magnetized layer 6 unlike ample #4.

Referring to FIG. 14, a comparison of CNRs between sample #4 and sample #2 reveals that sample #4 exhibited a higher CNR than sample #2 at any mark length.

As detailed in the foregoing, in sample #4 of the present embodiment, magnetic domains are expanded and duplicated in more stable manners than in sample #2 due to the provision of the second supplementary reproduction layer 5 and the third in-plane magnetized layer 6. Further, since the reproduction layer 1 is securely coupled to the second supplementary reproduction layer 5 by magnetostatic forces, the magnetic domain 12, formed through expansion and duplication, is retained with increased stability; therefore, magnetic domain expansion reproduction is less likely to be affected by external disturbances such as a leaking magnetic field from the optical pickup head, and produces satisfactory signal quality.

From the foregoing, in the magneto-optical storage medium of the present embodiment, magnetic information stored in the storage layer 7 duplicated to the first supplementary reproduction layer 3, and then expanded and duplicated to the second supplementary reproduction layer 5, and to the reproduction layer 1 sequentially. This stabilizes expansion and duplication from the magnetic domain 11 in the first supplementary reproduction layer 3 to the magnetic domain 12 in the reproduction layer 1. Besides, a leaking magnetic flux arising in parallel to the total magnetization of the magnetic recording domain from an increased area can be applied to a part of the reproduction layer 1 where it has changed to perpendicular magnetization; therefore, even if signals whose cycles do not exceed diffraction limits of light are stored in the storage layer 7, magnetic domain expansion is performed with no reduction in reproduction signal amplitude and is less likely to be affected by external disturbances. In the magneto-optical storage medium, the non-magnetic intermediate layer 16 blocks the exchange coupling between the second in-plane magnetized layer 4 and the storage layer 7; therefore, the second in-plane magnetized layer 4 can be reduced in thickness, and the recording and reproduction power can be reduced.

If the reproduction layer 1, the second supplementary reproduction layer 5, the first supplementary reproduction layer 3, and the storage layer 7 are further adjusted in terms of magnetic properties so that the storage layer 7 is magnetostatically coupled more securely to the first supplementary reproduction layer 3 at transition temperature Tp3 than to the reproduction layer 1 at transition temperature Tp1 and to the second supplementary reproduction layer 5 at transition temperature Tp5, magnetostatic coupling is optimized between the storage layer 7 and the reproduction layer 1, between the storage layer 7 and the second supplementary reproduction layer 5, and between the storage layer 7 and the first supplementary reproduction layer 3, enabling stable magnetic domain duplication and magnetic domain expansion reproduction.

The present embodiment so far exclusively referred to the magneto-optical storage medium of embodiment 2 with an additional second supplementary reproduction layer 5 and third in-plane magnetized layer 6; however, the arrangement is, of course, applicable to the magneto-optical storage medium of embodiment 1.

Embodiment 7

The following description will discuss a further embodiment in accordance with the present invention.

The magneto-optical storage medium of the present embodiment employs the same arrangement and playback principles as the magneto-optical storage medium (FIG. 12) of embodiment 6, except that the first supplementary reproduction layer 3 of the present embodiment is composed of GdDyFeCo, i.e., a material based on the GdFeCo used in embodiment 3 with Dy replacing part of the Gd.

A magneto-optical disk including the above arrangement, i.e., a magneto-optical disk including the same arrangement as the magneto-optical disk (FIG. 13) of embodiment 6 except that the first supplementary reproduction layer 3 was composed of GdDyFeCo, was fabricated and subjected to recording and reproduction processes. Information was recorded and reproduced on the magneto-optical disk under the recording and reproduction conditions detailed in embodiment 6. Specifically, a recording/playback laser of 7.2 mW was continuously projected through a magneto-optical pickup head using a semiconductor laser having a wavelength of 680 nm at a linear velocity of 2.5 m/s, while applying a recording magnetic field modulated at ±15 kA/m, so as to form a repetitive pattern of upward and downward magnetization in the storage layer 7 in accordance with the direction of the recording magnetic field. During playback, measurement was performed by continuously projecting a recording/playback laser of 2.4 mW.

First supplementary reproduction layers 3 were composed of GdDyFeCo of the same compositions as those shown in Table 1 and Table 2 of embodiment 3. CNRs were measured on the magneto-optical disks at mark lengths of 0.2µ in the same manner as in embodiment 3. Here, the mark length was equal to the length of the magnetic recording domain and also equal to half the pitch between two adjacent magnetic recording domains.

CNRs were measured on the magneto-optical disks with variable Dy/RE ratios. CNR measurements of the magneto-optical disk with the Dy/RE ratio as low as 1% were low when compared with the CNR values of the magneto-optical disk (sample #4 of embodiment 6) including a first supplementary reproduction layer 3 composed of GdFeCo. This is because, similarly to embodiment 4, the magneto-optical disk failed to retain the perpendicular magnetization of the first supplementary reproduction layer 3 in a stable manner around transition temperature Tp3 at which the first supplementary reproduction layer 3 changes to perpendicular magnetization.

By contrast, CNR measurement on the magneto-optical disks with a Dy/RE ratio in a range of 2% to 28% confirmed that they produced CNRs higher than that of sample #3 by 0.5 dB or greater.

This is because (1) the addition of Dy increased the perpendicular magnetic anisotropy of the first supplementary reproduction layer 3 and therefore produced relatively stable perpendicular magnetization above transition temperature Tp3 when compared with GdFeCo, and (2) the increase in the perpendicular magnetic anisotropy of the first supplementary reproduction layer 3 enabled stable perpendicular magnetization to be retained despite a high Co content and high Curie temperature, and therefore increased the total magnetization of the first supplementary reproduction layer 3 around transition temperature Tp3, enhancing magnetostatic coupling forces between the first supplementary reproduction layer 3 and the second supplementary reproduction layer 5 and also between the first supplementary reproduction layer 3 and the storage layer 7.

By contrast, the magneto-optical disk with a Dy/RE ratio as high as 34% produced CNRs lower than those of sample #4. This is because the first supplementary reproduction layer 3 had increased coercive forces above transition temperature Tp3 at which the first supplementary reproduction layer 3 changed to perpendicular magnetization, and therefore was less likely to follow the leaking magnetic fluxes arising from the storage layer during playback, preventing a target magnetic recording domain 9 in the storage layer from duplicating to the magnetic domain 11 in the first supplementary reproduction layer 3 in a stable manner.

CNR measurement was conducted on magneto-optical disks at mark lengths of 0.2 μm, fabricated based on a magneto-optical disk including a first supplementary reproduction layer composed of $(Gd_{0.84}Dy_{0.16})_{0.35}(Fe_{0.50}Co_{0.50})_{0.65}$ which showed the higher CNR valuer than the other Dy/RE ratios in the measurement, with a fixed Dy/RE ratio of 16% and variable Fe/Co ratios, i.e., with the same compositions of the GdDyFeCo shown in Table 2 of embodiment 3.

Results of the measurement show that a magneto-optical disk with the Co/TM ratio as low as 30% produced relatively low CNRs, similarly to embodiment 3, when compared with sample #4. This was because in that magneto-optical disk, the total magnetization of the first supplementary reproduction layer 3 decreased around transition temperature Tp3 due the Curie temperature of the first supplementary reproduction layer 3 as low as 260° C. This caused the magnetostatic coupling between the storage layer 7 and the first supplementary reproduction layer 3 around transition temperature Tp3 to be weakened compared to that of sample #4.

Meanwhile, in the magneto-optical disks, where the Co/TM ratios were 35% and 40% respectively, the Curie temperature of the first supplementary reproduction layer 3 was lower than, or almost equal to, the Curie temperature of the first supplementary reproduction layer 3 of sample #4; however, the CNRs were higher than that of sample #4 by 0.5 dB or greater. This is because the addition of Dy increased the perpendicular magnetic anisotropy of the first supplementary reproduction layer 3 and therefore produced relatively stable perpendicular magnetization above transition temperature Tp3. It is hence understood that the addition of Dy stabilizes perpendicular magnetization and enables duplication of magnetic domains with high resolution.

The magneto-optical disks with a Co/TM ratio in a range of 50% to 70% produced CNRs higher than that of sample #4 by 1 dB or greater.

This is because (1) the addition of Dy increased the perpendicular magnetic anisotropy of the first supplementary reproduction layer 3 and therefore produced relatively stable perpendicular magnetization above transition temperature Tp3 and (2) the increased Co/TM ratio elevated the Curie temperature of the first supplementary reproduction layer 3 and thereby enhanced the total magnetization of the first supplementary reproduction layer 3 around transition temperature Tp3 and hence enhanced magnetostatic coupling forces between the first supplementary reproduction layer 3 and the reproduction layer 1 and also between the first supplementary reproduction layer 3 and the storage layer 7.

By contrast, in the magneto-optical disk, where Co made up 80% of the transition metal content, the CNR dropped significantly. This is because the first supplementary reproduction layer 3 could not change from in-plane magnetization to perpendicular magnetization due to the Co/TM ratio that was too high.

From the foregoing, it is understood that the first supplementary reproduction layer 3, when composed of GdDyFeCo with a variable Dy/RE ratio from 2% to 28% and a variable Co/TM ratio from 35% to 70%, exhibits perpendicular magnetization with increased stability around transition temperature Tp3 at which the first supplementary reproduction layer 3 changes to perpendicular magnetization.

If further adjusted within this composition range so as to contain a high Co content with respect to the transition metal content, the first supplementary reproduction layer 3 will have an elevated Curie temperature and increased total magnetization. Thus, magnetostatic coupling forces are enhanced between the first supplementary reproduction layer 3 and the second supplementary reproduction layer 5 and also between the first supplementary reproduction layer 3 and the storage layer 7, effecting stable magnetic domain duplication and magnetic domain expansion reproduction. The first supplementary reproduction layer 3 thus adjusted forms a magneto-optical storage medium for magnetic domain expansion reproduction scheme with increased CNRs.

Embodiment 8

The following description will discuss another embodiment in accordance with the present invention.

The magneto-optical storage medium of the present embodiment employs the same arrangement and playback principles as the magneto-optical storage medium (FIG. 12) of embodiment 6, except that the first supplementary reproduction layer 3 of the present embodiment is composed of GdTbFeCo, i.e., a material based on the GdFeCo used in embodiment 6 with Tb replacing part of the Gd.

A magneto-optical disk including the above arrangement, i.e., a magneto-optical disk including the same arrangement as the magneto-optical disk (FIG. 13) of embodiment 6 except that the first supplementary reproduction layer 3 was composed of GdTbFeCo, was fabricated and subjected to recording and reproduction processes. Information was recorded and reproduced on the magneto-optical disk under the recording and reproduction conditions detailed in embodiment 6. Specifically, a recording/playback laser of 7.2 mW was continuously projected through a magneto-optical pickup head using a semiconductor laser having a wavelength of 680 nm at a linear velocity of 2.5 m/s, while applying a recording magnetic field modulated at ±15 kA/m, so as to form a repetitive pattern of upward and downward magnetization in the storage layer 7 in accordance with the direction of the recording magnetic field. During playback, measurement was performed by continuously projecting a recording/playback laser of 2.4 mW.

First supplementary reproduction layers 3 were composed of GdTbFeCo of the same compositions as those shown in Table 3 and Table 4 of embodiment 4. CNRs were measured on the magneto-optical disks at mark lengths of $0.2\mu$ in the same manner as in embodiment 6. Here, the mark length was equal to the length of the magnetic recording domain and also equal to half the pitch between two adjacent magnetic recording domains.

CNRs were measured on the magneto-optical disks with variable Tb/RE ratios. CNR measurements of the magneto-optical disk with the Tb/RE ratio as low as 1% were low when compared with the CNR values of the magneto-optical disk (sample #4 of embodiment 6) including a first supplementary reproduction layer 3 composed of GdFeCo. This is because, similarly to embodiment 4, the magneto-optical disk failed to retain the perpendicular magnetization of the first supplementary reproduction layer 3 in a stable manner around transition temperature Tp3 at which the first supplementary reproduction layer 3 changes to perpendicular magnetization.

By contrast, CNR measurement on the magneto-optical disks with a Tb/EM ratio in a range of 1% to 20% confirmed that they produced CNRs higher than that of sample #4 by 0.5 dB or greater.

This is because (1) the addition of Tb increased the perpendicular magnetic anisotropy of the first supplementary reproduction layer 3 and therefore produced relatively stable perpendicular magnetization above transition temperature Tp3 when compared with GdFeCo, and (2) the increase in the perpendicular magnetic anisotropy of the first supplementary reproduction layer 3 enabled stable perpendicular magnetization to be retained despite a high Co content and high Curie temperature, and therefore increased the total magnetization of the first supplementary reproduction layer 3 around transition temperature Tp3, enhancing magnetostatic coupling forces between the first supplementary reproduction layer 3 and the second supplementary reproduction layer 5 and also between the first supplementary reproduction layer 3 and the storage layer 7.

By contrast, a magneto-optical disk with the Tb/RE ratio as high as 24% produced CNRs lower than those of sample #4. This is because the first supplementary reproduction layer 3 had increased coercive forces above transition temperature Tp3 at which the first supplementary reproduction layer 3 changed to perpendicular magnetization, and therefore was less likely to follow the leaking magnetic fluxes arising from the storage layer during playback, preventing a target magnetic recording domain 9 in the storage layer from being duplicated to the magnetic domain 11 in the first supplementary reproduction layer 3 in a stable manner.

CNR measurement was conducted on magneto-optical disks at mark lengths of 0.2 $\mu$m, fabricated based on a magneto-optical disk including a first supplementary reproduction layer composed of $(Gd_{0.92}Tb_{0.08})_{0.34}(Fe_{0.40}Co_{0.60})_{0.66}$ which showed a higher CNR value than the other Tb/RE ratios in the measurement, with a fixed Tb/RE ratio of 8% and variable Fe/Co ratios, i.e., with the same compositions of the GdTbFeCo shown in Table 4 of embodiment 4.

Results of the measurement show that a magneto-optical disk with the Co/TM ratio as low as 25% produced relatively low CNRs, similarly to embodiment 4, when compared with sample #4. This was because in that magneto-optical disk, the total magnetization of the first supplementary reproduction layer 3 decreased around transition temperature Tp3 due the Curie temperature of the first supplementary reproduction layer 3 as low as 260° C. This caused the magnetostatic coupling between the storage layer 7 and the first supplementary reproduction layer 3 around transition temperature Tp3 to be weakened compared to that of sample #4.

Meanwhile, in the magneto-optical disks, where the Co/TM ratio was 30%, the Curie temperature of the first supplementary reproduction layer 3 was equal to the Curie temperature of the first supplementary reproduction layer 3 of sample #4; however, the CNRs were higher than that of sample #4 by 0.5 dB or greater. This is because the addition of Tb increased the perpendicular magnetic anisotropy of the first supplementary reproduction layer 3 and therefore produced relatively stable perpendicular magnetization above transition temperature Tp3. It is hence understood that the addition of Tb stabilizes perpendicular magnetization and enables duplication of magnetic domains with high resolution.

The magneto-optical disks with a Co/TM ratio of 40% or higher produced CNRs higher than that of sample #4 by 1 dB or greater.

This is because (1) the addition of Tb increased the perpendicular magnetic anisotropy of the first supplementary reproduction layer 3 and therefore produced relatively stable perpendicular magnetization above transition temperature Tp3 and (2) the increased Co/TM ratio elevated the Curie temperature of the first supplementary reproduction layer 3 and thereby enhanced the total magnetization of the first supplementary reproduction layer 3 around transition temperature Tp3 and hence enhanced magnetostatic coupling forces between the first supplementary reproduction layer 3 and the second supplementary reproduction layer 5 and also between the first supplementary reproduction layer 3 and the storage layer 7.

From the foregoing, it is understood that the first supplementary reproduction layer 3, when composed of GdTbFeCo with a variable Tb/RE ratio from 1% to 20% and a variable Co/TM ratio of 30% or higher, exhibits perpendicular magnetization with increased stability around transition temperature Tp3 at which the first supplementary reproduction layer 3 changes to perpendicular magnetization.

If further adjusted within this composition range so as to contain a high Co content with respect to the transition metal content, the first supplementary reproduction layer 3 will have an elevated Curie temperature and increased total magnetization. Thus, magnetostatic coupling forces are enhanced between the first supplementary reproduction layer 3 and the second supplementary reproduction layer 5 and also between the first supplementary reproduction layer 3 and the storage layer 7, effecting stable magnetic domain duplication and magnetic domain expansion reproduction. The first supplementary reproduction layer 3 thus adjusted forms a magneto-optical storage medium for magnetic domain expansion reproduction scheme with increased CNRs.

Embodiment 9

The following description will discuss another embodiment in accordance with the present invention.

The magneto-optical storage medium of the present embodiment employs the same arrangement and playback principles as the magneto-optical storage medium (FIG. 12) of embodiment 6, except that the reproduction layer 1 of the present embodiment is composed of GdDyFeCo, i.e., a material based on the GdFeCo used in embodiment 6 with additional Dy.

In the present embodiment, the reproduction layer 1 is composed of $(Gd_{0.84}Dy_{0.16})_{0.32}(Fe_{0.68}Co_{0.32})_{0.68}$. The material was prepared based on the GdFeCo of embodiment 3 with additional Dy, and adjusted in composition so that transition temperature Tp1 and Curie temperature Tc1 of the reproduction layer 1 of the present embodiment are both equal to those of the reproduction layer 1 of embodiment 2. Transition temperature Tp1 was 90° C., and Curie temperature Tc1 was 260° C.

A magneto-optical disk including the above arrangement, i.e., a magneto-optical disk including the same arrangement as the magneto-optical disk (FIG. 13) of embodiment 6 except that the reproduction layer 1 was composed of GdDyFeCo, was fabricated and subjected to recording and reproduction processes. Information was recorded and reproduced on the magneto-optical disk (denoted as sample #5) under the recording and reproduction conditions detailed in embodiment 3. Specifically, a recording/playback laser of 7.2 mW was continuously projected through a magneto-optical pickup head using a semiconductor laser having a wavelength of 680 nm at a linear velocity of 2.5 m/s, while applying a recording magnetic field modulated at ±15 kA/m, so as to form a repetitive pattern of upward and downward magnetization in the storage layer 7 in accordance with the direction of the recording magnetic field. Then, by altering the modulation frequency of the recording magnetic field, a magnetic domain pattern was recorded with mark lengths varying from 0.2 μm to 0.5 μm. Here, the mark length was equal to the length of the magnetic recording domain and also equal to half the pitch between two adjacent magnetic recording domains.

Figure 15:
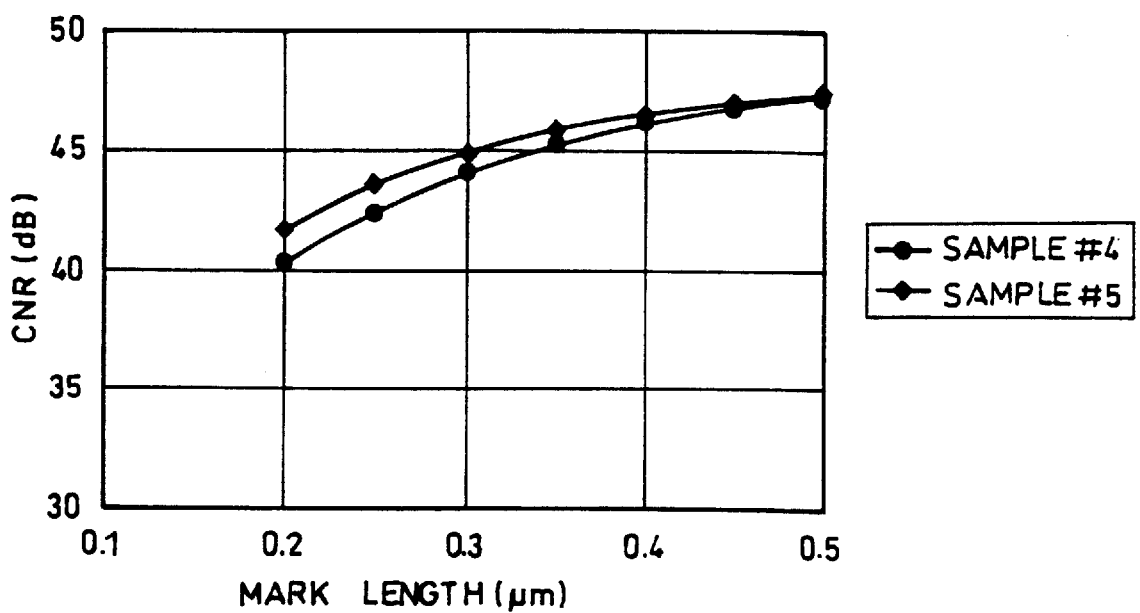
FIG. 15 is a graph showing signal-to-noise ratios of a magneto-optical disk of another embodiment in accordance with the present invention in relation to mark lengths.

FIG. 15 is a graph showing the mark length dependence of the CNR (signal-to-noise ratio) of sample #5, measured by continuously projecting a recording/playback laser of 2.4 mW as the magneto-optical disk is played back. For comparison, FIG. 15 also shows, as a graph, the mark length dependence of the CNR of the magneto-optical disk of embodiment 6, i.e., sample #4 (FIG. 13), including a reproduction layer 1, a second supplementary reproduction layer 5, and a first supplementary reproduction layer 3, of sample #5, composed of GdFeCo.

Referring to FIG. 15, a comparison of CNRs between sample #5 and sample #4 reveals that sample #5 exhibited higher CNRs than sample #4 at any mark length.

As detailed in the foregoing, in sample #5 of the present embodiment, the reproduction layer 1 exhibits increased perpendicular magnetic anisotropy, since it is composed of GdDyFeCo, i.e., GdFeCo of embodiment 6 plus Dy. This produces a relatively stable perpendicular magnetization above transition temperature Tp1 and enables expansion and duplication from the second supplementary reproduction layer 5 to the reproduction layer 1 more stably than in sample #4. Consequently, magnetic domain expansion and duplication from the second supplementary reproduction layer 5 to the reproduction layer 1 is effected with high resolution, and magnetic domain expansion reproduction is effected with satisfactory signal quality. Where the reproduction layer 1 is heated, it exhibits perpendicular magnetization with increased stability, and keeps producing satisfactory CNRs in the event that the laser projected during playback varies its power; therefore, the reproduction power margin can be expanded.

The magneto-optical storage medium of the present embodiment is further adjusted in terms of magnetic properties of the reproduction layer 1, the second supplementary reproduction layer 5, the first supplementary reproduction layer 3, and the storage layer 7 so that the storage layer 7 is magnetostatically coupled to the first supplementary reproduction layer 3 at transition temperature Tp3 more securely than to the reproduction layer 1 at transition temperature Tp1 and to the second supplementary reproduction layer 5 at transition temperature Tp5.

As a result, in the magneto-optical storage medium, magnetostatic coupling is optimized between the storage layer 7 and the reproduction layer 1, between the storage layer 7 and the second supplementary reproduction layer 5, and also between the storage layer 7 and the first supplementary reproduction layer 3, enabling magnetic domain duplication and magnetic domain expansion reproduction to be performed in stable manners.

The present embodiment so far exclusively referred to exemplary use of GdDyFeCo, i.e., GdFeCo with additional Dy, as the material composing the reproduction layer 1; however, any additional element, for example, Tb, may be used instead of Dy as long as its addition increases the perpendicular magnetic anisotropy of the GdFeCo and retain the perpendicular magnetization of the reproduction layer 1 in a stable manner above transition temperature Tp3 of the reproduction layer 1. The use of Tb in place of Dy produces similar advantages as in the present embodiment by adjusting magnetic properties.

The present embodiment so far exclusively referred to a variable material composing the reproduction layer 5 of the magneto-optical storage medium of embodiment 6; however, the arrangement is, of course, applicable to the magneto-optical storage medium of embodiments 7 and 8 in a similar manner.

Embodiment 10

The following description will discuss another embodiment in accordance with the present invention.

The magneto-optical storage medium of the present embodiment employs the same arrangement and playback principles as the magneto-optical storage medium (FIG. 12) of embodiment 6, except that the second supplementary reproduction layer 5 of the present embodiment is composed of GdDyFeCo, i.e., a material based on the GdFeCo used in embodiment 6 with additional Dy.

In the present embodiment, the second supplementary reproduction layer 5 is composed of $(Gd_{0.84}Dy_{0.16})_{0.34}(Fe_{0.68}Co_{0.32})_{0.66}$. The material was prepared based on the GdFeCo of embodiment 6 with additional Dy, and adjusted in composition so that transition temperature Tp5 and Curie temperature Tc5 of the second supplementary reproduction layer 5 of the present embodiment are both equal to those of the second supplementary reproduction layer 5 of embodiment 2. Transition temperature Tp5 was 125° C., and Curie temperature Tc5 was 250° C.

A magneto-optical disk including the above arrangement, i.e., a magneto-optical disk including the same arrangement as the magneto-optical disk (FIG. 13) of embodiment 6 except that the second supplementary reproduction layer 5 was composed of GdDyFeCo, was fabricated and subjected to recording and reproduction processes. Information was recorded and reproduced on the magneto-optical disk (denoted as sample #6) under the recording and reproduction conditions detailed in embodiment 6. Specifically, a recording/playback laser of 7.2 mW was continuously projected through a magneto-optical pickup head using a semiconductor laser having a wavelength of 680 nm at a linear velocity of 2.5 m/s, while applying a recording magnetic field modulated at ±15 kA/m, so as to form a repetitive pattern of upward and downward magnetization in the storage layer 7 in accordance with the direction of the recording magnetic field. Then, by altering the modulation frequency of the recording magnetic field, a magnetic domain pattern was recorded with mark lengths varying from 0.2 μm to 0.5 μm. Here, the mark length was equal to the length of the magnetic recording domain and also equal to half the pitch between two adjacent magnetic recording domains.

Figure 16:
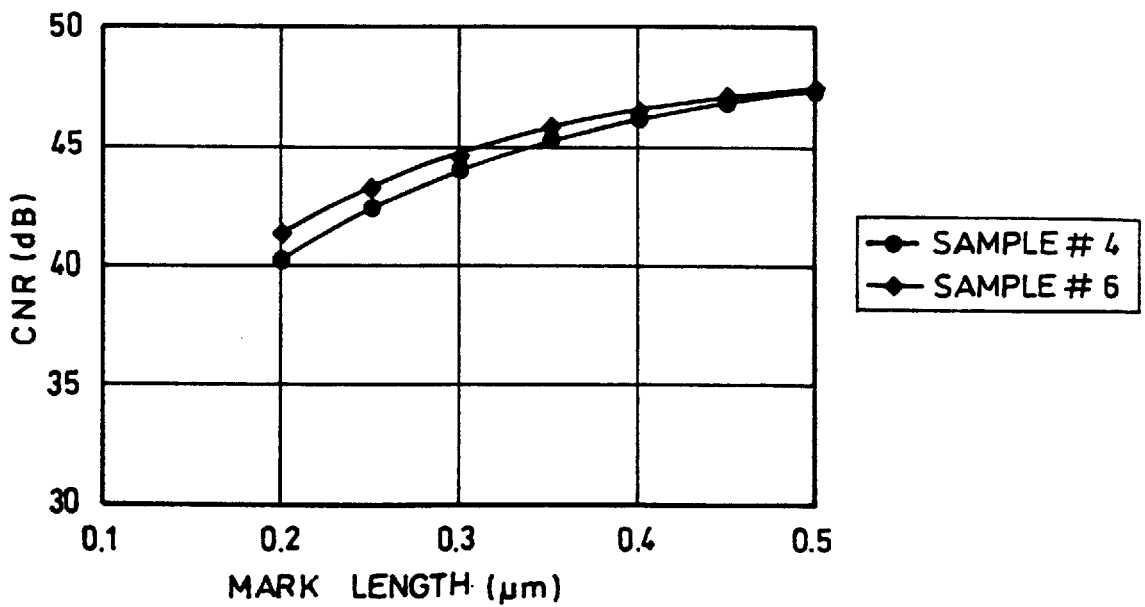
FIG. 16 is a graph showing signal-to-noise ratios of a magneto-optical disk of another embodiment in accordance with the present invention in relation to mark lengths.

FIG. 16 is a graph showing the mark length dependence of the CNR (signal-to-noise ratio) of sample #6, measured by continuously projecting a recording/playback laser of 2.4 mW. For comparison, FIG. 16 also shows, as a graph, the mark length dependence of the CNR of the magneto-optical disk of embodiment 6, i.e., sample #4 (FIG. 13), including a reproduction layer 1, a second supplementary reproduction layer 5, and a first supplementary reproduction layer 3, of sample #4, composed of GdFeCo.

Referring to FIG. 16, a comparison of CNRs between sample #6 and sample #4 reveals that sample #6 exhibited higher CNRs than sample #4 at any mark length.

As detailed in the foregoing, in sample #6 of the present embodiment, the second supplementary reproduction layer 5 exhibits increased perpendicular magnetic anisotropy, since it is composed of GdDyFeCo, i.e., GdFeCo of embodiment 6 plus Dy. This produces a relatively stable perpendicular magnetization above transition temperature Tp5 and enables expansion and duplication from the first supplementary reproduction layer 3 to the second supplementary reproduction layer 5 more stably than in sample #4. Consequently, magnetic domain expansion and duplication from the first supplementary reproduction layer 3 from the second supplementary reproduction layer 5 to the reproduction layer 1 is effected with high resolution, and magnetic domain expansion reproduction is effected with satisfactory signal quality. Where the second supplementary reproduction layer 5 is heated, it exhibits perpendicular magnetization with increased stability, and keeps producing satisfactory CNRs in the event that the laser projected during playback varies its power; therefore, the reproduction power margin can be expanded.

The magneto-optical storage medium of the present embodiment is further adjusted in terms of magnetic properties of the reproduction layer 1, the second supplementary reproduction layer 5, the first supplementary reproduction layer 3, and the storage layer 7 so that the storage layer 7 is magnetostatically coupled to the first supplementary reproduction layer 3 at transition temperature Tp3 more securely than to the reproduction layer 1 at transition temperature Tp1 and to the second supplementary reproduction layer 5 at transition temperature Tp5.

As a result, in the magneto-optical storage medium, magnetostatic coupling is optimized between the storage layer 7 and the reproduction layer 1, between the storage layer 7 and the second.supplementary reproduction layer 5, and also between the storage layer 7 and the first supplementary reproduction layer 3, enabling magnetic domain duplication and magnetic domain expansion reproduction to be performed in stable manners.

The present embodiment so far exclusively referred to exemplary use of GdDyFeCo, i.e., GdFeCo with additional Dy, as the material composing the second supplementary reproduction layer 5; however, any additional element, for example, Tb, may be used instead of Dy as long as its addition increases the perpendicular magnetic anisotropy of the GdFeCo and retain the perpendicular magnetization of the reproduction layer 1 in a stable manner above transition temperature Tp3 of the reproduction layer 1. The use of Tb in place of Dy produces similar advantages as in the present embodiment by adjusting magnetic properties.

The present embodiment so far exclusively referred to a variable material composing the second supplementary reproduction layer 5 of the magneto-optical storage medium of embodiment 6; however, the arrangement is, of course, applicable to the magneto-optical storage medium of embodiments 7, 8, and 9 in a similar manner.

The present invention is best represented by, but not limited to, embodiments 1 to 10 above.

Generally, the present invention is sufficiently embodied by a magneto-optical storage medium including:

a reproduction section (1) including: a reproduction layer exhibiting in-plane magnetization at room temperature and changing to perpendicular magnetization above a transition temperature; and an in-plane magnetized layer (first in-plane magnetized layer in the aforementioned embodiments) disposed adjacent the reproduction layer and constituted by in-plane magnetized film having its Curie temperature specified around the transition temperature of the reproduction layer; and a storage layer (2) constituted by a perpendicularly magnetized film, the magneto-optical storage medium further including one or more supplementary reproduction sections (3), interposed between the reproduction section (1) and the storage layer (2), each including: one or more supplementary reproduction layers (first and second supplementary reproduction layers in the aforementioned embodiments) exhibiting in-plane magnetization at room temperature and changing to perpendicular magnetization above transition temperatures; and one or more in-plane magnetized supplementary reproduction layers (second and third supplementary reproduction layers in the aforementioned embodiments) each disposed adjacent the supplementary reproduction layers and constituted by an in-plane magnetized film having its Curie temperature specified around the transition temperatures of the supplementary reproduction layers, wherein the transition temperatures of the supplementary reproduction layers in the supplementary reproduction sections are all higher than the transition temperature of the reproduction layer, and the transition temperatures of the supplementary reproduction layers in the supplementary reproduction sections are increasingly high toward the storage layer.

However, if the supplementary reproduction sections are disposed adjacent the reproduction section so that each supplementary reproduction layer is sandwiched by in-plane magnetized films, the supplementary reproduction layer exhibits in-plane magnetization with increased strength below the transition temperatures of the supplementary reproduction layer, effecting stable in-plane magnetization masking.

In the magneto-optical storage media in accordance with the present invention, the reproduction section (1) should be located closer to the surface where light enters than is the storage layer (2); however, the relative location with respect to the substrate is not limited to embodiment 1 to 10.

As detailed in the foregoing, a first magneto-optical storage medium in accordance with the present invention is a magneto-optical storage medium including:

a reproduction section including: a reproduction layer exhibiting in-plane magnetization at room temperature and changing to perpendicular magnetization with rising temperature; and an in-plane magnetized layer disposed adjacent the reproduction layer and constituted by an in-plane magnetized film having its Curie temperature around a temperature at which the reproduction layer changes to perpendicular magnetization; and a storage layer, constituted by a perpendicularly magnetized film, for storing information, and is characterized in that the first magneto-optical storage medium further includes: one or more supplementary reproduction sections, interposed between the in-plane magnetized layer and the storage layer, each including: a supplementary reproduction layer exhibiting in-plane magnetization at room temperature and changing to perpendicular magnetization with rising temperature; and an in-plane magnetized supplementary reproduction layer disposed adjacent the supplementary reproduction layer and constituted by an in-plane magnetized film having its Curie temperature around a transition temperature at which the supplementary reproduction layer changes to perpendicular magnetization, wherein the supplementary reproduction layer in each of the supplementary reproduction section is specified to change to perpendicular magnetization above the temperature at which the reproduction layer changes to perpendicular magnetization, and the temperatures at which the supplementary reproduction layers in the supplementary reproduction sections change to perpendicular magnetization are increasingly high toward the storage layer.

In the arrangement, there is provided an in-plane magnetized layer losing its magnetization at its Curie temperature Tc2 around transition temperature Tp1 at which the reproduction layer changes to perpendicular magnetization. Thus, the in-plane magnetized layer aligns the magnetization of the reproduction layer in the in-plane direction through exchange coupling below Tp1, enhancing in-plane magnetization masking. Above Tp1, the in-plane magnetized layer allows passage to the leaking magnetic field generated in the storage layer and the first supplementary reproduction layer.

Further, there is provided a first in-plane magnetized supplementary reproduction layer losing its magnetization at its Curie temperature Tc4 around transition temperature Tp3 at which the first supplementary reproduction layer changes to perpendicular magnetization. Thus, the first in-plane magnetized supplementary reproduction layer aligns the magnetization of the reproduction layer in the in-plane direction through exchange coupling below Tp3, enhancing in-plane magnetization masking. Above Tp3, the first in-plane magnetized supplementary reproduction layer allows passage to the leaking magnetic field generated in the storage layer.

According to the arrangement, the reproduction layer, the in-plane magnetized layer, the first supplementary reproduction layer, and the first in-plane magnetized supplementary reproduction layer are securely coupled through exchange forces below transition temperature Tp1 at which the reproduction layer changes to perpendicular magnetization, thereby stabilizing the in-plane magnetization of the reproduction layer below transition temperature Tp1. Thus, the reproduction layer abruptly changes from in-plane magnetization to perpendicular magnetization where it is heated exceeding transition temperature Tp1, improving reproduction resolution and enabling stable magnetic domain expansion and duplication.

The exchange coupling between the reproduction layer and the first supplementary reproduction layer is blocked by the in-plane magnetized layer, preventing transition temperature Tp1 of the reproduction layer from rising and transition temperature Tp3 of the first supplementary reproduction layer from falling.

Further, the first supplementary reproduction layer is securely coupled to the in-plane magnetized supplementary reproduction layer through exchange forces below transition temperature Tp3 at which the first supplementary reproduction layer changes to perpendicular magnetization, thereby exhibiting in-plane magnetization with increased stability below transition temperature Tp3 of the first supplementary reproduction layer. Thus, the first supplementary reproduction layer abruptly changes from in-plane magnetization to perpendicular magnetization where it is heated exceeding transition temperature Tp3, improving reproduction resolution in the first supplementary reproduction layer and effecting magnetic domain expansion and duplication with increased stability.

In this manner, high reproduction resolution and satisfactory reproduction signal quality are obtainable by expanding and duplicating, to the reproduction layer, magnetic domains duplicated to the first supplementary reproduction layer with high reproduction resolution.

A second magneto-optical storage medium in accordance with the present invention includes all the features of the first magneto-optical storage medium and is characterized in that the reproduction section and the supplementary reproduction sections are such that each supplementary reproduction layer is interposed between, and placed adjacent, in-plane magnetized films each constituting either an in-plane magnetized layer or an in-plane magnetized supplementary reproduction layer.

If each supplementary reproduction layer is interposed between, and placed adjacent, in-plane magnetized films as in the foregoing, the supplementary reproduction layer exhibits in-plane magnetization with increased strength below the transition temperature of the supplementary reproduction layer, effecting stable in-plane magnetization masking.

A third magneto-optical storage medium in accordance with the present invention includes at least:

a reproduction layer exhibiting in-plane magnetization at room temperature and changing to perpendicular magnetization at transition temperature Tp1;

a first in-plane magnetized layer disposed adjacent the reproduction layer and constituted by an in-plane magnetized film having its Curie temperature around transition temperature Tp1;

a first supplementary reproduction layer exhibiting in-plane magnetization at room temperature and changing to perpendicular magnetization at transition temperature Tp3;

a second in-plane magnetized layer disposed adjacent the first supplementary reproduction layer and constituted by an in-plane magnetized film having its Curie temperature around transition temperature Tp3; and a storage layer, for storing information, constituted by a perpendicularly magnetized film, the layers being sequentially deposited in this order, wherein Tp1<Tp3.

In the arrangement, there is provided an in-plane magnetized layer losing its magnetization at its Curie temperature Tc2 around transition temperature Tp1 at which the reproduction layer changes to perpendicular magnetization. Thus, the in-plane magnetized layer aligns the magnetization of the reproduction layer in the in-plane direction through exchange coupling below Tp1, enhancing in-plane magnetization masking. Above Tp1, the in-plane magnetized layer allows passage to the leaking magnetic field generated in the storage layer and the first supplementary reproduction layer.

There is further provided a first in-plane magnetized supplementary reproduction layer losing its magnetization at its Curie temperature Tc4 around transition temperature Tp3 at which the first supplementary reproduction layer changes to perpendicular magnetization. Thus, the first in-plane magnetized supplementary reproduction layer aligns the magnetization of the reproduction layer in the in-plane direction through exchange coupling below Tp3, enhancing in-plane magnetization masking. Above Tp3, the first in-plane magnetized supplementary reproduction layer allows passage to the leaking magnetic field generated in the storage layer.

Further in the arrangement, the reproduction layer is securely coupled to the in-plane magnetized layer, the first supplementary reproduction layer, and the first in-plane magnetized supplementary reproduction layer through exchange forces below transition temperature Tp1 at which the reproduction layer changes to perpendicular magnetization, thereby exhibiting in-plane magnetization with increased stability below transition temperature Tp1 of the reproduction layer. Thus, the reproduction layer abruptly changes from in-plane magnetization to perpendicular magnetization where it is heated exceeding transition temperature Tp1, improving reproduction resolution and effecting magnetic domain expansion and duplication with increased stability.

Further, the exchange coupling between the reproduction layer and the first supplementary reproduction layer is blocked by the in-plane magnetized layer, preventing transition temperature Tp1 of the reproduction layer from rising and transition temperature Tp3 of the first supplementary reproduction layer from falling.

Further, the first supplementary reproduction layer is securely coupled to the in-plane magnetized supplementary reproduction layer through exchange forces below transition temperature Tp3 at which the first supplementary reproduction layer changes to perpendicular magnetization, thereby exhibiting in-plane magnetization with increased stability below transition temperature Tp3 of the first supplementary reproduction layer. Thus, the first supplementary reproduction layer abruptly changes from in-plane magnetization to perpendicular magnetization where it is heated exceeding transition temperature Tp3, improving reproduction resolution and effecting magnetic domain expansion and duplication with increased stability.

In this manner, high reproduction resolution and satisfactory reproduction signal quality are obtainable by expanding and duplicating, to the reproduction layer, magnetic domains duplicated to the first supplementary reproduction layer with high reproduction resolution.

A magneto-optical storage medium in accordance with the present invention includes all the features of the third magneto-optical storage medium and is characterized in that the reproduction layer, the first supplementary reproduction layer, the storage layer are adjusted in terms of magnetic properties so that magnetostatic coupling forces are greater between the storage layer and the first supplementary reproduction layer at transition temperature Tp3 than between the storage layer and the reproduction layer at transition temperature Tp1.

In the arrangement, magnetostatic coupling is optimized between the storage layer and the reproduction layer and also between the storage layer and the first supplementary reproduction layer, effecting stable magnetic domain duplication and magnetic domain expansion reproduction.

A fifth magneto-optical storage medium in accordance with the present invention includes all the features of the fourth magneto-optical storage medium and is characterized in that at least either one of the reproduction layer or the first supplementary reproduction layer is composed of GdDyFeCo or GdTbFeCo.

The reproduction layer, when composed of GdDyFeCo or GdTbFeCo, exhibits increased perpendicular magnetic anisotropy. This stabilizes the perpendicular magnetization above transition temperature Tp1 and effects stable expansion and duplication from the first supplementary reproduction layer to the reproduction layer. Consequently, magnetic domains are expanded and duplicated from the first supplementary reproduction layer to the reproduction layer with high resolution, and magnetic domain expansion reproduction is effected with satisfactory signal quality. Besides, where the reproduction layer is heated, it exhibits perpendicular magnetization with increased stability, and keeps producing satisfactory CNRs in the event that the laser projected during playback varies its power; therefore, the reproduction power margin can be expanded.

A sixth magneto-optical storage medium in accordance with the present invention includes all the features of the third magneto-optical storage medium and is characterized in that a second supplementary reproduction layer exhibiting in-plane magnetization at room temperature and changing to perpendicular magnetization at its transition temperature Tp5 and a third in-plane magnetized layer disposed adjacent the second supplementary reproduction layer and constituted by an in-plane magnetized film having its Curie temperature around transition temperature Tp5 are disposed between the first in-plane magnetized layer and the storage layer so that the supplementary reproduction layer is closer to the reproduction layer, and Tp1<Tp5<Tp3.

Accordingly to the arrangement, the magnetic information stored in the storage layer is duplicated to the first supplementary reproduction layer and further expanded and duplicated to the second supplementary reproduction layer and then to the reproduction layer sequentially. This stabilizes expansion and duplication from magnetic domains in the first supplementary reproduction layer to magnetic domains in the reproduction layer. Besides, a leaking magnetic flux arising in parallel to the total magnetization of the magnetic recording domain from an increased area can be applied to a part of the reproduction layer where it has changed to perpendicular magnetization; therefore, even if signals whose cycles do not exceed diffraction limits of light are stored in the storage layer, magnetic domain expansion is performed with no reduction in reproduction signal amplitude and is less likely to be affected by external disturbances.

A seventh magneto-optical storage medium in accordance with the present invention includes all the features of the sixth magneto-optical storage medium and is characterized in that the reproduction layer, the second supplementary reproduction layer, the first supplementary reproduction layer, and the storage layer are adjusted in terms of magnetic properties so that magnetostatic coupling forces are greater between the storage layer and the first supplementary reproduction layer at transition temperature Tp3 than between the storage layer and the reproduction layer at transition temperature Tp1 and between the storage layer and the second supplementary reproduction layer at transition temperature Tp5.

According to the arrangement, if the reproduction layer, the second supplementary reproduction layer, the first supplementary reproduction layer, and the storage layer are adjusted in terms of magnetic properties so that magnetostatic coupling forces are greater between the storage layer and the first supplementary reproduction layer at transition temperature Tp3 than between the storage layer and the reproduction layer at transition temperature Tp1 and between the storage layer and the second supplementary reproduction layer at transition temperature Tp5, magnetostatic coupling is optimized between the storage layer and the reproduction layer, between the storage layer and the second supplementary reproduction layer, and between the storage layer and the first supplementary reproduction layer, effecting stable magnetic domain duplication and magnetic domain expansion reproduction.

A eighth magneto-optical storage medium in accordance with the present invention includes all the features of the seventh magneto-optical storage medium and is characterized in that at least any one of the reproduction layer, the second supplementary reproduction layer, and the first supplementary reproduction layer is composed of GdDyFeCo or GdTbFeCo.

By composing at least any one of the reproduction layer, the second supplementary reproduction layer, and the first supplementary reproduction layer of GdDyFeCo or GdTbFeCo as in the arrangement, the reproduction layer exhibits increased perpendicular magnetic anisotropy. This stabilizes the perpendicular magnetization above transition temperature Tp1 and effects stable expansion and duplication from the first supplementary reproduction layer to the reproduction layer. Consequently, magnetic domains are expanded and duplicated from the first supplementary reproduction layer to the reproduction layer with high resolution, and magnetic domain expansion reproduction is effected with satisfactory signal quality. Besides, where the reproduction layer is heated, it exhibits perpendicular magnetization with increased stability, and keeps producing satisfactory CNRs in the event that the laser projected during playback varies its power; therefore, the reproduction power margin can be expanded.

A ninth magneto-optical storage medium in accordance with the present invention includes all the features of any one of the fourth to eighth magneto-optical storage media and is characterized in that there is provided a non-magnetic intermediate layer between the second in-plane magnetized layer and the storage layer.

In the arrangement, the provision of the non-magnetic intermediate layer stabilizes the in-plane magnetization of the supplementary reproduction layer below transition temperature Tp3, even when the in-plane magnetized supplementary reproduction layer has a reduced thickness. Therefore, the storage layer and the supplementary reproduction layer are securely coupled only where they are heated, improving the reproduction resolution in the supplementary reproduction layer.

Consequently, in the magneto-optical storage medium, magnetic domains duplicated to the supplementary reproduction layer with increased reproduction resolution are expanded and duplicated to the reproduction layer, therefore effecting increased reproduction resolution and satisfactory reproduction signal quality. For these reasons, with the magneto-optical storage medium, the reproduction resolution in the first supplementary reproduction layer 3 is improved and satisfactory reproduction signal quality can be achieved at short mark lengths, while retaining satisfactory recording sensitivity.

A first method of reproducing a magneto-optical storage medium in accordance with the present invention is a reproduction method for the third magneto-optical storage medium and is characterized in that the magneto-optical storage medium is heated exceeding transition temperature Tp3 by means of light beam projection for reproduction, the magnetic information stored in the storage layer is duplicated to a part of the first supplementary reproduction layer where it is heated exceeding transition temperature Tp3, and the magnetic information duplicated to the part of the first supplementary reproduction layer is then duplicated to a part of the reproduction layer where it is heated exceeding transition temperature Tp1.

A second method of reproducing a magneto-optical storage medium in accordance with the present invention is a reproduction method for the sixth magneto-optical storage medium and is characterized in that the magneto-optical storage medium is heated exceeding transition temperature Tp3 by means of light beam projection for reproduction, the magnetic information stored in the storage layer is duplicated to a part of the first supplementary reproduction layer where it is heated exceeding transition temperature Tp3, the magnetic information duplicated to the part of the first supplementary reproduction layer is then duplicated to a part of the second supplementary reproduction layer where it is heated exceeding transition temperature Tp5, and the magnetic information duplicated to the part of the second supplementary reproduction layer is further duplicated to a part of the reproduction layer where it is heated exceeding transition temperature Tp1.

According to either one of the methods of reproducing a magneto-optical storage medium, the magnetic domain in the storage layer is expanded and duplicated to the supplementary reproduction layer and further expanded and duplicated to the reproduction layer; a leaking magnetic flux arising from an increased area can therefore be applied to the reproduction layer, which improves reproduction signal quality.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical storage medium, comprising:
   a reproduction layer exhibiting in-plane magnetization at room temperature and exhibiting perpendicular magnetization above a first transition temperature;
   an in-plane magnetized layer including an in-plane magnetized film having a Curie temperature approximately equal to the first transition temperature;
   a storage layer including a perpendicularly magnetized film for storing information; and
   at least one supplementary reproduction section, interposed between the storage layer and the in-plane magnetized layer, including a first supplementary reproduction layer and a first in-plane magnetized supplementary reproduction layer, the first supplementary reproduction layer exhibiting in-plane magnetization at room temperature and exhibiting perpendicular magnetization above a second transition temperature, the first in-plane magnetized supplementary reproduction layer being disposed adjacent the first supplementary reproduction layer and including an in-plane magnetized film having a Curie temperature approximately equal to the second transition temperature, wherein the first transition temperature is relatively lower than the second transition temperature.

2. The magneto-optical storage medium as set forth in claim 1, wherein a plurality of supplementary reproduction sections are provided, between the in-plane magnetized layer and the storage layer, in ascending order of second transition temperatures from the in-plane magnetized layer toward the storage layer.

3. The magneto-optical storage medium as set forth in claim 1, wherein the supplementary reproduction layer is provided between, and adjacent, two in-plane magnetized layers to the in-plane magnetized layer or the in-plane magnetized supplementary reproduction layer.

4. The magneto-optical storage medium as set forth in claim 1, wherein the reproduction layer, the supplementary reproduction layer, and the storage layer are adjusted in terms of magnetic properties so that magnetostatic coupling forces are relatively greater between the storage layer and the supplementary reproduction layer at the second transition temperature than between the storage layer and the reproduction layer at the first transition temperature.

5. The magneto-optical storage medium as set forth in claim 1, wherein the reproduction layer has a lower Curie temperature than the first supplementary reproduction layer.

6. The magneto-optical storage medium as set forth in claim 1, wherein the reproduction layer has a Curie temperature not lower than 160° C. and not higher than 300° C.

7. The magneto-optical storage medium as set forth in claim 1, wherein the first transition temperature of the reproduction layer is not lower than 60° C. and not higher than 180° C.

8. The magneto-optical storage medium as set forth in claim 1, wherein the first supplementary reproduction layer has a Curie temperature not lower than 230° C.

9. The magneto-optical storage medium as set forth in claim 1, wherein the first supplementary reproduction layer has a second transition temperature not lower than 100° C. and not higher than 230° C.

10. The magneto-optical storage medium as set forth in claim 1, wherein the reproduction layer is composed of GdFe, GdFeCo, GdDyFeCo, GdTbFeCo, or GdNdFeCo.

11. The magneto-optical storage medium as set forth in claim 10, wherein the reproduction layer additionally contains Ta, Cr, Ti, Al, or Si.

12. The magneto-optical storage medium as set forth in claim 1, wherein the first supplementary reproduction layer is composed of GdFe, GdFeCo, GdDyFeCo, GdTbFeCo, or GdNdFeCo.

13. The magneto-optical storage medium as set forth in claim 12, wherein the first supplementary reproduction layer additionally contains Ta, Cr, Ti, Al, or Si.

14. The magneto-optical storage medium as set forth in claim 1, wherein the storage layer is a perpendicularly magnetized film composed of an alloy of rare earth and transition metals, having a compensation temperature not lower than −70° C. and not higher than 60° C.

15. The magneto-optical storage medium as set forth in claim 1, wherein the storage layer has a Curie temperature not lower than 180° C. and not higher than 300° C.

16. The magneto-optical storage medium as set forth in claim 1, wherein the storage layer is composed of TbFe, TbFeCo, DyFe, DyFeCo, TbDyFe, or TbDyFeCo.

17. The magneto-optical storage medium as set forth in claim 16, wherein the storage layer additionally contains Ta, Cr, Ti, Al, or Si.

18. The magneto-optical storage medium as set forth in claim 4, wherein at least either the reproduction layer or the supplementary reproduction layer is composed of GdDyFeCo or GdTbFeCo.

19. The magneto-optical storage medium as set forth in claim 2, wherein the supplementary reproduction section includes a first supplementary reproduction section and a second supplementary reproduction section, the first supplementary reproduction section including a first supplementary reproduction layer and a first in-plane magnetized supplementary reproduction layer disposed so that the first supplementary reproduction layer is relatively closer to the reproduction layer than the first in-plane magnetized supplementary reproduction layer, the second supplementary reproduction selection includes a second supplementary reproduction layer and a second in-plane magnetized supplementary reproduction layer disposed so that the second supplementary reproduction layer is relatively closer to the reproduction layer than the second in-plane magnetized supplementary reproduction layer, wherein the first supplementary reproduction layer is relatively closer to the storage layer than the second supplementary reproduction layer, and the first supplementary reproduction layer exhibiting perpendicular magnetization above a relatively higher temperature than the second supplementary reproduction layer.

20. The magneto-optical storage medium as set forth in claim 19, wherein the reproduction layer, the first supplementary reproduction layer, and the storage layer are adjusted in terms of magnetic properties so that magnetostatic coupling forces are relatively greater between the storage layer and the first supplementary reproduction layer at the second transition temperature than between the storage layer and the reproduction layer at the first transition temperature and between the storage layer and the second supplementary reproduction layer at a temperature where the second supplementary reproduction layer changes magnetization.

21. The magneto-optical storage medium as set forth in claim 20, wherein at least any one of the reproduction layer, the second supplementary reproduction layer, and the first supplementary reproduction layer is composed of either GdDyFe or GdTbFeCo.

22. The magneto-optical storage medium as set forth in claim 19, wherein the second supplementary reproduction layer has a Curie temperature Tc5 not lower than 160° C. and not higher than 300° C.

23. The magneto-optical storage medium as set forth in claim 19, wherein the second supplementary reproduction layer has a thickness of not less than 20 nm and not more than 60 nm.

24. The magneto-optical storage medium as set forth in claim 19, wherein the in-plane magnetized second supplementary reproduction layer has a thickness of not less than 2 nm and not more than 40 nm.

25. The magneto-optical storage medium as set forth in claim 19, wherein the second supplementary reproduction layer is composed of GdFe, GdFeCo, GdDyFeCo, GdTbFeCo, or GdNdFeCo.

26. The magneto-optical storage medium as set forth in claim 19, wherein the second in-plane magnetized supplementary reproduction layer is composed of GdFe, GdFeCo, GdDyFe, GdDyFeCo, GdNdFe, GdNdFeCo, NdFe, or NdFeCo.

27. The magneto-optical storage medium as set forth in claim 26, wherein the second in-plane magnetized supplementary reproduction layer additionally contains Ta, Cr, Ti, Al, or Si.

28. The magneto-optical storage medium as set forth in claim 19, wherein the first supplementary reproduction layer is composed of GdDyFeCo in which Dy makes up 2% to 28% of a total rare earth metal content and Co makes up 35% to 70% of a total transition metal content.

29. The magneto-optical storage medium as set forth in claim 19, wherein the first supplementary reproduction layer is composed of GdTbFeCo in which Tb makes up 1% to 20% of a total rare earth metal content and Co makes up 30% or more of a total transition metal content.

30. The magneto-optical storage medium as set forth in claim 1, further comprising a non-magnetic intermediate layer interposed between the first in-plane magnetized supplementary reproduction layer and the storage layer.

31. The magneto-optical storage medium as set forth in claim 30, wherein the non-magnetic intermediate layer is composed of a non-magnetic metal including Al, Si, Ta, Ti, Au, or Cu, an alloy of these non-magnetic metals, AlN, SiN, or AlSiN.

32. The magneto-optical storage medium as set forth in claim 30, wherein the non-magnetic intermediate layer has a thickness of 0.5 nm or greater.

33. The magneto-optical storage medium as set forth in claim 30, wherein the first supplementary reproduction layer and the non-magnetic intermediate layer has a combined thickness of 40 nm or smaller.

34. A magneto-optical storage medium, comprising;

a storage layer including a perpendicularly magnetized film for storing information;

a first reproduction section including a layer which changes it magnetization property above a first temperature and a layer which has a Curie temperature approximately equal to the first temperature; and a second reproduction section disposed between the storage layer and the first reproduction section, including a layer which changes its magnetization property above a second temperature and a layer which has a Curie temperature approximately equal to the second temperature, wherein, the first temperature is relatively less than the second temperature.

35. The magneto-optical storage medium as set forth in claim 34, further comprising:

a third reproduction section disposed between the second reproduction section and the first reproduction, including a layer which changes its magnetization property above a third temperature and a layer which has a Curie temperature approximately equal to the third temperature, wherein the third temperature is relatively greater than the first temperature and relatively less than the second temperature.

* * * * *